United States Patent
Yamamoto et al.

(10) Patent No.: US 8,422,669 B2
(45) Date of Patent: Apr. 16, 2013

(54) METHOD AND APPARATUS FOR ELLIPTIC CURVE CRYPTOGRAPHIC PROCESSING

(75) Inventors: Dai Yamamoto, Kawasaki (JP); Kouichi Itoh, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 261 days.

(21) Appl. No.: 12/891,467

(22) Filed: Sep. 27, 2010

(65) Prior Publication Data

US 2011/0075836 A1     Mar. 31, 2011

(30) Foreign Application Priority Data

Sep. 29, 2009    (JP) ................... 2009-225534

(51) Int. Cl.
*H04K 1/00*      (2006.01)

(52) U.S. Cl.
USPC .................... 380/28; 380/29; 380/30

(58) Field of Classification Search ............ None
See application file for complete search history.

(56) References Cited

U.S. PATENT DOCUMENTS

| 6,263,081 B1 * | 7/2001 | Miyaji et al. .......... 380/28 |
| 7,835,517 B2 * | 11/2010 | Akishita et al. ....... 380/30 |
| 2008/0025500 A1 | 1/2008 | Izu et al. |

FOREIGN PATENT DOCUMENTS

| JP | 11-102158 | 4/1999 |
| WO | 2006/077651 | 7/2006 |

OTHER PUBLICATIONS

IEEE P1363/D13 (Draft Version 13, Nov. 12, 1999) main document Standard Specifications for Public Key Cryptography, pp. 1-74.
P. Kocher, et al., "Differential Power Analysis", Crypto 99, LNCS 1666, pp. 388-397 Springer-Verlang, Aug. 15, 1999 (10 pages).
Catherine H. Gebotys, et al., "EM Analysis of Rijndael and ECC on a Wireless Java-Based PDA", Cryptographic Hardware and Embedded System, CHES 2005, Aug. 29, 2005, pp. 250-264, LNCS 3659.
N.A. Howgrave-Graham and N.P. Smart, "Lattice Attacks on Digital Signature Schemes" Designs, Codes and Cryptography, vol. 23, Issue 3, Aug. 1, 2001, pp. 283-290 (8 pages).
IEEE 1363-2000: Standard Specifications for Public Key Cryptography, Jan. 30, 2000, pp. 1-226.
Wikipedia, the free encyclopedia, "Floor and ceiling functions" [online] [retrieved on Nov. 14, 2012], Retrieved from the Internet: <URL: http://en.wikipedia.org/wiki/Floor_and_ceiling_functions> (18 pages).

\* cited by examiner

*Primary Examiner* — Andrew L Nalven
*Assistant Examiner* — Mohammed Waliullah
(74) *Attorney, Agent, or Firm* — Staas & Halsey LLP

(57) ABSTRACT

An apparatus includes a data storage to store a window table storing a table value with an index value mapped to the table value, the index value having same number of bits as a window width, the table value being a sum of a basic table value and a non-zero table correction value, the basic table value being obtained by multiplying a point G on an elliptic curve. An arithmetic processor generates the index value by reading from a scalar value at a bit position assigned to each bit of the window with the window being shifted, reads the table value from the window table according to the index value, and performs a doubling operation and an addition operation using the read table value. A corrector performs a correction on arithmetic results with a specific correction value responsive to the table correction value.

18 Claims, 50 Drawing Sheets

FIG. 3

```
R=ECADD(A,B) CALCULATION OPERATION
Input: POINT A=(Ax,Ay,Az),POINT B=(Bx,By,Bz),(JACOBIAN COORDINATES OF POINTS A AND B)
Output: POINT R=(Rx,Ry,Rz)=A+B,(JACOBIAN COORDINATES OF CALCULATION OPERATION RESULTS)
Buffer: T1,T2,T3,T4,T5,T6,T7,(INTERIM VARIABLE)
       ELLIPTIC CURVE PARAMETERS: a (for y² = x³ + ax + b (mod GF(p)) )
  800 if (Az==0) then return B;
        else if (Bz==0) then return A;
  801 T1 := Ax;
  802 T2 := Ay;
  803 T3 := Az;
  804 T4 := Bx;
  805 T5 := By;
  806 T6 := Bz;
  807 T7 := T6²;
  808 T1 := T1×T7;
  809 T7 := T6×T7;
  810 T2 := T2×T7;
  811 T7 := T3²;
  812 T4 := T4×T7;
  813 T7 := T3×T7;
  814 T5 := T5×T7;
  815 T4 := T1-T4;
  816 T5 := T2-T5;
  817 if (T4==0) then
         if (T5==0) then ECDBL(A)
           else output (1,1,0);
  818 T1 := 2×T1-T4;
  819 T2 := 2×T2-T5;
  820 T3 := T3×T6;
  821 T3 := T3×T4;
  822 T7 := T4²;
  823 T4 := T4×T7;
  824 T7 := T1×T7;
  825 T1 := T5²;
  826 T1 := T1-T7;
  827 T7 := T7-2×T1;
  828 T5 := T5×T7;
  829 T4 :=T2×T4;
  830 T2 := T5-T4;
  831 T2 := T2/2;
  832 Rx := T1;
  833 Ry := T2;
  834 Rz := T3;
  835 return (Rx, Ry, Rz);
```

FIG. 11B

CALCULATION OF A=dG (1). $A=Tab_H[d_{17},d_{14},d_{11}]$
(2). $A=A+Tab_L[d_8,d_5,d_2]$
(3). $A=2A$
(4). $A=A+Tab_H[d_{16},d_{13},d_{10}]$
(5). $A=A+Tab_L[d_7,d_4,d_1]$
(6). $A=2A$
(7). $A=A+Tab_H[d_{15},d_{12},d_9]$
(8). $A=A+Tab_L[d_6,d_3,d_0]$

FIG. 13

ECDSA SIGNATURE GENERATION PROCESS

Input: PRIVATE KEY s, SIGNATURE TARGET DATA $h_i$
Output: $h_i$, SIGNATURE DATA $(u_i, v_i)$ 0. $i=1$
1. GENERATE TEMPORARY RANDOM NUMBER $d_i$
2. $u_i = $ (x COORDINATE OF $d_i G$)(mod r)
3. $v_i = d_i^{-1} \times (h_i + s \times u_i)$(mod r)
4. OUTPUT $h_i, (u_i, v_i)$
5. REPEAT 1-5 UNTIL i REACHES MAXIMUM VALUE

FIG. 18A

| INDEX VALUES | TABLE VALUES |
|---|---|
| 000 | F |
| 001 | $2^0G+F$ |
| 010 | $2^1G+F$ |
| 011 | $2^1G+2^0G+F$ |
| 100 | $2^2G+F$ |
| 101 | $2^2G+2^0G+F$ |
| 110 | $2^2G+2^1G+F$ |
| 111 | $2^2G+2^1G+2^0G+F$ |

FIG. 18B

```
CALCULATION OF A=dG
(1). A=Tab[d_11,d_10,d_9]
(2). A=2^3 A
(3). A=A+Tab[d_8,d_7,d_6]
(4). A=2^3 A
(5). A=A+Tab[d_5,d_4,d_3]
(6). A=2^3 A
(7). A=A+Tab[d_2,d_1,d_0]
(8). A=A-(001001001001)_2 F /*CORRECTION OF EFFECT OF F*/
```

FIG. 19

| INDEX VALUES | TABLE VALUES |
|---|---|
| 0 | $F$ |
| 1 | $2^0 G + F$ |
| 2 | $2^1 G + F$ |
| ⋮ | |
| y | $(y_{k-1} \times 2^{k-1} + y_{k-2} \times 2^{k-2} + \ldots + y_1 \times 2^1 + y_0 \times 2^0)G + F$ |
| ⋮ | |
| $2^k - 1$ | $(2^{k-1} + 2^{k-2} + \ldots 2^1 + 2^0)G + F$ |

FIG. 24A

| INDEX VALUES | TABLE VALUES |
|---|---|
| 000 | F |
| 001 | $2^0G+F$ |
| 010 | $2^4G+F$ |
| 011 | $2^4G+2^0G+F$ |
| 100 | $2^8G+F$ |
| 101 | $2^8G+2^0G+F$ |
| 110 | $2^8G+2^4G+F$ |
| 111 | $2^8G+2^4G+2^0G+F$ |

FIG. 24B

```
CALCULATION OF A=dG
(1). A=Tab[$d_{11}$,$d_7$,$d_3$]
(2). A=2A
(3). A=A+Tab[$d_{10}$,$d_6$,$d_2$]
(4). A=2A
(5). A=A+Tab[$d_9$,$d_5$,$d_1$]
(6). A=2A
(7). A=A+Tab[$d_8$,$d_4$,$d_0$]
(8). A=A-$(1111)_2$F/*CORRECTION OF EFFECT OF FIXED POINT F*/
```

FIG. 25

| INDEX VALUES | TABLE VALUES |
|---|---|
| 0 | $F$ |
| 1 | $2^0 G + F$ |
| 2 | $2^{\lceil n/k \rceil \times 1} G + F$ |
| $\vdots$ | $\vdots$ |
| $y$ | $(y_{k-1} \times 2^{\lceil n/k \rceil \times (k-1)} + y_{k-2} \times 2^{\lceil n/k \rceil \times (k-2)} + \ldots + y_1 \times 2^{\lceil n/k \rceil \times 1} + y_0 \times 2^{\lceil n/k \rceil \times 0}) G + F$ |
| $\vdots$ | $\vdots$ |
| $2^k - 1$ | $(2^{\lceil n/k \rceil \times (k-1)} + 2^{\lceil n/k \rceil \times (k-2)} + \ldots + 2^{\lceil n/k \rceil \times 1} + 2^{\lceil n/k \rceil \times 0}) G + F$ |

FIG. 30A

| INDEX VALUES | TABLE VALUES |
|---|---|
| 000 | xG |
| 001 | $2^0G+xG$ |
| 010 | $2^1G+xG$ |
| 011 | $2^1G+2^0G+xG$ |
| 100 | $2^2G+xG$ |
| 101 | $2^2G+2^0G+xG$ |
| 110 | $2^2G+2^1G+xG$ |
| 111 | $2^2G+2^1G+2^0G+xG$ |

FIG. 30B

CALCULATION OF A=dG (0). $d=d-x(001001001001)_2$ /*CORRECTION OF EFFECT OF xG*/
(1). $A=Tab[d_{11},d_{10},d_9]$
(2). $A=2^3A$
(3). $A=A+Tab[d_8,d_7,d_6]$
(4). $A=2^3A$
(5). $A=A+Tab[d_5,d_4,d_3]$
(6). $A=2^3A$
(7). $A=A+Tab[d_2,d_1,d_0]$

FIG. 31

| INDEX VALUES | TABLE VALUES |
|---|---|
| 0 | xG |
| 1 | $2^0G+xG$ |
| 2 | $2^1G+xG$ |
| ⋮ | |
| y | $(y_{k-1}\times 2^{k-1}+y_{k-2}\times 2^{k-2}+...+y_1\times 2^1+y_0\times 2^0)G+xG$ |
| ⋮ | |
| $2^k-1$ | $(2^{k-1}+2^{k-2}+...2^1+2^0)G+xG$ |

FIG. 34A

| INDEX VALUES | TABLE VALUES |
|---|---|
| 000 | $xG$ |
| 001 | $2^0G+xG$ |
| 010 | $2^4G+xG$ |
| 011 | $2^4G+2^0G+xG$ |
| 100 | $2^8G+xG$ |
| 101 | $2^8G+2^0G+xG$ |
| 110 | $2^8G+2^4G+xG$ |
| 111 | $2^8G+2^4G+2^0G+xG$ |

FIG. 34B

```
CALCULATION OF A=dG
(0). d=d-x(1111)₂/*CORRECTION OF EFFECT OF FIXED POINT xG*/
(1). A=Tab[d₁₁,d₇,d₃]
(2). A=2A
(3). A=A+Tab[d₁₀,d₆,d₂]
(4). A=2A
(5). A=A+Tab[d₉,d₅,d₁]
(6). A=2A
(7). A=A+Tab[d₈,d₄,d₀]
```

FIG. 35

| INDEX VALUES | TABLE VALUES |
|---|---|
| 0 | $xG$ |
| 1 | $2^0 G + xG$ |
| 2 | $2^{\lceil n/k \rceil \times 1} G + xG$ |
| ⋮ y ⋮ | $(y_{k-1} \times 2^{\lceil n/k \rceil \times (k-1)} + y_{k-2} \times 2^{\lceil n/k \rceil \times (k-2)} + \ldots + y_1 \times 2^{\lceil n/k \rceil \times 1} + y_0 \times 2^{\lceil n/k \rceil \times 0}) G + xG$ |
| $2^k - 1$ | $(2^{\lceil n/k \rceil \times (k-1)} + 2^{\lceil n/k \rceil \times (k-2)} + \ldots + 2^{\lceil n/k \rceil \times 1} + 2^{\lceil n/k \rceil \times 0}) G + xG$ |

FIG. 38A

| INDEX VALUES | TABLE VALUES |
|---|---|
| 000 | $-F$ |
| 001 | $2^9G-F$ |
| 010 | $2^{12}G-F$ |
| 011 | $2^{12}G+2^9G-F$ |
| 100 | $2^{15}G-F$ |
| 101 | $2^{15}G+2^9G-F$ |
| 110 | $2^{15}G+2^{12}G-F$ |
| 111 | $2^{15}G+2^{12}G+2^9G-F$ |

FIG. 38B

| INDEX VALUES | TABLE VALUES |
|---|---|
| 000 | $+F$ |
| 001 | $2^0G+F$ |
| 010 | $2^3G+F$ |
| 011 | $2^3G+2^0G+F$ |
| 100 | $2^6G+F$ |
| 101 | $2^6G+2^0G+F$ |
| 110 | $2^6G+2^3G+F$ |
| 111 | $2^6G+2^3G+2^0G+F$ |

FIG. 38C

CALCULATION OF $A=dG$ (1). $A=Tab_H[d_{17},d_{14},d_{11}]$ $\quad$ −F ⎫
(2). $A=A+Tab_L[d_8,d_5,d_2]$ $\quad$ +F ⎬ CANCEL
(3). $A=2A$
(4). $A=A+Tab_H[d_{16},d_{13},d_{10}]$ $\quad$ −F ⎫
(5). $A=A+Tab_L[d_7,d_4,d_1]$ $\quad$ +F ⎬ CANCEL
(6). $A=2A$
(7). $A=A+Tab_H[d_{15},d_{12},d_9]$ $\quad$ −F ⎫
(8). $A=A+Tab_L[d_6,d_3,d_0]$ $\quad$ +F ⎬ CANCEL

FIG. 39

| $W_1$ | |
|---|---|
| INDEX VALUES | TABLE VALUES |
| 0 | $-F$ |
| 1 | $2^{\lceil n/(2k) \rceil \times k} - F$ |
| 2 | $2^{\lceil n/(2k) \rceil \times k + \lceil n/(2k) \rceil} - F$ |
| ... | ... |
| $y$ | $(y_{k-1} \times 2^{(\lceil n/(2k) \rceil \times k + \lceil n/(2k) \rceil \times (k-1))} + y_{k-2} \times 2^{(\lceil n/(2k) \rceil \times k + \lceil n/(2k) \rceil \times (k-2))} + \ldots + y_1 \times 2^{(\lceil n/(2k) \rceil \times k + \lceil n/(2k) \rceil)} + y_0 \times 2^{(\lceil n/(2k) \rceil \times k)}) G - F$ |
| $2^k - 1$ | $(2^{(\lceil n/(2k) \rceil \times k + \lceil n/(2k) \rceil \times (k-1))} + 2^{(\lceil n/2k \rceil \times k + \lceil n/(2k) \rceil \times (k-2))} + \ldots + 2^{(\lceil n/(2k) \rceil \times k + \lceil n/(2k) \rceil)} + 2^{(\lceil n/(2k) \rceil \times k)}) G - F$ |

| INDEX VALUES | TABLE VALUES |
|---|---|
| 0 | $+F$ |
| 1 | $2^0+F$ |
| 2 | $2^{\lceil n/(2k)\rceil}+F$ |
| $\vdots$ | |
| y | $(y_{k-1}\times 2^{(\lceil n/(2k)\rceil\times(k-1))}+y_{k-2}\times 2^{(\lceil n/(2k)\rceil\times(k-2))}+\ldots+y_1\times 2^{\lceil n/(2k)\rceil}+y_0\times 2^0)G+F$ |
| $\vdots$ | |
| $2^k-1$ | $(2^{(\lceil n/(2k)\rceil\times(k-1))}+2^{(\lceil n/(2k)\rceil\times(k-2))}+\ldots+2^{\lceil n/(2k)\rceil}+2^0)G+F$ |

METHOD AND APPARATUS FOR ELLIPTIC CURVE CRYPTOGRAPHIC PROCESSING

CROSS-REFERENCE TO RELATED APPLICATION

This application is based upon and claims the benefit of priority of the prior Japanese Patent Application No. 2009-225534, filed on Sep. 29, 2009, the entire contents of which are incorporated herein by reference.

FIELD

The embodiments discussed herein relate to an elliptic curve cryptographic technique.

BACKGROUND

As information society advances, services based on information networks, such as electronic settlement and a basic resident register network are expected to be in widespread use. Information security techniques are essential to operate safely these services. Public key cryptosystems are used as a fundamental technology. A variety of public key cryptosystems are known. One of the main schemes is elliptic curve cryptography. Using the public key cryptosystem, services such as encryption, digital signature, and authentication function are used, and private information is protected from unauthorized accessing by a third party.

Smart cards are known as a device of a user in the services such as the electronic settlement and the basic resident register network. The smart card is a card having an integrated circuit (IC) chip. Private information of the user is stored on a memory area of the smart card. The IC chip of the smart card is provided with functions of encryption, digital signature, and authentication. When a process of these function is executed, the private information of the user is used as a key. Since the private information of the user is stored on the memory area of the card, the IC card is expected to dramatically increase security (tamper-resistance property) against unauthorized browsing by a third party.

However, weakness of the tamper resistance property of the smart card has been recognized since an analysis method called power analysis (PA) was found in 1998. The smart card performs an encryption process using the user private information as a key. The PA measures power consumption of the smart card in the middle of an encryption process, and then estimates and analyzes the user private information using the measured data.

The PA is known as a powerful analysis method. The necessity for a protective step against the PA has been described in a variety of international standards. For example, ISO15408 as the international security standard specifies in a protection profile (PP) for smart card that a step against the PA be essential. Since a PA attack is an attack to observe power, an attack target is not limited to the smart card. A PA is known which measures an electromagnetic wave generated by a personal digital assistant (PDA) that consumes power. The attack target of the PA can be any of the devices that consume power.

Some of the basics of the elliptic curve cryptography in the public key cryptosystem are described below, and how the PA is embodied is also described below.

Elliptic Curve Cryptography

Elliptic curve cryptography is encryption that uses computation of a rational point on an elliptic curve as illustrated in FIG. 1. Two elements, namely, a prime case and binary case, exist in an elliptic curve. Using two parameters, a and b, each element is described in the equations described below.

Prime case: $y^2 = x^3 + ax + b \pmod{p} (x,y,a,b \in GF(p)$, p: prime case) and binary case: $y^2 + yx = x^3 + ax^2 + b \pmod{f(x)} (x,y,a,b \in GF(2^m)$, $f(x)$: m-th order irreducible polynomial)

The elliptic curve of an prime case is described below, and this discussion is also equally applicable to an elliptic curve of the binary case.

A rational point on the elliptic curve is a set of (x,y) satisfying a relational equation of the elliptic curve. In the elliptic curve, two types of computations are defined, namely, an "addition of points" and a "doubling of point." A point is expressed by an affine representation based on a two-dimensional vector (x,y), and a representation (projective coordinates or Jacobian coordinates) based on a three-dimensional vector (X,Y,Z).

FIG. 2 illustrates an addition of two points, point P and point Q on the elliptic curve. Point R resulting from adding point P and point Q is defined as described below. A vertical line is drawn passing through the intersection of a line connecting point P and Point Q and the elliptic curve, and the intersection of the vertical line and the elliptic curve is defined as point R. In the addition of points on the elliptic curve, the commutative law (A+B=B+A) holds as in the standard integer addition. If a Z coordinate of one of the two points is 1 in the addition of points on the three dimensional vector representation, speed-up of the addition is possible. The subtraction of the points is also defined by P=R−Q. More specifically, a vertical line passing through point R is drawn, and a line connecting the intersection of the vertical line and the elliptic curve and point Q is drawn. The intersection of the line and the elliptic curve becomes point P.

A calculation process of the addition of points in the Jacobian coordinates is well known. As illustrated in detail in FIG. 3, steps 800 through 835 are performed to perform addition R of point A and point B on a prime case, R=ECADD(A,B)=A+B. It is noted that ECDBL(A)=A+A. Although the detailed discussion of the addition points in the Jacobian coordinates is omitted here, it is understood that the addition of points and the subtraction of points take more time than the addition and subtraction of integers.

FIG. 4 illustrates the doubling of point P on the elliptic curve. The doubling of point P is defined as below. A line tangent to point P on the elliptic curve is drawn, and a vertical line passing through the intersection of the tangential line and the elliptic curve is drawn. The intersection of the vertical line and the elliptic curve is defined as result R of the doubling operation.

FIGS. 5A and 5B illustrate a negative point and a point at infinity. As illustrated in FIG. 5A, a vertical line passing through point P is drawn, and the intersection of the vertical line and the elliptic curve is defined as the negative point "−P" of point P on the elliptic curve. Referring to FIG. 5B, the point at infinity is defined as the intersection of the line connecting point P and point −P and the elliptic curve. The infinity point O has the same property as that of zero in the addition of ordinary integers, i.e., A+O=O+A=A and 2O=O hold.

In the elliptic curve cryptography, an arithmetic operation using elliptic scalar multiplication of point is performed. The scalar multiplication of point is an operation to calculate point V on the elliptic curve satisfying V=xA where point A is on the elliptic curve and x is an integer called a scalar value, and represents private information. The scalar d multiplication of point A, if plotted in the same way as in FIGS. 1, 2, 4, and 5A and 5B, is illustrated in FIG. 6. More specifically, the scalar multiplication of point is performed based on the addition and doubling of points described above. In the case of the elliptic curve Diffie Hellman (ECDH) key exchange, a point on the elliptic curve serving as a public key of a communication partner is A, and a private key is d.

Secure key sharing is implemented by calculating point V on the elliptic curve satisfying V=dA. A third party not knowing the value of the private key d has difficulty in calculating the value of a correct public key. Here, d is the private key, and has a value that should not be leaked to a third party such as an attacker. The protection of the value of d is an important tamper resistance function. Even if the values other than d (i.e., A and V) are known, a calculation amount of d is too large mathematically. It is very difficult to solve d within the practical time scale (this is called the discrete logarithm problem). More specifically, if an elliptic curve parameter is 160 bits or larger, the value of d is difficult to solve even if the values of A and V are known.

The private key d is mathematically difficult to solve in this way, but the use of the PA allows the private key to be easily deciphered. The basic mechanism of the PA is closely related to the process step of the scalar multiplication of point. It is thus known that the use of the PA allows d to be deciphered bit by bit.

The d multiplication point V of point A on the elliptic curve (=dA) is calculated using the addition of points and the doubling of point described above. Such a calculation technique is not limited to the arithmetic operation on the elliptic curve but may find a variety of applications. More specifically, a binary method, a window method, and a comb window method are known. A scalar multiplication using the window method and the comb-type window method is described below.

FIG. 7 illustrates an algorithm of the elliptic scalar multiplication using the window method. Here, A=dG is determined based on point G on the elliptic curve and a scalar value d (having a 12-bit width). A window width of the window method is 3 bits, and the number of elements in a window table is $2^3$=8. More specifically, 0G=O (zero point) is mapped to an index value "000," $2^0$G is mapped to an index value "001," $2^1$G is mapped to an index value "010," $2^1$G+$2^0$G is mapped to an index value "011," $2^2$G is mapped to an index value "100," $2^2$G+$2^0$G is mapped to an index value "101," $2^2$G+$2^1$G is mapped to an index value "110," and $2^2$G+$2^1$G+$2^0$G is mapped to an index value "111."

An actual arithmetic operation of using such a window table is described below. A table value of the window table is read according to upper 3 bits of d as an index value in step (1). The read table value is substituted for a variable A. More specifically, (1) A=Tab[$d_{11}$,$d_{10}$,$d_9$] (Tab[x] represents a table value specified by [x]).

In step (2), $2^3$A is calculated in response to 3 bits as a shift width of the window, i.e., (2)A=$2^3$A. In step (3), a table value is read from the window table according to next 3 bits of d as an index, and the read table value is added to A. Step (3) is expressed as (3) A=A+Tab[$d_8$,$d_7$,$d_6$]. In step (4), $2^3$A is calculated in response to 3 bits as a shift width of the window. Step (4) is thus expressed as (4) A=$2^3$A. In step (5), a table value is read from the window table according to next 3 bits of d as an index, and the read table value is added to A. Step (5) is expressed as (5) A=A+Tab[$d_5$,$d_4$,$d_3$].

In step (6), $2^3$A is calculated in response to 3 bits as a shift width of the window. Step (6) is thus (6) A=$2^3$A. Finally, in step (7), a table value is read from the window table according to next 3 bits of d as an index, and the read table value is added to A. Step (7) is expressed as (7) A=A+Tab[$d_2$,$d_1$,$d_0$]=dG.

FIG. 8 illustrates a specific example of d=(101011101-001)$_2$. The window table remains unchanged. In step (1), a table value is read from the window table according to the upper 3 bits "101" of d as an index. The read table value is substituted for the variable A. Step (1) is expressed as (1)A=Tab[101]=($2^2$+$2^0$)G.

In step (2), $2^3$A is calculated in response to 3 bits as a window width. Step (2) is expressed as (2)A=$2^3$A=($2^5$+$2^3$)G. In step (3), a table value is read from the window table according to the next 3 bits "011" as an index, and the read value is added to A. Step (3) is expressed as (3) A=A+Tab[011]=($2^5$+$2^3$+$2^1$+$2^0$)G. In step (4), $2^3$A is calculated in response to the next 3 bits as a window width. Step (4) is expressed as (4)A=$2^3$A=($2^8$+$2^6$+$2^4$+$2^3$)G.

In step (5), a table value is read from the window table according to the next 3 bits "101" as an index, and the read value is added to A. Step (5) is expressed as (5) A=A+Tab[101]=($2^8$+$2^6$+$2^4$+$2^3$+$2^2$+$2^0$)G. In step (6), $2^3$A is calculated in response to 3 bits as a window width. In Step (6) is expressed as (6) A=$2^3$A=($2^{11}$+$2^9$+$2^7$+$2^6$+$2^5$+$2^3$)G. In step (7), a table value is read from the window table according to the next 3 bits "001" as an index, and the read value is added to A. Step (7) is expressed as (7) A=A+Tab[101]=($2^{11}$+$2^9$+$2^7$+$3^6$+$2^5$+$2^3$+$2^0$)G.

The scalar multiplication using the comb-type window method is described with reference to FIG. 9. As the name suggests, a comb-type window is set in the comb-type window method. In the standard window method, the table value) "($2^2$+$2^1$+$2^0$)G" mapped to an index value "111" is consecutive. In the comb-type window method, discrete values are registered in the window table. More specifically, 0G=O (zero point) is mapped to an index value "000," $2^0$G is mapped to an index value "001," $2^4$G is mapped to an index value "010," $2^4$G+$2^0$G is mapped to an index value "011," $2^8$G is mapped to an index value "100," $2^8$G+$2^0$G is mapped to an index value "101," $2^8$G+$2^4$G is mapped to an index value "110," and $2^8$G+$2^4$G+$2^0$G is mapped to an index value "111."

The specific calculation process steps using such a window table are described below. The $2^3$ multiplication calculation should be performed in the window method while the doubling calculation is advantageously sufficient in the comb-type window method. The number of doubling calculations of points in the elliptic scalar multiplication is reduced to one-third. Generally, in the comb-type window method having a k-bit window width, the number of doubling operations is reduced to 1/k.

In step (1), a table value of the window table is read according to 3 bits of d every 4 bits as an index value in step (1). The read table value is substituted for a variable A. More specifically, step (1) is expressed as (1) A=Tab[$d_{11}$,$d_7$,$d_3$]. In step (2), 2A is calculated in response to 1 bit as a shift width of the window, i.e., step (2) is expressed as (2)A=2A. In step (3), a table value is read from the window table according to an index value in which the index value is the next 3 bits obtained by right shifting by 1 bit the window from the state of step (1). The read table value is added to A. Step (3) is expressed as (3) A=A+Tab[$d_{10}$,$d_6$,$d_2$]. In step (4), 2A is calculated in response to a 1-bit window shift width. Step (4) is expressed as (4) A=2A.

In step (5), a table value is read from the window table according to an index value in which the index value is the next 3 bits obtained by right shifting by 1 bit the window from the state of step (3). The read table value is added to A. Step (5) is expressed as (5) A=A+Tab[$d_9$,$d_5$,$d_1$]. In step (6), 2A is calculated in response to a 1-bit window shift width. Step (6) is expressed as (6)A=2A. Finally, in step (7), a table value is read from the window table according to an index value in which the index value is the next 3 bits obtained by right shifting by 1 bit the window from the state of step (5). The read table value is added to A. Step (7) is expressed as (7) $A=A+Tab[d_8,d_4,d_0]=dG_o$.

FIG. 10 illustrates a specific example of $d=(101011101001)_2$. The window table remains unchanged. In step (1), a table value is read from the window table according to 3 bits "111" read from d from the most significant bit on a per 3-bit basis. The read table value is substituted for the variable A. Step (1) is thus expressed as (1) $A=Tab[111]=(2^8+2^4+2^0)G$.

In step (2), 2A is calculated in response to a 1-bit window shift width. Step (2) is expressed as $(2)A=A2A=(2^9+2^5+2^1)G$. In step (3), a table value is read from the window table according to an index value in which the index value is the next 3 bits "010" obtained by right shifting by 1 bit the window from the state of step (1). The read table value is added to A. Step (3) is expressed as (3) $A=A+Tab[010]=(2^9+2^5+2^4+2^1)G$. In step (4), 2A is calculated in response to a 1-bit window shift width. Step (4) is expressed as $(4)=2A=(2^{10}+2^6+2^7+2^5+2^2)$.

In step (5), a table value is read from the window table according to an index value in which the index value is the next 3 bits "110" obtained by right shifting by 1 bit the window from the state of step (3). The read table value is added to A. Step (5) is expressed as (5) $A=A+Tab[110]=(2^{10}+2^8+2^6+3^5+2^4+2^2)$. In step (6), 2A is calculated in response to a 1-bit window shift width. Step (6) is expressed as (6) $A=2A=(2^{11}+2^9+2^7+3^6+2^5+2^3)G$. Finally, in step (7), a table value is read from the window table according to an index value in which the index value is the next 3 bits "001" obtained by right shifting by 1 bit the window from the state of step (5). The read table value is added to A. Step (7) is expressed as (7) $A=A+Tab[001]=(2^{11}+2^9+2^7+2^6+2^5+2^3+2^0)G=dG$. The same result as that of FIG. 8 is thus obtained.

In the above-described comb-type window method, a single window table is used. A fast comb-type window method is available which speeds up the process by reducing even further the number of doubling operations with two window tables used in place of increasing an area of a storage table. Such the comb-type window method is discussed below with reference to FIGS. 11A and 11B.

An upper table for an upper half bit block of d and a lower table for a lower half bit block of d are prepared in such a comb-type window method. In the discussion that follows, d is 18 bits. More specifically, in the upper table, 0G=O (zero point) is mapped to an index value "000," $2^9G$ is mapped to an index value "001," $2^{12}G$ is mapped to an index value "010," $2^{12}G+2^9G$ is mapped to an index value "011," $2^{15}G$ is mapped to an index value "100," $2^{15}G+2^9G$ is mapped to an index value "101," $2^{15}G+2^{12}G$ is mapped to an index value "110," and $2^{15}G+2^{12}G+2^9G$ is mapped to an index value "111."

On the other hand, in the lower table, 0G=O (zero point) is mapped to an index value "000," $2^0G$ is mapped to an index value "001," $2^3G$ is mapped to an index value "010," $2^3G+2^0G$ is mapped to an index value "011," $2^6G$ is mapped to an index value "100," $2^6G+2^0G$ is mapped to an index value "101," $2^6G+2^3G$ is mapped to an index value "110," and $2^6G+2^3G+2^0G$ is mapped to an index value "111."

The arithmetic operation using the window table is specifically discussed as below. In step (1), 3 bits of the upper half bit block are extracted as an index value every 3 bits, and a table value is read from the upper table according to the index value. The read table value is substituted for the variable A. Step (1) is expressed as (1) $A=Tab_H[d_{17}, d_{14}, d_{11}]$. $Tab_H$ represents a table value of the upper table. In step (2), 3 bits of the lower half bit block are extracted as an index value every 3 bits, and a table value is read from the lower table according to the index value. The read table value is added to the variable A. Step (2) is expressed as (2) $A=A+Tab_L[d_8, d_5, d_2]$. $Tab_L$ represents a table value of the lower table.

In step (3), 2A is calculated in response to a 1-bit table shift width. Step (3) is expressed as (3)$A=2A$. In step (4), next 3 bits of the upper half bit block is extracted as an index value by right shifting the window from the state of step (1) by 1 bit, and a table value is read from the upper table according to the index value. The read table value is added to A. Step (4) is expressed as $(4)=A+Tab_H[d_{16}, d_{13}, d_{10}]$. In step (5), next 3 bits of the lower half bit block is extracted as an index value by right shifting the window from the state of step (2) by 1 bit, and a table value is read from the lower table according to the index value. The read table value is added to A. Step (5) is expressed as $(5)=A+Tab_L[d_7, d_4, d_1]$. In step (6), 2A is calculated in response to a 1-bit table shift width. Step (6) is expressed as (6)$A=2A$.

In step (7), next 3 bits of the upper half bit block is extracted as an index value by right shifting the window from the state of step (4) by 1 bit, and a table value is read from the upper table according to the index value. The read table value is added to A. Step (7) is expressed as $(7)=A+Tab_H[d_{15}, d_{12}, d_9]$. In step (8), next 3 bits of the lower half bit block is extracted as an index value by right shifting the window from the state of step (5) by 1 bit, and a table value is read from the lower table according to the index value. The read table value is added to A. Step (8) is expressed as $(8)=A+Tab_L[d_6, d_3, d_0]=dG$.

The bit length becomes longer than the bit length of d in FIG. 9. In contrast to the 3-bit width of FIG. 9, the window table having a 6-bit length is used. The number of doubling operations is reduced.

In the window method and the comb-type window method, the table value is O (infinity point) in response to an index value of "000" in the window table. The measured power consumption of a device executing the scalar multiplication is diagrammatically illustrated in FIGS. 12A and 12B. If the index value is non-zero (C=A+B), a waveform of FIG. 12A is obtained, and if the index value is zero, a waveform of FIG. 12B (C=A+O) is obtained. Distinctively different waveforms result. This is because a special arithmetic operation is performed in the addition to O point. The power consumption waveform contributes to a leakage of information that a partial bit value of d as the private information is 0.

A mathematical algorithm that deciphers all the bits of the private key d using the partial bit value of "0" of d is known. It is also known that if the scalar multiplication is used in digital signature generation, a private key for digital signature leaks.

It is thus extremely important that any of the bits of d as the private key should not be leaked in the calculation of A=dG.

A digital signature generation method of using the elliptic curve digital signature algorithm (ECDSA) is known as a typical process of the elliptic curve cryptography based on the elliptic scalar multiplication. FIG. 13 illustrates an algorithm of this process. This process outputs $h_i$, and signature data $(u_i,v_i)$ by performing a calculation process including receiving a private key s for signature, and signature target data $h_i$, generating a temporary random number $d_i$, and performing an elliptic scalar multiplication $d_iG$ (G is called a base point and is publicly disclosed). Here, i is a variable representing the number of processes for signature generation, r represents a publicly disclosed prime number, and $d_i^{-1}$ is an integer satisfying $d_i^{-1} \times d_i = 1 \pmod r$.

ECDSA signature may be applied to a device such as a smart card, and the private key s for signature and the temporary random number $d_i$ are not observed from the outside. The private key s for signature is a particularly important information resource, and must be strictly protected. However, if an attacker has successfully collected a large number of data units of several upper bits or lower bits of the temporary random number $d_i$ using the attack method proposed by Howgrave-Graham et al. as illustrated in FIG. 14, the private key s for signature can be deciphered by combining the collected data and data $h_i$ and $(u_i, v_i)$ output to the outside.

The value of the temporary random number $d_i$ cannot be observed from the outside. If an attacker having the SPA (simple PA) capability uses the SPA while the elliptic scalar multiplication $d_i G$ is performed, the most significant bits or the least significant bits of the temporary random number $d_i$ can be deciphered. If the results are combined with the attack method proposed by Howgrave-Graham et al., the attacker can decipher the private key s. In view of such a combined attack, it is essential that not even one bit of the information related to the temporary random number $d_i$ be leaked even if the SPA is applied to the calculation of $d_i G$.

To prevent the value of d as the secret information from being leaked, the power consumption waveforms for the non-zero index value (C=A+B) and the zero index value (C=A+O) are set to be identical to each other such that the attacker cannot differentiate the two waveforms. Available as such a technique is the dummy operation technique proposed by Coron et al. FIG. 15 diagrammatically illustrates the dummy operation technique in the comb-type window method. The basic operation of the dummy operation technique is identical to the operation discussed with reference to FIG. 9. In the dummy operation technique, except step (1), a process step is performed to determine whether an index value, if determined from d, is "000." If the index value of the table is "000," a non-zero table value is added to a variable B for dummy rather than to the variable A to which the non-table value is to be otherwise added. If the index value is "000" (a value other than "000" may also acceptable) in each of steps (3), (5) and (7) as illustrated in FIG. 15, the sum of A and a table value responsive to an index value of "001" is stored. In this way, the power consumption waveform responsive to the index value of "000" is set to be equal to the waveform for the non-zero value. The leakage of the private information d is prevented.

The dummy operation technique protects the private information d against the PA, and causes no increase in the amount of calculation in comparison with the case where no PA resistance mode is incorporated. However, the dummy variable B is needed. Since the dummy operation needs to be performed not to destroy interim data stored as the variable A, the variable B is thus stored on an area separate from that of the variable A. If no PA resistance mode is incorporated, a storage area (random-access memory: RAM) for only the variable A is needed. The dummy operation needs a RAM storing the variable A and the variable B. In other words, double RAMs are needed. The RAM resource of the smart card is typically limited in comparison with the ROM resource. It is very important to reduce the capacity requirement for the RAM.

SUMMARY

According to an aspect of the embodiment, an elliptic curve cryptographic processing apparatus performing a scalar multiplication of a specific point G on an elliptic curve, includes, a data storage that stores a window table, the window table storing a table value with an index value mapped to the table value, the index value having the same number of bits as a window width of k bits (k being an integer of 2 or larger) of a window to a scalar value d of n bits (n being an integer of 2 or larger), the table value being a sum of a basic table value and a non-zero table correction value, the basic table value being obtained by multiplying the point G by a sum of products, each product obtained by multiplying the value of each bit of the index value by 2 to the power of a value, the value corresponding to a relative bit position of the bit of the index value within the scalar value d, an arithmetic processor that generates the index value by reading from the scalar value d the bit value at the bit position assigned to each bit of the window with the window being shifted, reading the table value by searching the window table according to the index value, and performs a doubling operation and an addition operation using the read table value, and a corrector that performs a correction on arithmetic results of the arithmetic processor with a specific correction value responsive to the table correction value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates a specific algorithm of the addition operation on the elliptic curve;

FIG. 11B illustrates an algorithm of the elliptic scalar multiplication based on the comb-type window method with two windows used;

FIG. 13 illustrates an example of signature generation process algorithm;

FIG. 18A illustrates a specific example of a window table of Embodiment 1-A, and FIG. 18B illustrates a specific example of a calculation process of Embodiment 1-A;

FIG. 19 illustrates a generalized window table of Embodiment 1-A;

FIG. 24A specifically illustrates a window table of Embodiment 2-A and FIG. 24B specifically illustrates a calculation process of Embodiment 2-A;

FIG. 25 illustrates a generalized window table of Embodiment 2-A;

FIG. 30A illustrates a specific window table of Embodiment 3, and FIG. 30B illustrates a specific calculation process of Embodiment 3;

FIG. 31 illustrates a generalized window table of Embodiment 3;

FIG. 34A illustrates a specific example of window table of Embodiment 4, and FIG. 34B illustrates a specific example of a calculation process of Embodiment 4;

FIG. 35 illustrates a generalized window table of Embodiment 4;

FIGS. 38A and 38B illustrate specific examples of the window table of Embodiment 5, and FIG. 38C illustrates a specific example of the calculation process of Embodiment 5;

FIG. 39 illustrates a generalized window table of Embodiment 5;

FIG. 40 illustrates a generalized window table of Embodiment 5;

DESCRIPTION OF EMBODIMENTS

Figure 16:
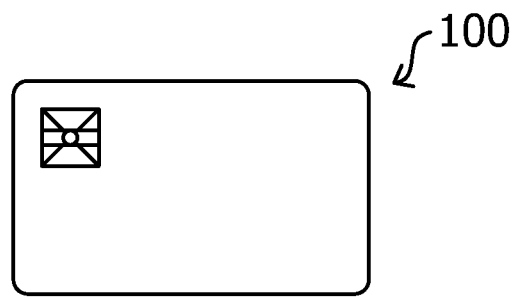
FIG. 16 illustrates a smart card as one example of an elliptic curve cryptographic processing apparatus.

An elliptic curve cryptographic processing apparatus 100 of embodiments is implemented as a smart card as illustrated in FIG. 16. The elliptic curve cryptographic processing apparatus 100 may also be implemented as a compact device such as a cellular phone or a personal digital assistant, or another apparatus such as a personal computer.

Embodiment 1-A

Figure 17:
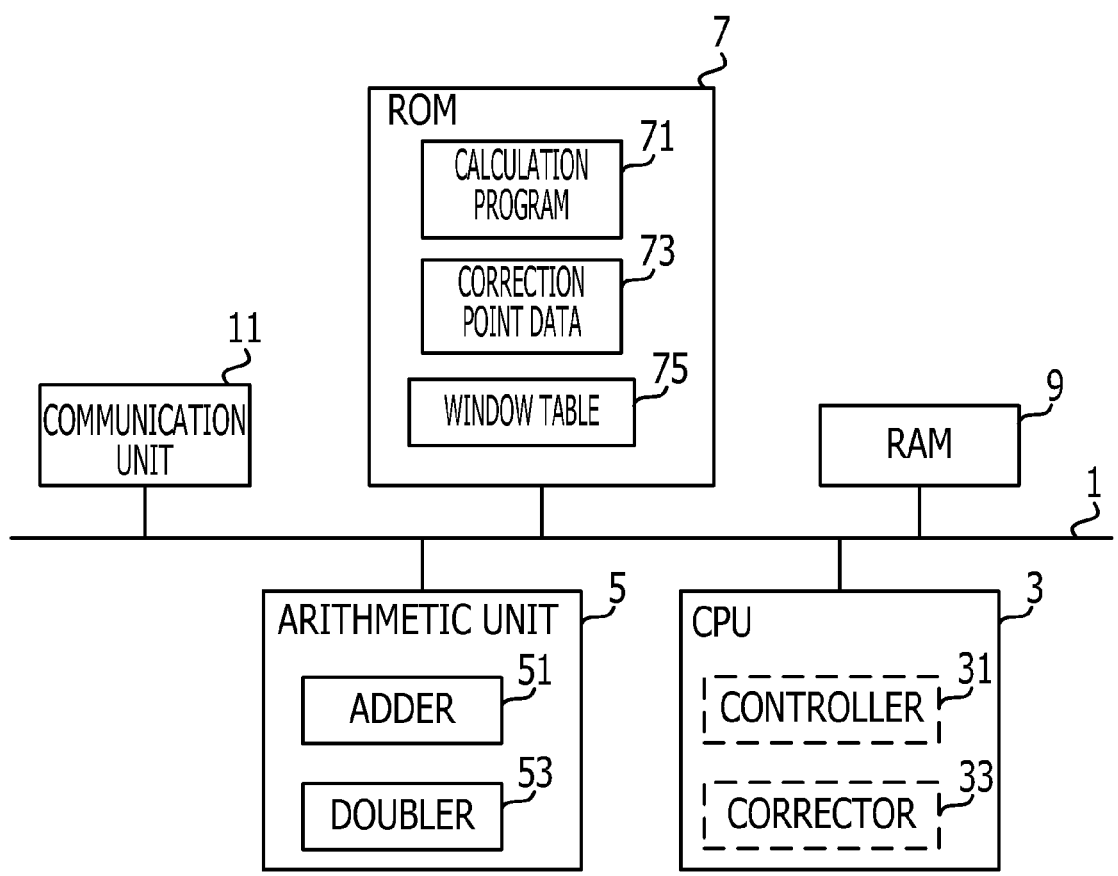
FIG. 17 illustrates a structure of an elliptic curve cryptographic processing apparatus of Embodiment 1-A.

FIG. 17 illustrates a structure of the elliptic curve cryptographic processing apparatus 100 of Embodiment 1-A. The elliptic curve cryptographic processing apparatus 100 includes a central processing unit (CPU) 3, an arithmetic unit 5, a read-only memory (ROM) 7, a random-access memory (RAM) 9, and a communication unit 11 mutually connected to each other via a bus 1. The ROM 7 stores a calculation program 71 for causing the CPU 3 to perform a process to be discussed below, correction point data 73 to be discussed below, and a window table 75 to be discussed below based on a window table of a standard window method. The arithmetic unit 5 includes an adder 51 performing an addition operation ECADD(A,B) on points on the known elliptic curve, and the doubler 53 performing a doubling operation ECDBL(A) on a point on the known elliptical curve. When the CPU 3 executes the calculation program 71, the controller 31 and the corrector 33 performing a correction process on calculation results described below are implemented. The communication unit 11 for communicating with an external apparatus is also illustrated. A device for performing another function may be included. The RAM 9 stores data the CPU 3 uses to perform a variety of processes. In accordance with the present embodiment, the RAM 9 provides an area for a variable A that is used to calculate a scalar value d multiplication of a base point G on the elliptic curve. Data used for calculation may be also stored on the RAM 9. The RAM 9, for example, might have no extra area dedicated to tamper resistance.

Figure 1:
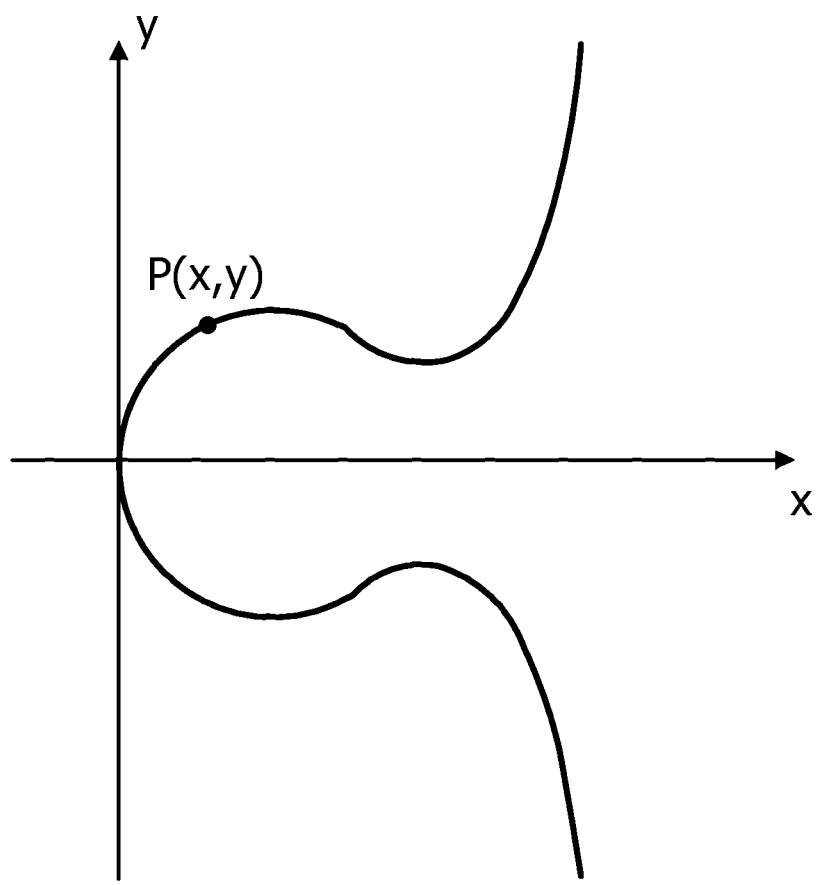
FIG. 1 illustrates an elliptic curve.
Figure 2:
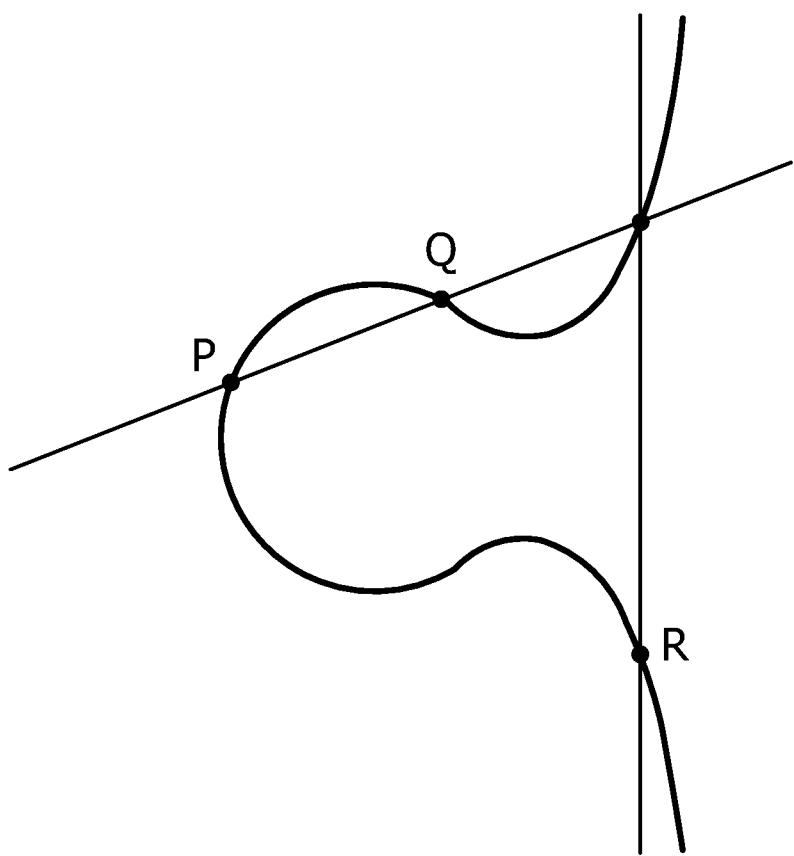
FIG. 2 illustrates an addition operation on the elliptic curve.
Figure 4:
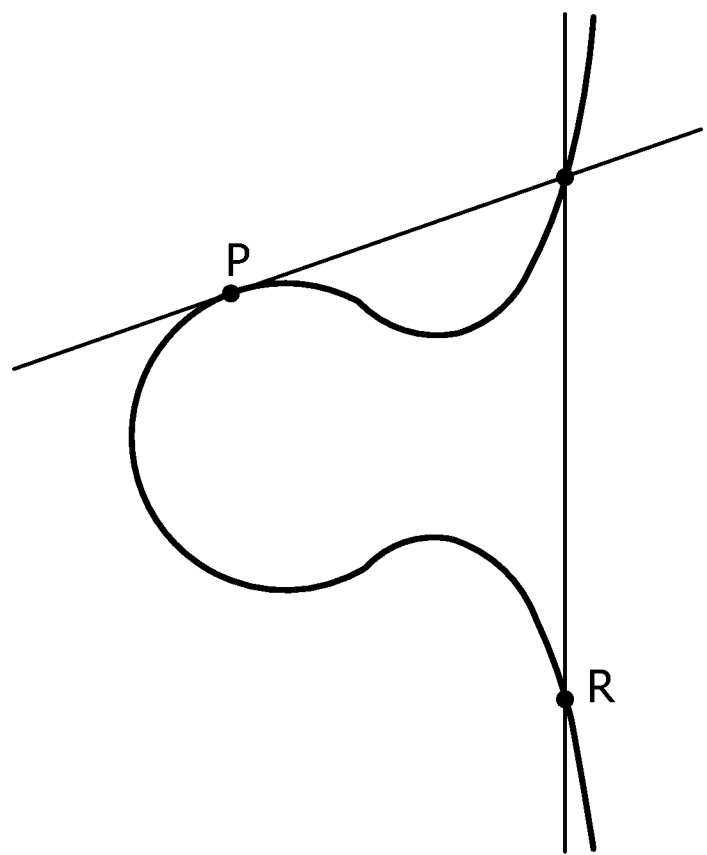
FIG. 4 illustrates a doubling operation on the elliptic curve.
Figure 5A:
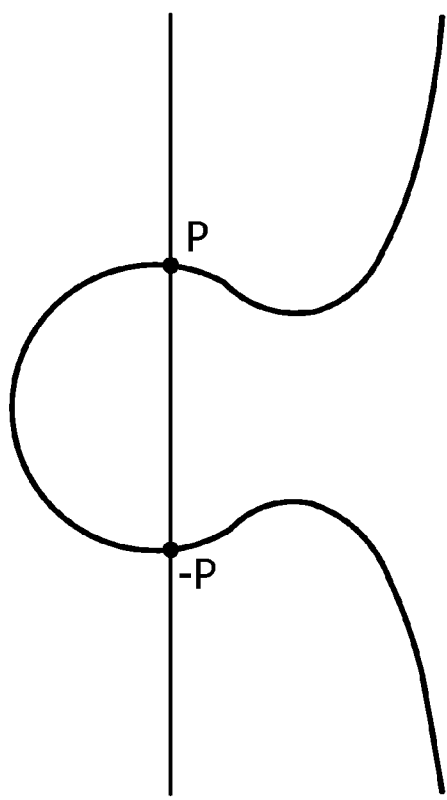
FIG. 5A illustrates a negative point on the elliptic curve.
Figure 5B:
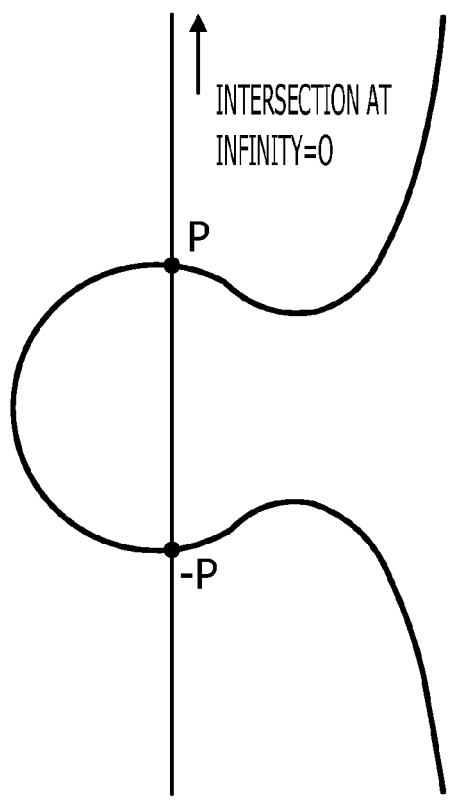
FIG. 5B illustrates an infinity point.
Figure 6:
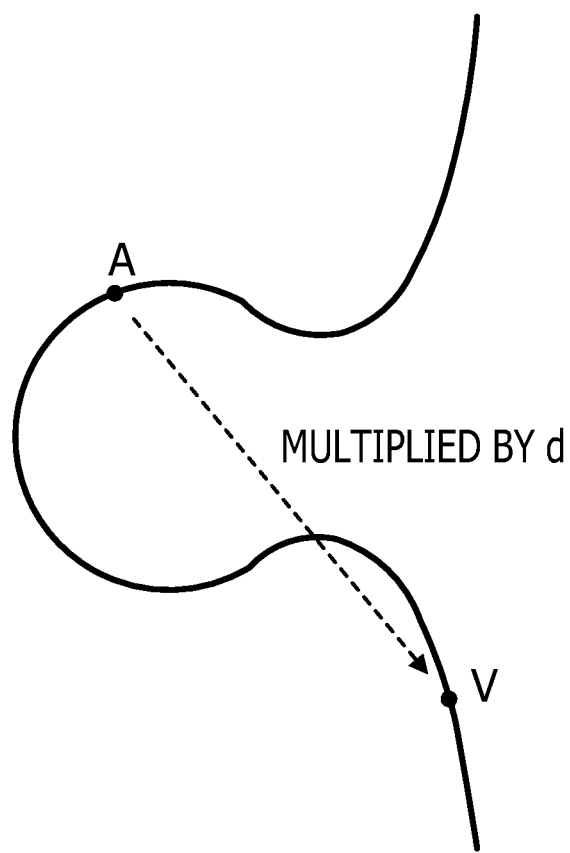
FIG. 6 illustrates an elliptic scalar multiplication on the elliptic curve.
Figure 7:
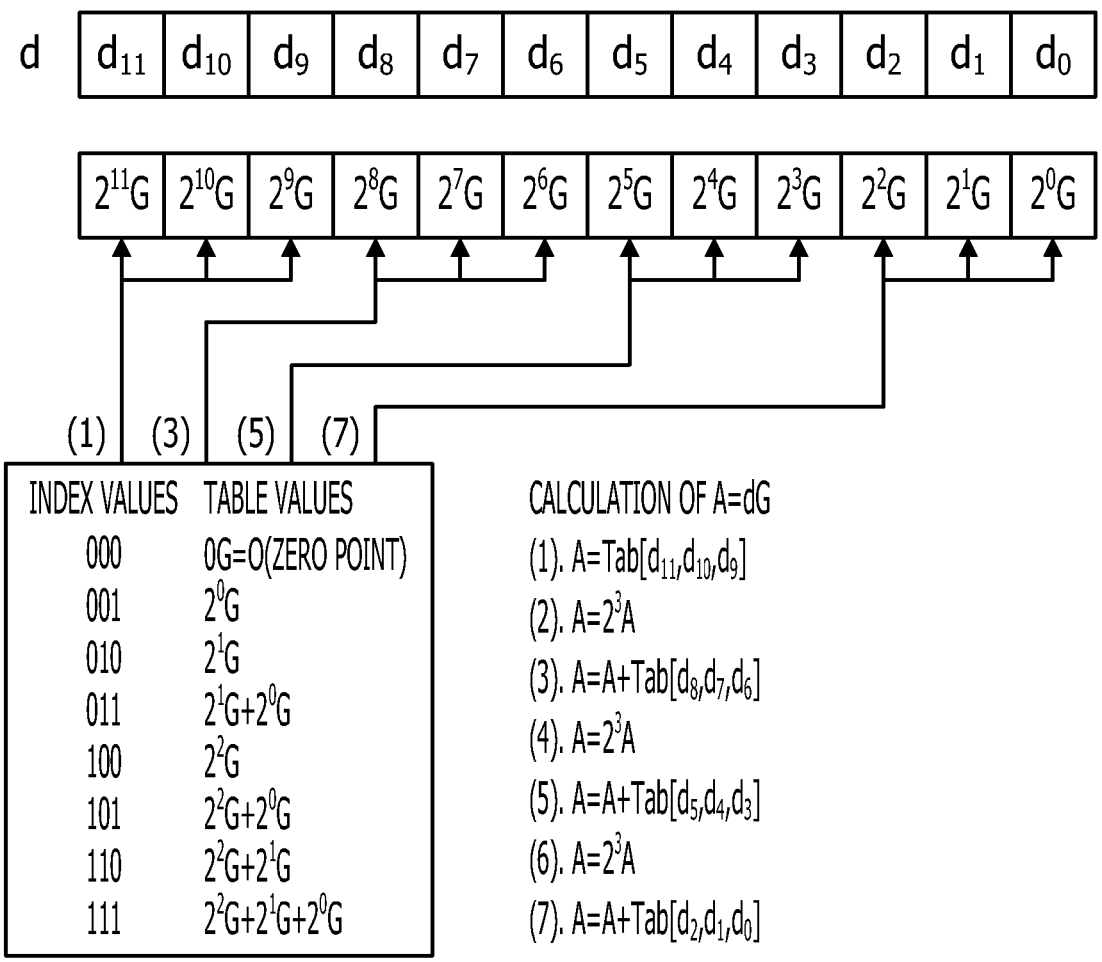
FIG. 7 illustrates a summary of an algorithm of the elliptic scalar multiplication based on a window method.
Figure 8:
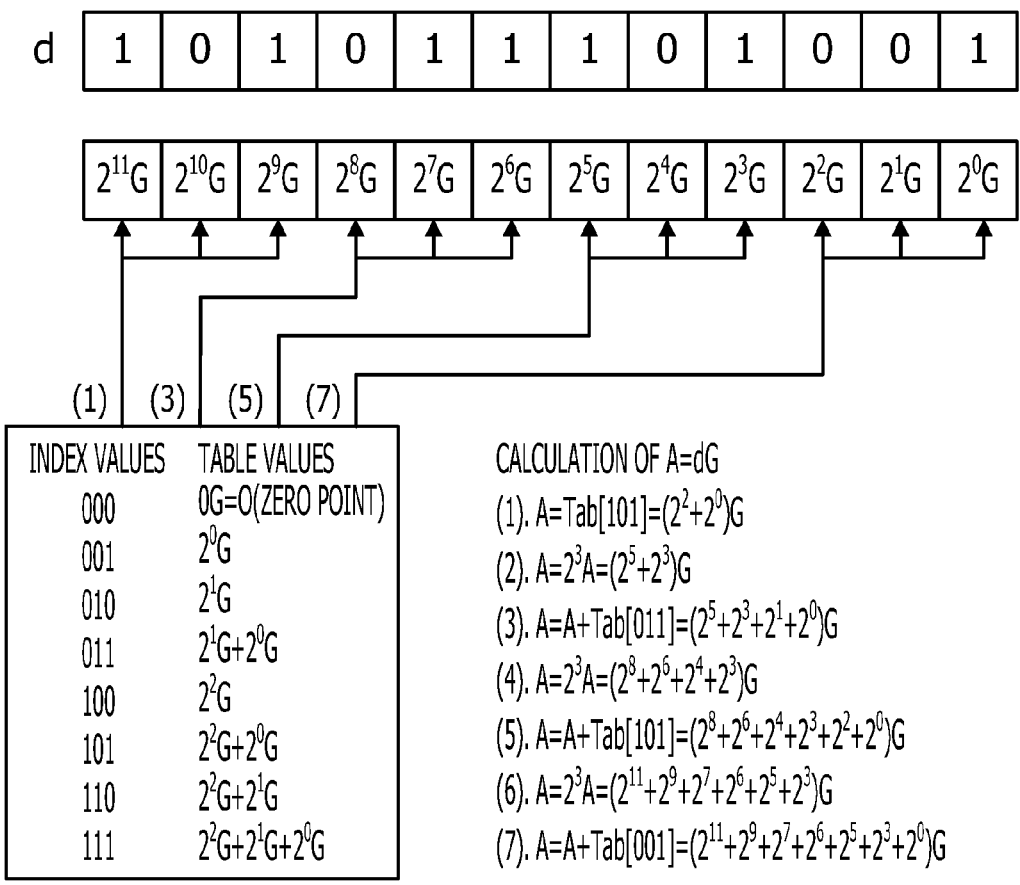
FIG. 8 specifically illustrates the elliptic scalar multiplication based on the window method.

A specific (example) calculation process of Embodiment 1-A is described first. FIG. 18A illustrates the contents of the window table 75 for the specific calculation process. As illustrated in FIG. 18A, the scalar value d multiplication of the point G on the elliptic curve is calculated. A scalar value d is 12 bits, and a window width is 3 bits. The number of elements of the window table 75 is $2^3=8$. In comparison with the case where no PA resistance mode is incorporated as in FIG. 7, FIG. 18A illustrates a table correction value F to each table value.

More specifically, $0G+F=F$ is mapped to an index value "000," $2^0G+F$ is mapped to an index value "001," $2^1G+F$ is mapped to an index value "010," $2^1G+2^0G+F$ is mapped to an index value "011," $2^2G+F$ is mapped to an index value "100," $2^2G+2^0G+F$ is mapped to an index value "101," $2^2G+2^1G+F$ is mapped to an index value "110," and $2^2G+2^1G+2^0G+F$ is mapped to an index value "111." The table correction value F is a point on the elliptic curve but the table correction value may be any point. For example, if x is a scalar value, the table correction value F may be a point xG. The table correction value F must be a non-zero point.

A general table value may be expressed by an equation. The upper bit of the index value corresponds to $2^2G$, the second bit corresponds to $2^1G$, and the third bit corresponds to $2^0G$. Depending on 0 or 1 of each bit of the index value, $2^2G$, $2^1G$, and $2^0G$ may or may not be added. The power index of 2 is set in response to a relative bit position in the scalar value d assigned to each bit of the window (i.e., the index value). In accordance with the embodiment as described below, the bit values of the three consecutive bits of the scalar value are read. The power index of the least significant bit of the window is "0," the power index of the second bit is "1," and the power index of the most significant bit is "2."

Specific calculation process steps using the window table 75 is illustrated in FIG. 18B. In step (1), a table value is read from the window table 75 according to the upper 3 bits as an index value. The table value is then substituted for a variable A. Step (1) is expressed as (1) $A=\text{Tab}[d_{11}, d_{10}, d_9]$. (Tab[x] denotes a table value specified by [x]).

In step (2), $2^3A$ is calculated in response to 3 bits as a window shift width. Step (2) is expressed as (2) $A=2^3A$. In step (3), a table value is read from the window table 75 according to the next 3 bits as an index value and is added to A. Step (3) is expressed as (3) $A=A+\text{Tab}[d_8, d_7, d_6]$. In step (4), $2^3A$ is calculated in response to 3 bits as a window shift width. Step (4) is expressed as (4) $A=2^3A$. In step (5), a table value is read from the window table 75 according to the next 3 bits of d as an index value and is added to A. Step (5) is expressed as (5) $A=A+Tab[d_5, d_4, d_3]$.

In step (6), $2^3A$ is calculated in response to 3 bits as a window shift width. Step (6) is expressed as (6) $A=2^3A$. In step (7), a table value is read from the window table 75 according to the next 3 bits of d as an index value and is added to A. Step (7) is expressed as (7) $A=A+Tab[d_2, d_1, d_0]$.

The process steps heretofore remains unchanged from those discussed with reference to FIG. 7. Since $(001001001001)_2F$ has been added to each value of the window table 75, the calculation result of step (7) also includes additional F. The additional F is thus subtracted from the calculation result of step (7). In accordance with the window method of the present embodiment, $(001001001001)_2F$ is used as the correction point data 73, and $A=A-(001001001001)_2F$ is calculated.

Figure 12A:
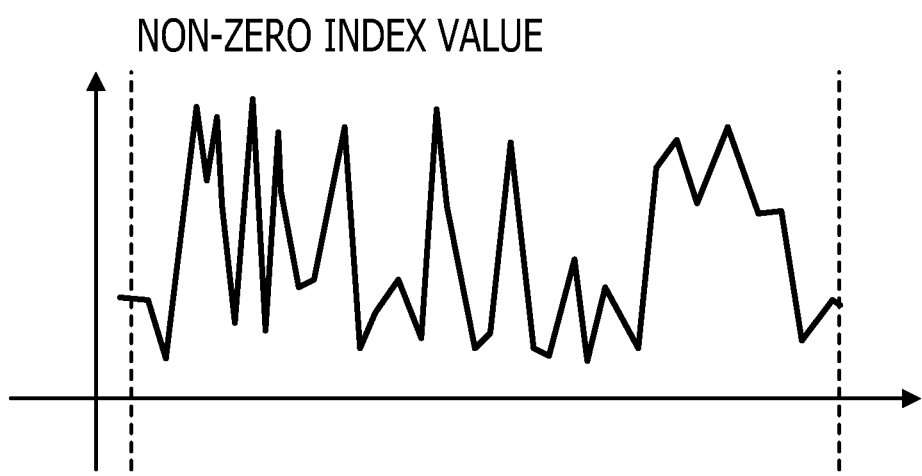
FIG. 12A illustrates a power consumption waveform diagram with an index value being non-zero.
Figure 12B:
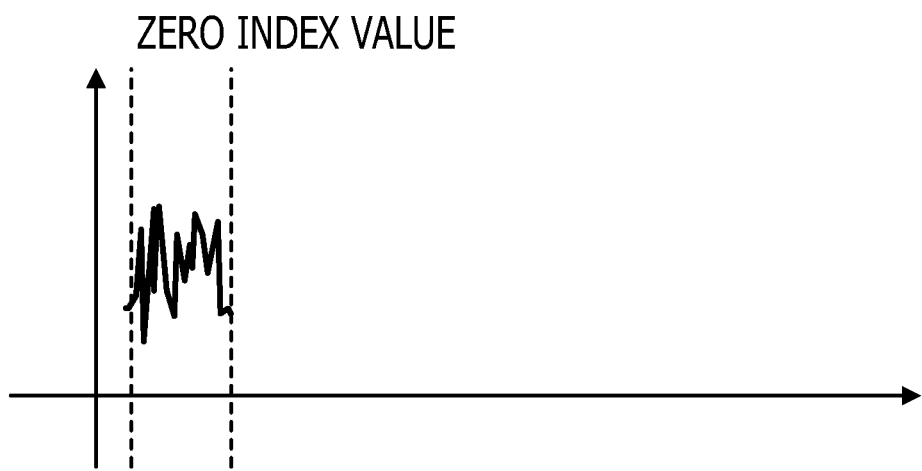
FIG. 12B illustrates a power consumption waveform diagram with an index value being zero.
Figure 14:
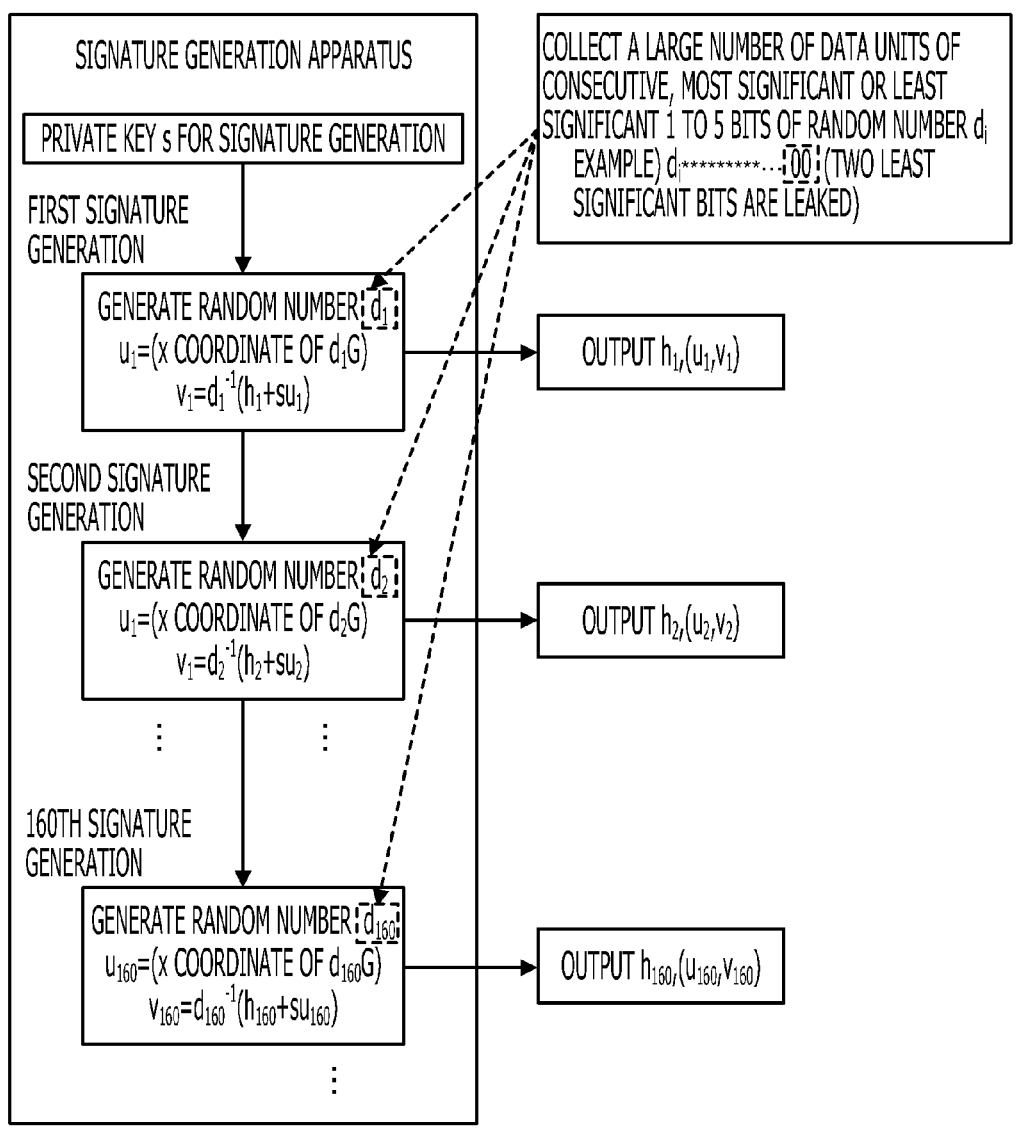
FIG. 14 illustrates how a bit value is stolen in a signature generation process.
Figure 15:
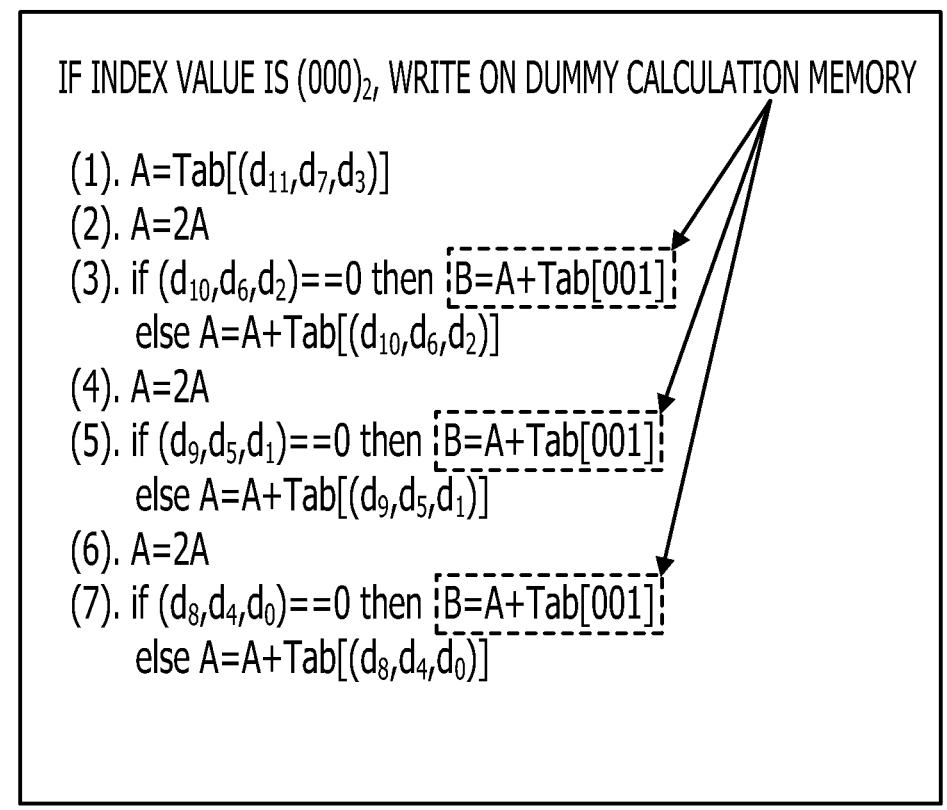
FIG. 15 illustrates a dummy operation technique as a related art technique.

The process steps are basically identical to those with no PA resistance mode incorporated, except process step (8). Since the table value "F" is also read in response to the index value "000," the addition of zero is not performed. In other words, the power consumption waveforms of FIG. 12B do not appear. The embodiment is free from an increase in the RAM area for the variable, which the dummy operation method needs.

FIG. 19 illustrates a generalized version of the window table 75 illustrated in FIGS. 18A and 18B. The index value y is $(y_{k-1}\|y_{k-2}\|\ldots y_1\|y_0)$. The bit at the x-th from the right is represented by $y_{x-1}$. The window width is k bits.

Referring to FIG. 19, the table value responsive to the index value y is expressed as follows:

$$(y_{k-1}\times 2^{k-1}+y_{k-2}\times 2^{k-2}+\ldots+y_1\times 2^1+y_0\times 2^0)G+F$$

As discussed above, the j-th bit of the index value of k bits from the right corresponds to $y_{j-1}\times 2^{j-1}$. In the case of the window method, the consecutive k bits are read from the scalar value d. The power index of 2 at the j-th bit of the k-bit index value from the right is a relative bit position (j−1) assigned to the j-th bit.

The table value at the index value "0" is the table correction value "F," the table value at the index value "1" is $2^0G+F$ because only $y_0$ is "1," and the table value at the index value "2" is $2^1G+F$ because only $y_1$ is "1." The table value responsive to the index value "$2^k-1$" is $(2^{k-1}+2^{k-2}+\ldots+2^1+2^0)G+F$ because all $y_{k-1}$ through $y_0$ are 1's.

Figure 20:
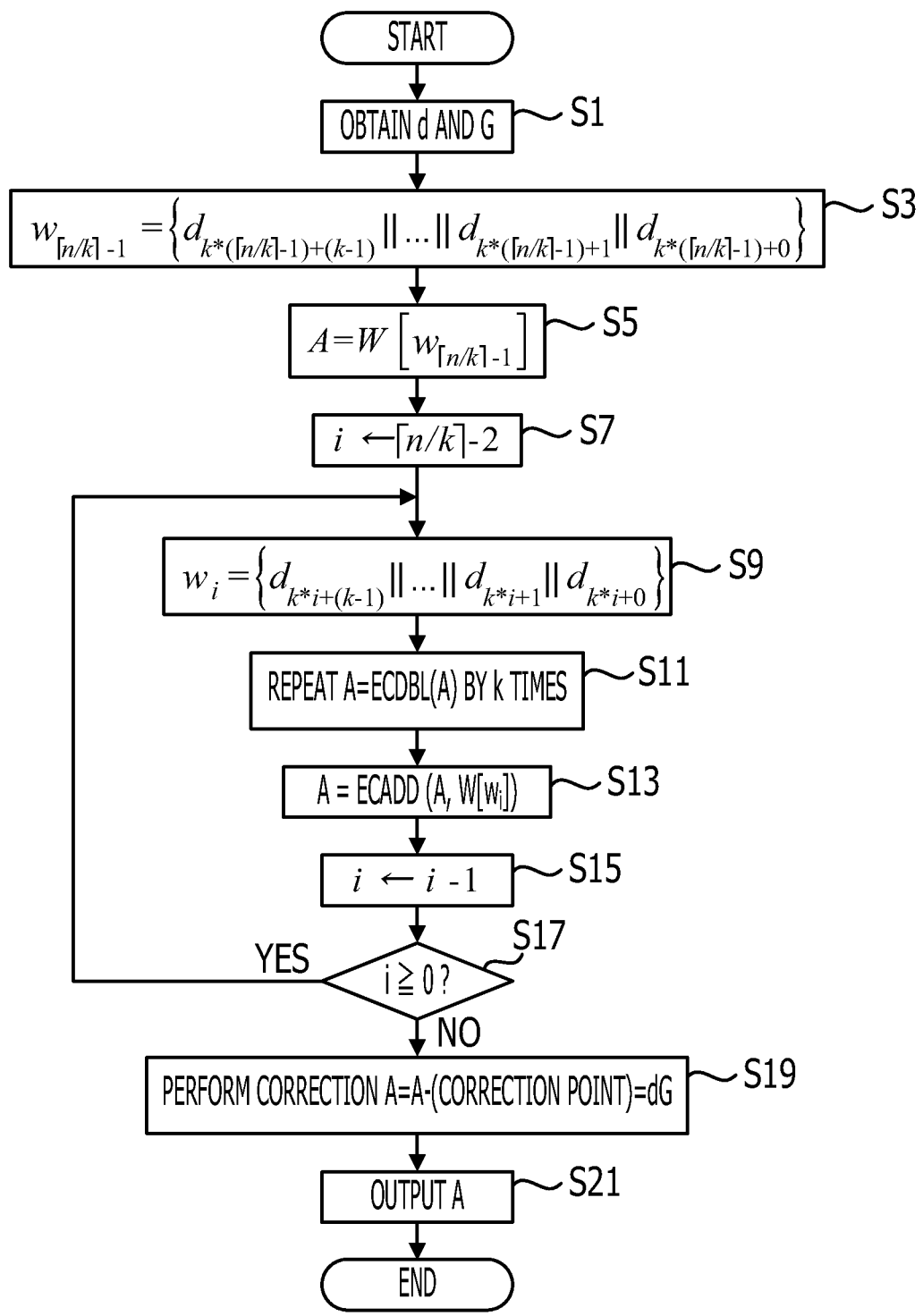
FIG. 20 is a flowchart of a process of Embodiment 1-A.

Referring to FIG. 20, a process flow of the elliptic curve cryptographic processing apparatus is described. The controller 31 reads the n-bit scalar value d and the base point G on the elliptic curve from the RAM 9 and/or the ROM 7 (S1). The controller 31 reads the values in a k-bit width window from the most significant bit of the scalar value d and acquires the index value (S3). If the scalar value d is represented as $\{d_{n-1}\|d_{n-2}\|\ldots d_1\|d_0\}$, the value $w_{\lceil n/k\rceil-1}$ read from the scalar value d is represented as below:

$$w_{\lceil n/k\rceil-1}=\{d_{k*(\lceil n/k\rceil-1)+(k-1)}\|\ldots d_{k*(\lceil n/k\rceil-1)+1}\| d_{k*(\lceil n/k\rceil-1)+0}\}$$

where $\lceil n/k\rceil$ represents the minimum integer equal to or larger than n/k. For example, if n=12 and k=3, $\lceil n/k\rceil=4$. Also, $k*(\lceil n/k\rceil-1)+(k-1)=3*3+(3-1)=11$. If d is 12 bits, 11 is the most significant bit.

The controller 31 reads from the window table 75 a table value responsive to the index value $w_{\lceil n/k\rceil-1}$ and sets as a variable A (S5). The variable A is thus represented as below:

$$A=W[w_{\lceil n/k\rceil-1}]$$

where W[z] is a table value mapped to an index value z in the window table 75.

The controller 31 sets $\lceil n/k\rceil-2$ on a counter i (S7).

The controller 31 further reads values in a k-bit width window at a bit position defined by the counter i in the scalar value d and thus acquires an index value (S9).

The value $w_i$ to be read from d is represented as below:

$$w_i=\{d_{k*i+(k-1)}\|\ldots d_{k*i+1}\|d_{k*i+0}\}$$

The position of the window is thus right-shifted by k bits.

The controller 31 causes the doubler 53 in the arithmetic unit 5 to perform the doubling operation on the variable A by k times (k being a right shift width of the window) (S11). Referring to FIG. 20, ECDBL (elliptic curve doubling) (A) represents the doubling operation of A on the elliptic curve. The doubling operation is known and not discussed further here.

The controller 31 causes the adder 51 in the arithmetic unit 5 to perform the addition operation on the variable A, and a table value $W[w_i]$ obtained from searching the window table 75 according to the index value $w_i$ (S13). Referring to FIG. 20, ECADD (elliptic curve add) (A) represents the addition operation of A and $W[w_i]$ on the elliptic curve. The addition operation is known and is not further discussed here.

The controller 31 decrements the value of the counter i by 1 (S15), and determines whether i equals 0 or above (S17). If it is determined that i equals 0 or above, the controller 31 returns to S9. Process steps S9 through S17 are repeated until i becomes less than 0.

If i becomes less than 0, the corrector 33 performs a correction process (S19). Equation A=A−correction point=dG holds. As described above, the correction point is obtained by multiplying a value, which results from arranging a k-bit bit train with only the least significant bit being "1" by $\lceil n/k\rceil$ times ($\lceil n/k\rceil*k$ bits in total), by point F on the elliptic curve. The correction point data 73 can be obtained, for example, read from the ROM 7 and is used for the above calculation. The corrector 33 performs the calculation using the arithmetic unit 5, and the detail of the calculation is known and not discussed any further.

The controller 31 outputs the value of the variable A thus obtained to a specified output destination (S21). The value of the variable A may be output to the outside via the communication unit 11, or may be output to another arithmetic program to be used in processing.

As described above, the non-zero table value is added to the ordinary table value on the window table 75, and the resulting table value is corrected in S19. In this way, the same calculation is repeated to any scalar value d. More specifically, none of the bits of the scalar value d can be stolen through the PA. Since only S19 is added as a process step, no substantial performance drop in terms of process speed results in comparison with the case where no PA resistance mode is incorporated. An area of the RAM 9 used in this process remains unchanged from the RAM area that is used when no PA resistance mode is incorporated. For example, an area of the ROM 7 used in this process could increase by an amount responsive to the correction point data 73, but the amount of increase is not so large. In the smart card where the RAM is more limited in capacity than the ROM, the present embodiment is particularly effective.

Embodiment 1-B

Figure 21:
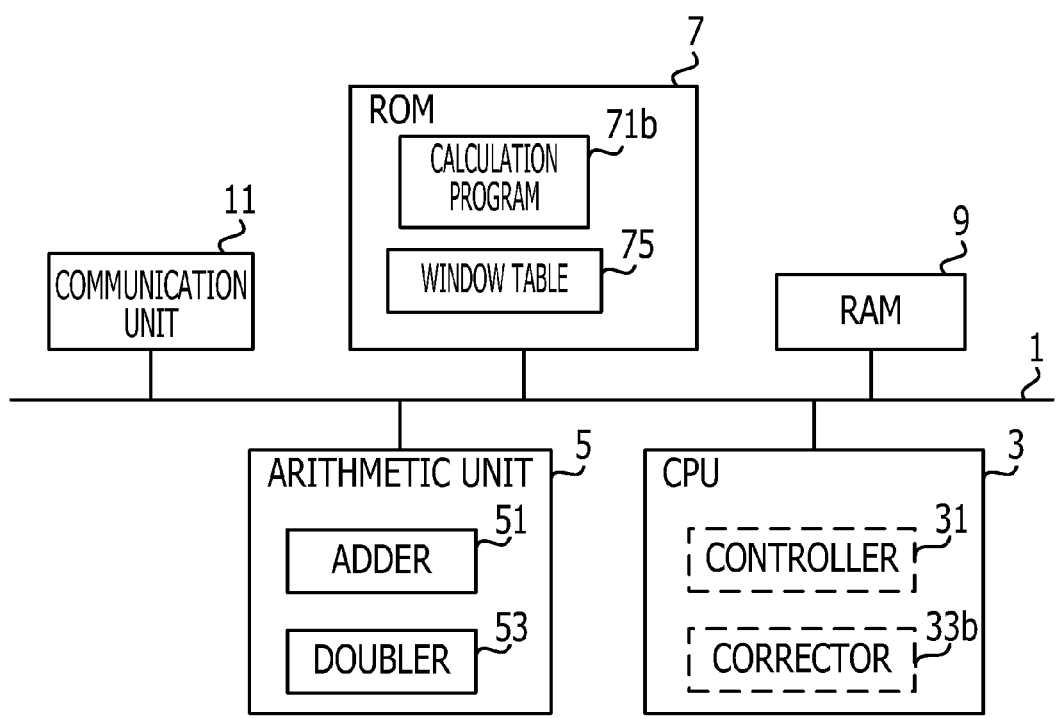
FIG. 21 illustrates a structure of an elliptic curve cryptographic processing apparatus of Embodiment 1-B.

Embodiment 1-B is a modification of Embodiment 1-A. The structure of the elliptic curve cryptographic processing apparatus 100 of Embodiment 1-B is illustrated in FIG. 21. Referring to FIG. 21, elements identical to those illustrated in FIG. 17 are designated with the same reference numerals.

Embodiment 1-B is different from Embodiment 1-A in that the ROM 7 stores no correction point data 73. The absence of the correction point data 73 causes the arithmetic program of Embodiment 1-B to be different from that of Embodiment 1-A.

The elliptic curve cryptographic processing apparatus 100 includes the CPU 3, the arithmetic unit 5, the ROM 7, the RAM 9, and the communication unit 11, mutually connected to each other via the bus 1. The ROM 7 stores a calculation program 71$b$ for causing the CPU 3 to perform a process to be discussed below, and the window table 75. The arithmetic unit 5 includes the adder 51, and the doubler 53. When the CPU 3 executes the calculation program 71$b$, the controller 31 and a corrector 33$b$ performing a correction process on calculation results described below are implemented. The data contents stored on the window table 75 are identical to those in Embodiment 1-A.

Figure 22:
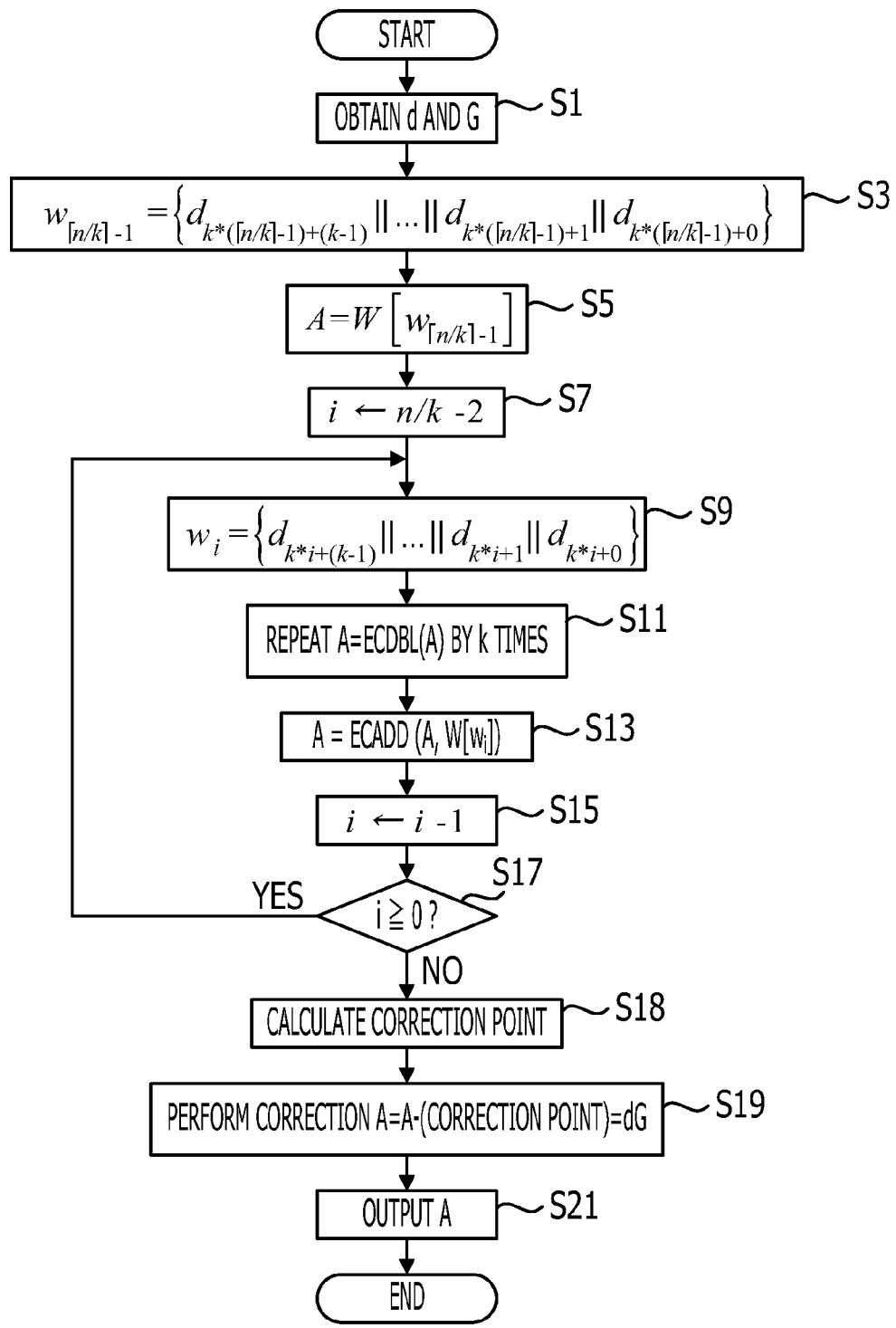
FIG. 22 is a flowchart of a process of Embodiment 1-B.

Referring to FIG. 22, a process flow of the elliptic curve cryptographic processing apparatus 100 is described. Process steps identical to those in FIG. 20 are designated with the same reference symbols. The controller 31 reads the n-bit scalar value d and the base point G on the elliptic curve from one of the RAM 9 and the ROM 7 (S1). The controller 31 reads the values in a k-bit width window from the most significant bit of the scalar value d and acquires value $w_{\lceil n/k \rceil -1}$ (S3).

The controller 31 reads a table value responsive to the index value $w_{\lceil n/k \rceil -1}$ from the window table 75 and sets the table value for the variable A (S5).

The controller 31 sets $\lceil n/k \rceil -2$ on a counter i (S7).

The controller 31 further reads values in a k-bit width window at a bit position defined by the counter i in the scalar value d and thus acquires an index value $w_i$ (S9). The position of the window is thus right-shifted by k bits, and the bit value is read.

The controller 31 causes the doubler 53 in the arithmetic unit 5 to perform the doubling operation on the variable A by k times (k being a right shift width of the window) (S11). As in FIG. 20, ECDBL represents the doubling operation of A on the elliptic curve.

The controller 31 causes the adder 51 in the arithmetic unit 5 to perform the addition operation on the variable A, and a table value W[$w_i$] obtained from searching the window table 75 according to the index value $w_i$ (S13). As in FIG. 20, ECADD(A,W[$w_i$]) represents the addition operation of A and W[$w_i$] on the elliptic curve. The addition operation is known and is not further discussed here.

The controller 31 decrements the value of the counter i by 1 (S15), and determines whether i equals 0 or above (S17). If it is determined that i equals 0 or above, the controller 31 returns to S9. Process steps S9 through S17 are repeated until i becomes less than 0.

If i becomes less than 0, the corrector 33$b$ calculates the correction point (S18). The correction point is identical to the counterpart in Embodiment 1-A, and is obtained by multiplying a value, which results from arranging a k-bit bit train with only the least significant bit being "1" by $\lceil n/k \rceil$ times ($\lceil n/k \rceil$*k bits in total), by point F on the elliptic curve. The corrector 33 performs the calculation of the correction point using the arithmetic unit 5, and the detail of the calculation is known and not discussed any further. The corrector 33$b$ performs a correction process using the calculated correction point (S19). The detail of the correction process is known and not discussed further.

The controller 31 outputs the value of the variable A thus obtained to a specified output destination (S21). The value of the variable A may be output to the outside via the communication unit 11, or may be output to another arithmetic program to be used in processing.

As described above, the non-zero table value is added to an ordinary table value on the window table 75, and the resulting table value is corrected in S19. In this way, the same calculation is repeated to any scalar value d. More specifically, none of the bits of the scalar value d can be stolen through the PA. An area of the RAM 9 used in this process remains unchanged from the RAM area that is used when no PA resistance mode is incorporated. An area of the ROM 7 used in this process remains unchanged from the ROM area that is used when no PA resistance mode is incorporated. In the smart card that is subject to the capacity limitation of RAM, the present embodiment is particularly effective.

Embodiment 2-A

Figure 23:
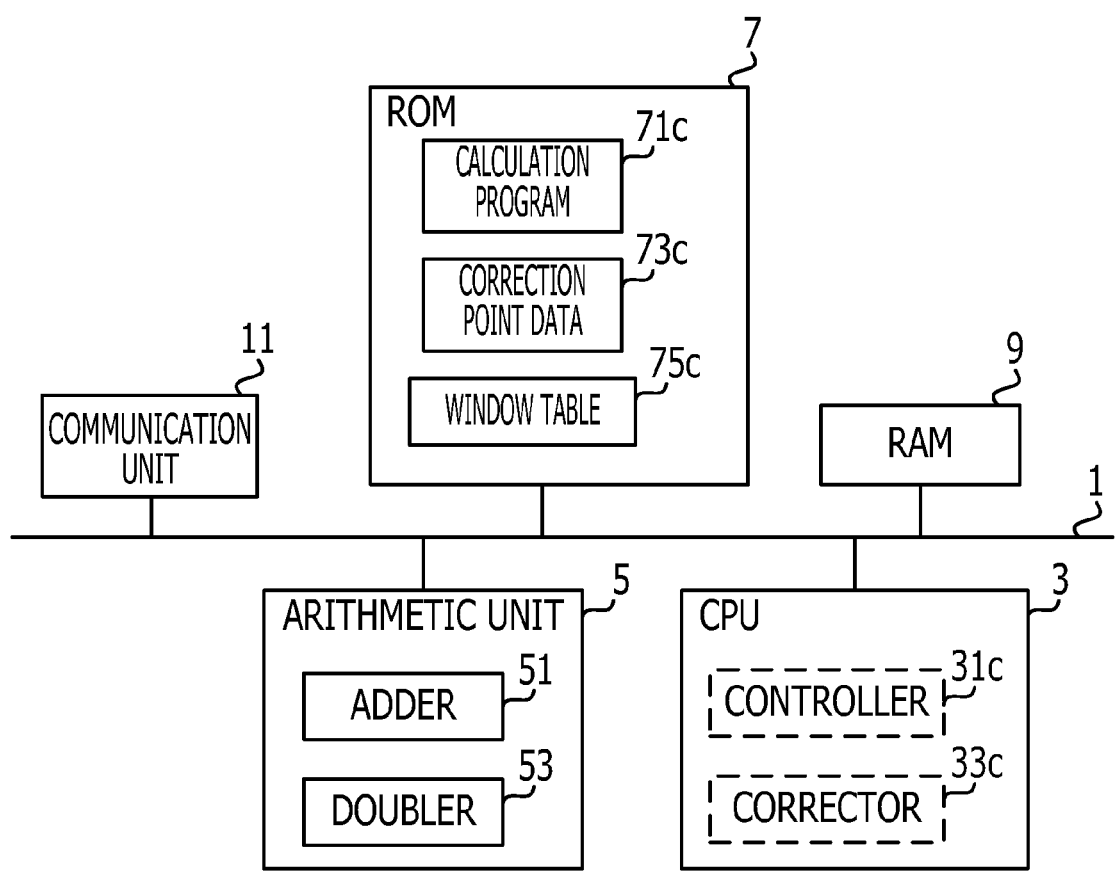
FIG. 23 illustrates a structure of an elliptic curve cryptographic processing apparatus of Embodiment 2-A.

FIG. 23 illustrates an elliptic curve cryptographic processing apparatus 100 of Embodiment 2-A. Elements identical to those illustrated in FIG. 17 are designated with the same reference numerals. The elliptic curve cryptographic processing apparatus 100 includes the CPU 3, the arithmetic unit 5, the ROM 7, the RAM 9, and the communication unit 11, mutually connected to each other via the bus 1. The ROM 7 stores a calculation program 71$c$ for causing the CPU 3 to perform a process to be discussed below, correction point data 73$c$ to be discussed below, and a window table 75$c$ to be discussed below based on a window table of a standard window method.

The arithmetic unit 5 includes the adder 51, and the doubler 53, identical to those in Embodiment 1-A. When the CPU 3 executes the calculation program 71$c$, the controller 31$c$ and the corrector 33$c$ performing a correction process on calculation results described below are implemented. The communication unit 11 for communicating with an external apparatus is also illustrated. A device for performing another function may be included. The RAM 9 stores data the CPU 3 uses to perform a variety of processes. In accordance with the present embodiment, the RAM 9 provides an area for a variable A that is used to calculate a scalar value d multiplication of a base point G on the elliptic curve. Data used for calculation may be also stored on the RAM 9. The RAM 9, for example, might have no extra area dedicated to tamper resistance.

The calculation process of Embodiment 2-A is specifically described below. FIG. 24A illustrates specific contents of the window table 75$c$. Referring to FIG. 24A, the scalar value d multiplication of the point G on the elliptic curve is performed based on a scalar value of 12 bits and a window width of 3 bits. The number of elements of the window table 75$c$ is $2^3=8$. In comparison with the case where no PA resistance mode is incorporated as in FIG. 9, the table correction value F is added to each table value.

More specifically, 0G+F=F is mapped to an index value "000," $2^0G+F$ is mapped to an index value "001," $2^4G+F$ is mapped to an index value "010," $2^4G+2^0G+F$ is mapped to an index value "011," $2^8G+F$ is mapped to an index value "100," $2^8G+2^0G+F$ is mapped to an index value "101," $2^8G+2^4G+F$ is mapped to an index value "110," and $2^8G+2^4G+2^0G+F$ is mapped to an index value "111." The table correction value F is a point on the elliptic curve but the table correction value F may be any point. For example, if x is a scalar value, the table correction value F may be a point xG. The table correction value F must be a non-zero value.

Figure 9:
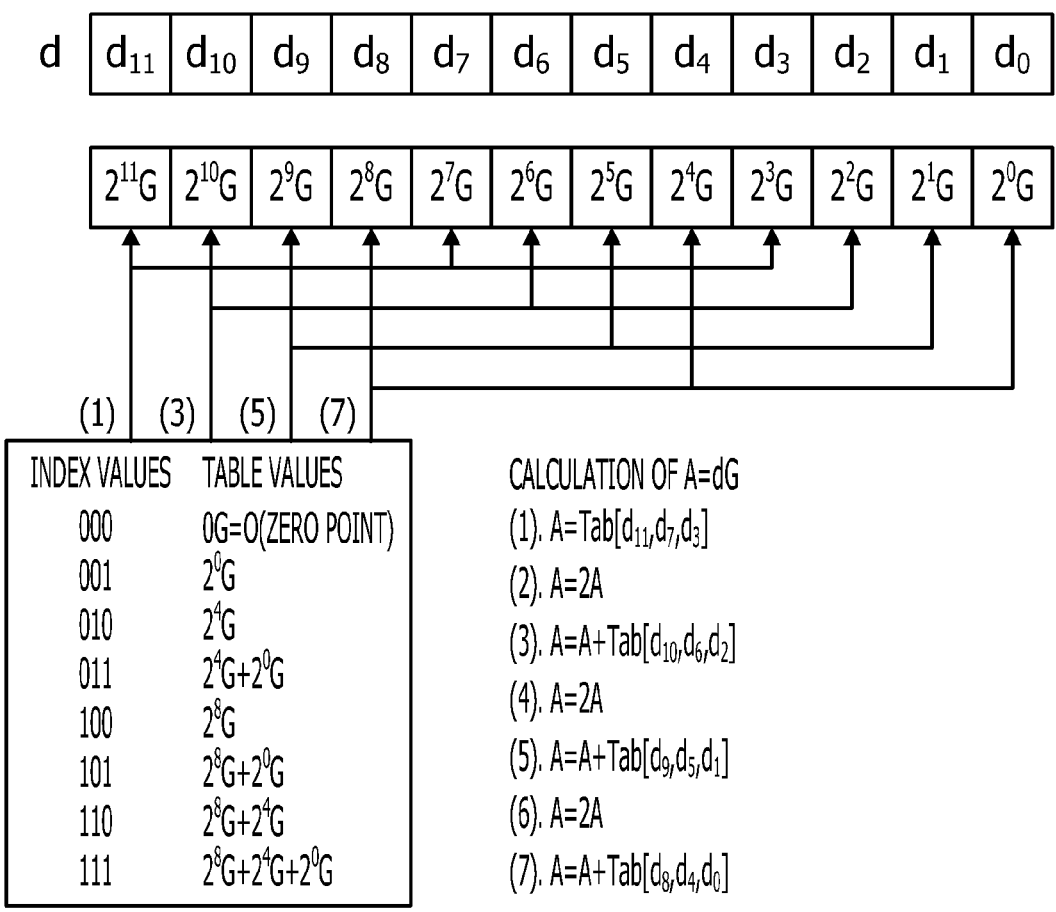
FIG. 9 illustrates a summary of an algorithm of an elliptic scalar multiplication based on a comb-type window method.
Figure 10:
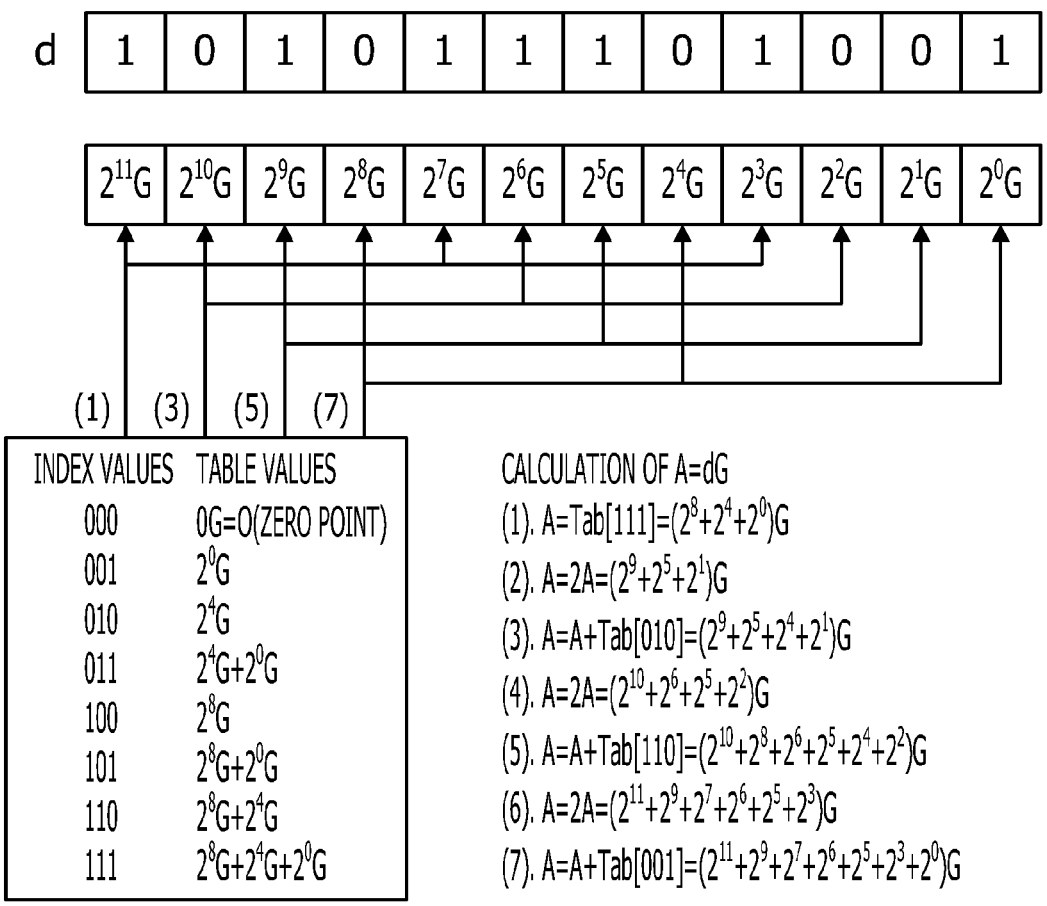
FIG. 10 specifically illustrates the elliptic scalar multiplication based on the comb-type window method.

A general table value may be expressed by an equation. The upper bit of the index value corresponds to $2^8G$, the second bit corresponds to $2^4G$, and the third bit corresponds to $2^0G$. Depending on 0 or 1 of each bit of the index value, $2^8G$, $2^4G$, and $2^0G$ may or may not be added. The power index of 2 is set in response to a relative bit position in the scalar value d assigned to each bit of the window (i.e., the index value). In accordance with the embodiment as illustrated in FIG. 9, the bit values of the scalar value d are read every $\lceil n/k \rceil$=4 bits. The power index of the least significant bit of the window is "0," the power index of the second bit is "4," and the power index of the most significant bit is "8."

Specific calculation process steps using the window table 75c is illustrated in FIG. 24B. In step (1), an index value is obtained by reading a bit value from the scalar value d every 4 bits starting with the most significant bit, and a table value is read from the window table 75c according to the index value. The read table value is substituted for a variable A. Step (1) is expressed as (1) A=Tab[$d_{11}$, $d_7$, $d_3$]. (Tab[x] denotes a table value specified by [x]).

In step (2), 2A is calculated in response to 1 bit as a window shift width. Step (2) is expressed as (2) A=2A. In step (3), an index value is obtained by reading a bit value from the scalar value d every 4 bits starting with the second upper bit, and a table value is read from the window table 75c according to the index value. The read table value is added to the variable A. Step (3) is expressed as (3) A=A+Tab[$d_{10}$, $d_6$, $d_2$]. In step (4), 2A is calculated in response to 1 bit as a window shift width. Step (4) is expressed as (4) A=2A. In step (5), an index value is obtained by reading a bit value from the scalar value d every 4 bits starting with the third upper bit, and a table value is read from the window table 75c according to the index value. The read table value is added to the variable A. Step (5) is expressed as (5) A=A+Tab[$d_9$, $d_5$, $d_1$].

In step (6), 2A is calculated in response to 1 bit as a window shift width. Step (6) is expressed as (6) A=2A. In step (7), an index value is obtained by reading a bit value from the scalar value d every 4 bits starting with the fourth upper bit, and a table value is read from the window table 75c according to the index value. The read table value is added to the variable A. Step (7) is expressed as (7) A=A+Tab[$d_8$, $d_4$, $d_0$]

The process steps heretofore remains unchanged from those discussed with reference to FIG. 9. Since $(1111)_2$F has been added to each value of the window table 75, the calculation result of step (7) also includes additional F. The additional F is thus subtracted from the calculation result of step (7). In accordance with the window method of the present embodiment, $(1111)_2$F is used as the correction point data 73, and A=A−$(1111)_2$F is calculated in step (8).

The process steps are basically identical to those with no PA resistance mode incorporated, except process step (8). Since the table value "F" is also read in response to the index value "000," the addition of zero is not performed. In other words, the power consumption waveforms of FIG. 12B do not appear. The embodiment is free from an increase in the RAM area for the variable, which the dummy operation method needs.

FIG. 25 illustrates a generalized version of the window table 75c illustrated in FIG. 24A. As in Embodiment 1-A, the index value y is ($y_{k−1}$∥$y_{k−2}$∥ . . . $y_1$∥$y_0$). The window width is k bits.

Referring to FIG. 25, the table value responsive to the index value y is expressed as follows:

$$(y_{k-1} \times 2^{\lceil n/k \rceil *(k-1)} + y_{k-2} \times 2^{\lceil n/k \rceil *(k-2)} + \ldots + y_1 \times 2^{\lceil n/k \rceil *1} + y_0 \times 2^{\lceil n/k \rceil *0})G+F$$

As discussed above, the j-th bit of the index value of k bits from the right corresponds to $y_{j-1} \times 2^{\lceil n/k \rceil *(j-1)}$. In the case of the window method, the k bits are read from the scalar value d every $\lceil n/k \rceil$ bits. The power index of 2 at the j-th bit of the k-bit index value from the right is the relative bit position $\lceil n/k \rceil *(j-1)$ of the scalar value assigned to the j-th bit.

The table value at the index value "0" is the table correction value "F," the table value at the index value "1" is $2^0$G+F because only $y_0$ is "1," and the table value at the index value "2" is $2^{\lceil n/k \rceil *1}$+F because only $y_1$ is "1." The table value responsive to the index value "$2^k$−1" is ($2^{\lceil n/k \rceil *(k-1)}$+ $2^{\lceil n/k \rceil *(k-2)}$+ . . . +$2^{\lceil n/k \rceil *1}$+$2^{\lceil n/k \rceil *0}$)G+F because all $y_{k-1}$ through $y_0$ are 1's.

Figure 26:
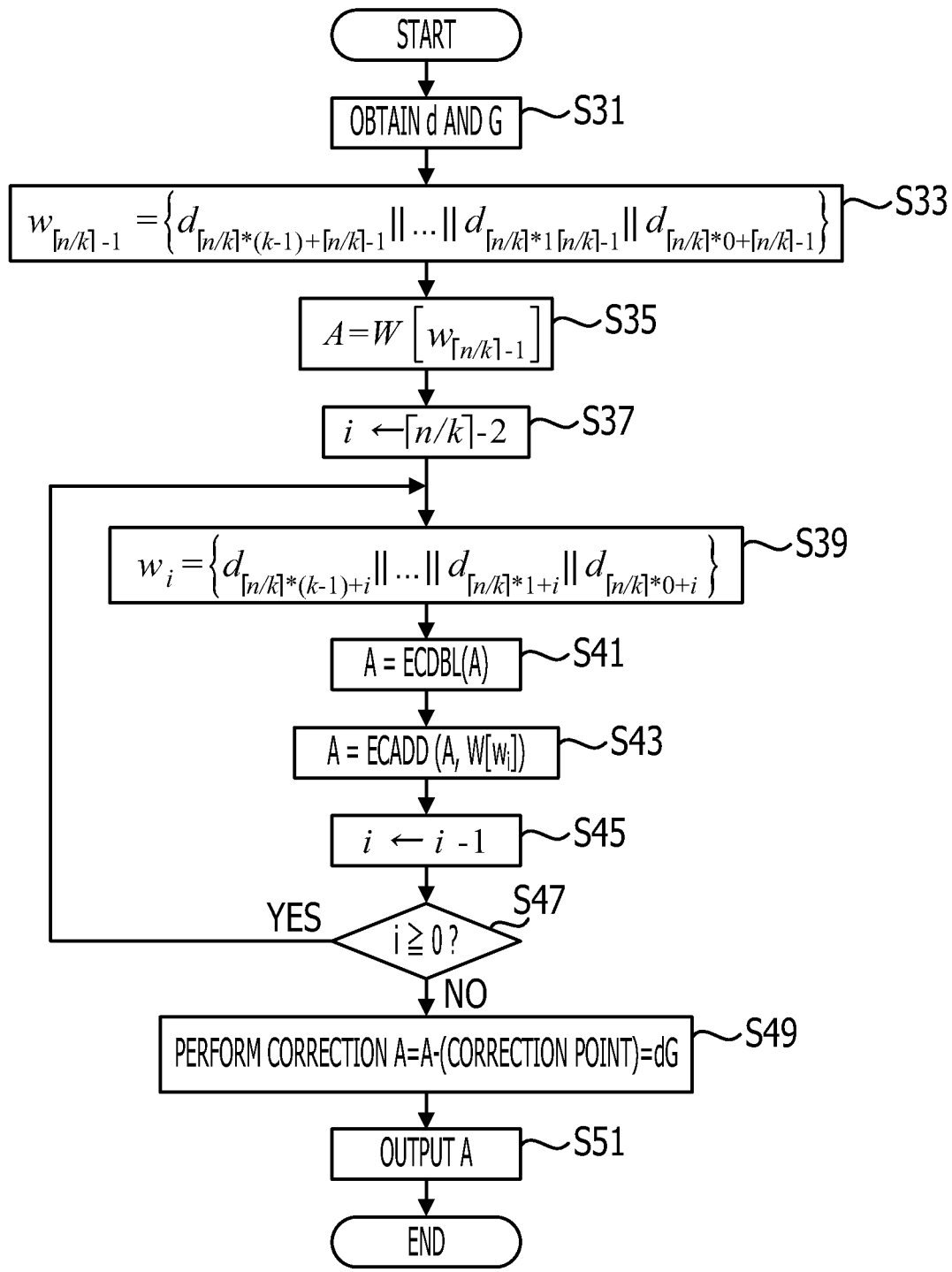
FIG. 26 is a flowchart of a process of Embodiment 2-A.

Referring to FIG. 26, a process flow of the elliptic curve cryptographic processing apparatus is described. The controller 31c reads the n-bit scalar value d and the base point G on the elliptic curve from one of the RAM 9 and the ROM 7 (S31). The controller 31c reads the values in a k-bit width window from the scalar value d every $\lceil n/k \rceil$ bits, starting with the most significant bit of the scalar value d and acquires an index value (S33). If the scalar value d is represented as {$d_{n-1}$∥$d_{n-2}$∥ . . . $d_1$∥$d_0$}, the value $w_{\lceil n/k \rceil -1}$ to be read from the scalar value d is represented as below:

$$w_{\lceil n/k \rceil -1} = \{d_{\lceil n/k \rceil *(k-1)+\lceil n/k \rceil -1} \| \ldots d_{\lceil n/k \rceil *1+\lceil n/k \rceil -1} \| d_{\lceil n/k \rceil *0+\lceil n/k \rceil -1}\}$$

The controller 31c reads from the window table 75c a table value responsive to the index value $w_{\lceil n/k \rceil -1}$ and sets the read table value as a variable A (S35). The variable A is thus represented as below:

$$A = W[w_{\lceil n/k \rceil -1}]$$

where W[z] is a table value mapped to an index value z in the window table 75c.

The controller 31c sets $\lceil n/k \rceil$−2 on a counter i (S37).

The controller 31c further reads bit values in a k-bit width window the scalar value d every $\lceil n/k \rceil$ bits, starting with a bit position defined by the counter i and acquires an index value (S39).

The value wi to be read from d is represented as below:

$$w_i = \{d_{k*i+(k-1)} \| \ldots d_{k*i+1} \| d_{k*i+0}\}$$

The position of the window is thus right-shifted by k bits.

The controller 31c causes the doubler 53 in the arithmetic unit 5 to perform the doubling operation on the variable A once (because a right shift width of the window is one) (S41). Referring to FIG. 26, ECDBL(A) represents the doubling operation of A on the elliptic curve. The doubling operation is known and not discussed further here.

The controller 31c causes the adder 51 in the arithmetic unit 5 to perform the addition operation on the variable A, and a table value W[$w_i$] obtained from searching the window table 75c according to the index value $w_i$ (S43). Referring to FIG. 26, ECADD(A,W[$w_i$]) represents the addition operation of A and W[$w_i$] on the elliptic curve. The addition operation is known and is not further discussed here.

The controller 31c decrements the value of the counter i by 1 (S45), and determines whether i equals 0 or above (S47). If it is determined that i equals 0 or above, the controller 31c returns to S39. Process steps S39 through S47 are repeated until i becomes less than 0.

If i becomes less than 0, the corrector 33c performs a correction process (S49). Equation A=A−correction point=dG holds. As described above, the correction point is obtained by multiplying a value, which results from arranging "1" by $\lceil n/k \rceil$ times, by point F on the elliptic curve. The correction point data 73c is read from the ROM 7 and is used for the above calculation. The corrector 33 performs the calculation using the arithmetic unit 5, and the detail of the calculation is known and not discussed further.

The controller 31c outputs the value of the variable A thus obtained to a specified output destination (S51). The value of the variable A may be output to the outside via the communication unit 11, or may be output to another arithmetic program.

As described above, the non-zero table value is added to an ordinary table value on the window table 75c, and the resulting table value is corrected in S49. In this way, the same calculation is repeated to any scalar value d. More specifically, none of the bits of the scalar value d can be stolen through the PA. Since only S49 is added as a process step, no substantial performance drop in terms of process speed results in comparison with the case where no PA resistance mode is incorporated. An area of the RAM 9 used in this process remains unchanged from the RAM area that is used when no PA resistance mode is incorporated. An area of the ROM 7 used in this process could increase by an amount responsive to the correction point data 73c, but the amount of increase is not so large. In the smart card where the RAM is more limited in capacity than the ROM, the present embodiment is particularly effective.

Embodiment 2-B

Figure 27:
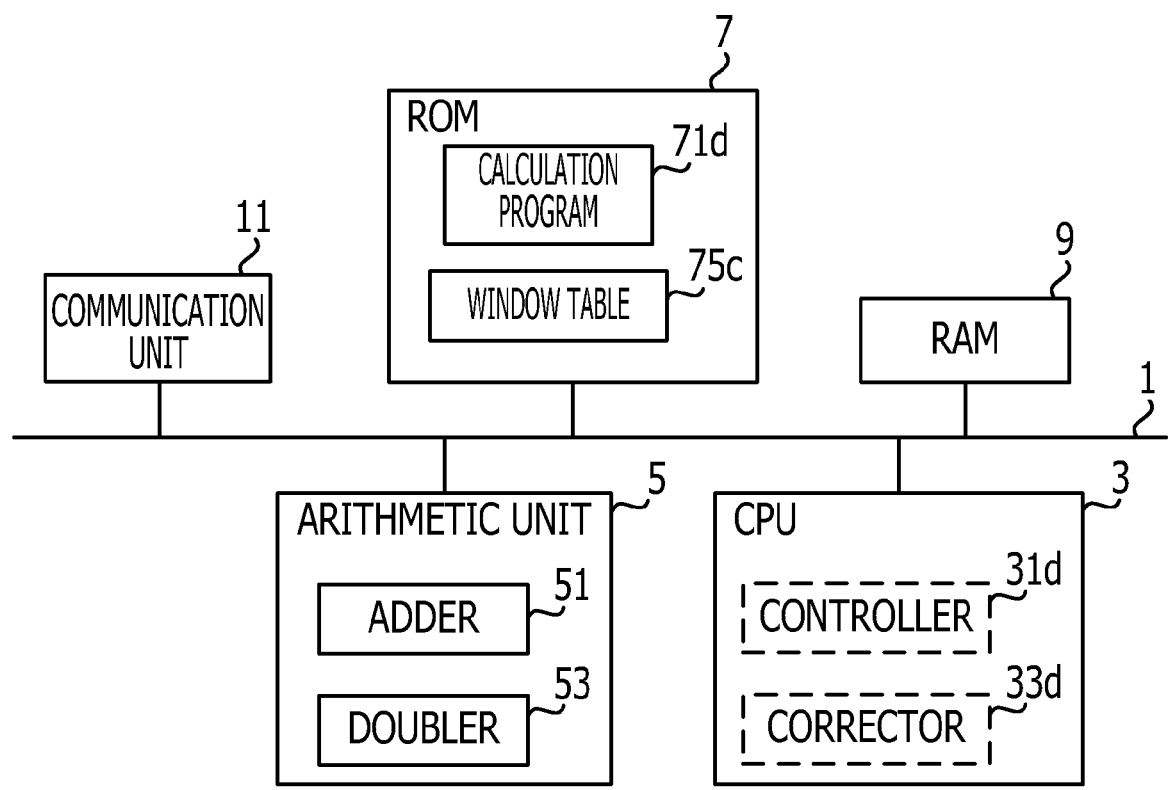
FIG. 27 illustrates a structure of an elliptic curve cryptographic processing apparatus of Embodiment 2-B.

Embodiment 2-B is a modification of Embodiment 2-A. The structure of an elliptic curve cryptographic processing apparatus 100 of Embodiment 2-B is illustrated in FIG. 27. Referring to FIG. 27, elements identical to those illustrated in FIG. 21 are designated with the same reference numerals. Embodiment 2-B is different from Embodiment 2-A in that the ROM 7 stores no correction point data 73c. The absence of the correction point data 73c causes the arithmetic program of Embodiment 2-B to be different from that of Embodiment 2-A. The calculation program 71d different from the calculation program 71c is used accordingly.

The elliptic curve cryptographic processing apparatus 100 includes the CPU 3, the arithmetic unit 5, the ROM 7, the RAM 9, and the communication unit 11, mutually connected to each other via the bus 1. The ROM 7 stores the calculation program 71d for causing the CPU 3 to perform a process to be discussed below, and a window table 75c. The arithmetic unit 5 includes the adder 51, and the doubler 53. When the CPU 3 executes the calculation program 71d, the controller 31d and the corrector 33d performing a correction process on calculation results described below are implemented. The data contents stored on the window table 75c are identical to those in Embodiment 2-A.

Figure 28:
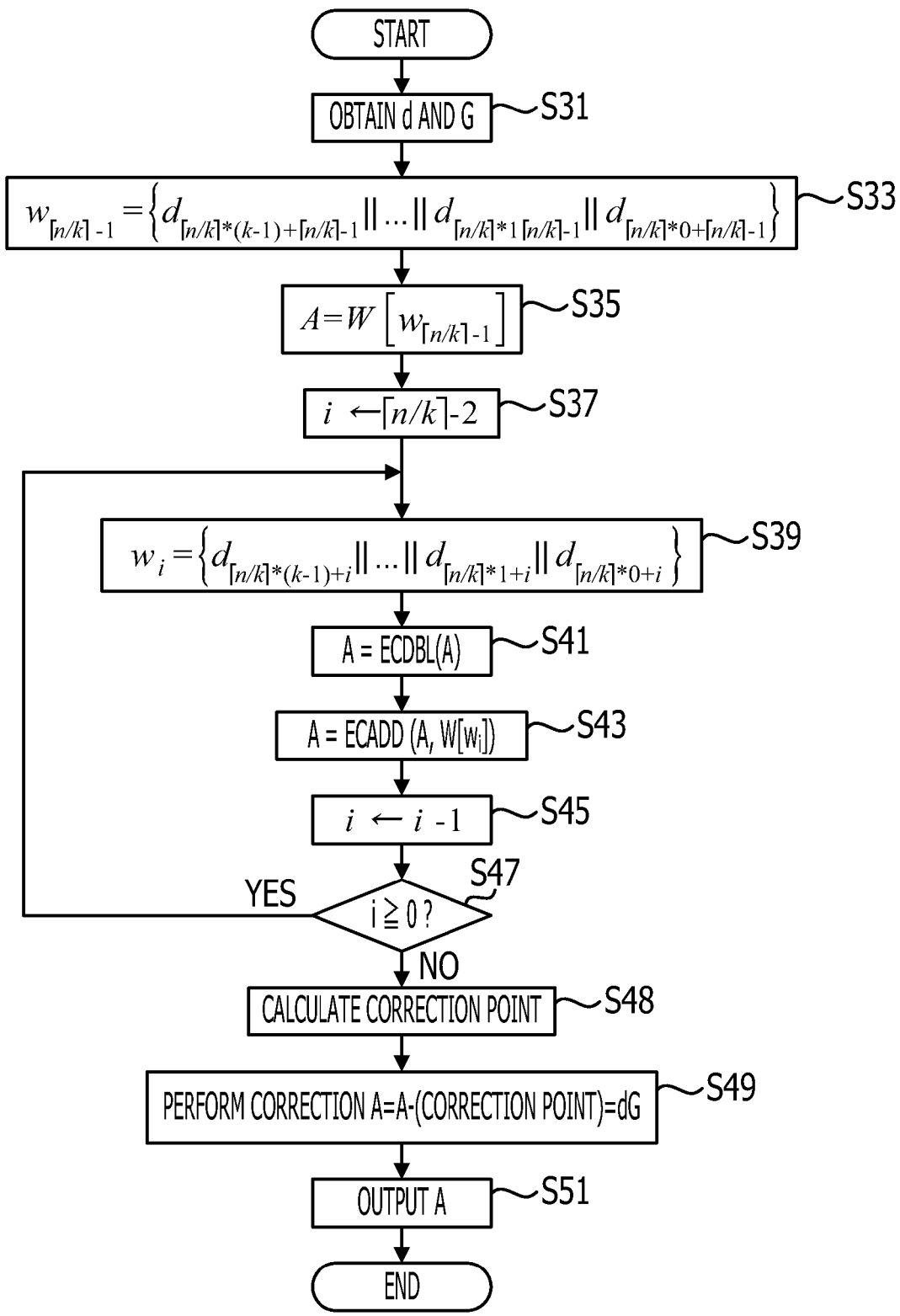
FIG. 28 is a flowchart of a process of Embodiment 2-B.

Referring to FIG. 28, a process flow of the elliptic curve cryptographic processing apparatus 100 is described. Process steps identical to those in FIG. 26 are designated with the same step numbers. The controller 31d reads the n-bit scalar value d and the base point G on the elliptic curve from one of the RAM 9 and the ROM 7 (S31). The controller 31d reads the values in a k-bit width window from the scalar value d every ⌈n/k⌉ bits, starting with the most significant bit of the scalar value d and acquires an index value $w_{\lceil n/k \rceil -1}$ (S33).

The controller 31d reads from the window table 75c a table value responsive to the index value $w_{\lceil n/k \rceil -1}$ and sets the read table value as a variable A (S35). The controller 31d sets ⌈n/k⌉−2 on a counter i (S37). The controller 31d further reads bit values in a k-bit width window the scalar value d every ⌈n/k⌉ bits, starting with a bit position defined by the counter i and acquires an index value (S39). The position of the window is thus right-shifted by k bits.

The controller 31d causes the doubler 53 in the arithmetic unit 5 to perform the doubling operation on the variable A once (because a right shift width of the window is one) (S41). Referring to FIG. 28, ECDBL(A) represents the doubling operation of A on the elliptic curve.

The controller 31d causes the adder 51 in the arithmetic unit 5 to perform the addition operation on the variable A, and a table value $W[w_i]$ obtained from searching the window table 75c according to the index value $w_i$ (S43). Referring to FIG. 28, ECADD(A,W[$w_i$]) represents the addition operation of A and W[$w_i$] on the elliptic curve.

The controller 31d decrements the value of the counter i by 1 (S45), and determines whether i equals 0 or above (S47). If it is determined that i equals 0 or above, the controller 31d returns to S39. Process steps S39 through S47 are repeated until i becomes less than 0.

If i becomes less than 0, the corrector 33d calculates the correction point (S48). As in Embodiment 2-A, the correction point is obtained by multiplying a value, which results from arranging "1" by ⌈n/k⌉ times, by point F on the elliptic curve. The corrector 33d performs the calculation using the arithmetic unit 5.

The corrector 33d performs a correction process (S49), i.e., calculates A=A−correction point=dG. The corrector 33d performs the correction process using the arithmetic unit 5.

The controller 31d outputs the value of the variable A thus obtained to a specified output destination (S51). The value of the variable A may be output to the outside via the communication unit 11, or may be output to another arithmetic program to be used in processing.

As described above, the non-zero table value is added to an ordinary table value on the window table 75c, and the resulting table value is corrected in S48 and S49. In this way, the same calculation is repeated to any scalar value d. More specifically, none of the bits of the scalar value d can be stolen through the PA. An area of the RAM 9 used in this process remains unchanged from the RAM area that is used when no PA resistance mode is incorporated. An area of the ROM 7 used in this process remains unchanged from the ROM area that is used when no PA resistance mode is incorporated. In the smart card that is subject to the capacity limitation of RAM, the present embodiment is particularly effective.

Embodiment 3

Figure 29:
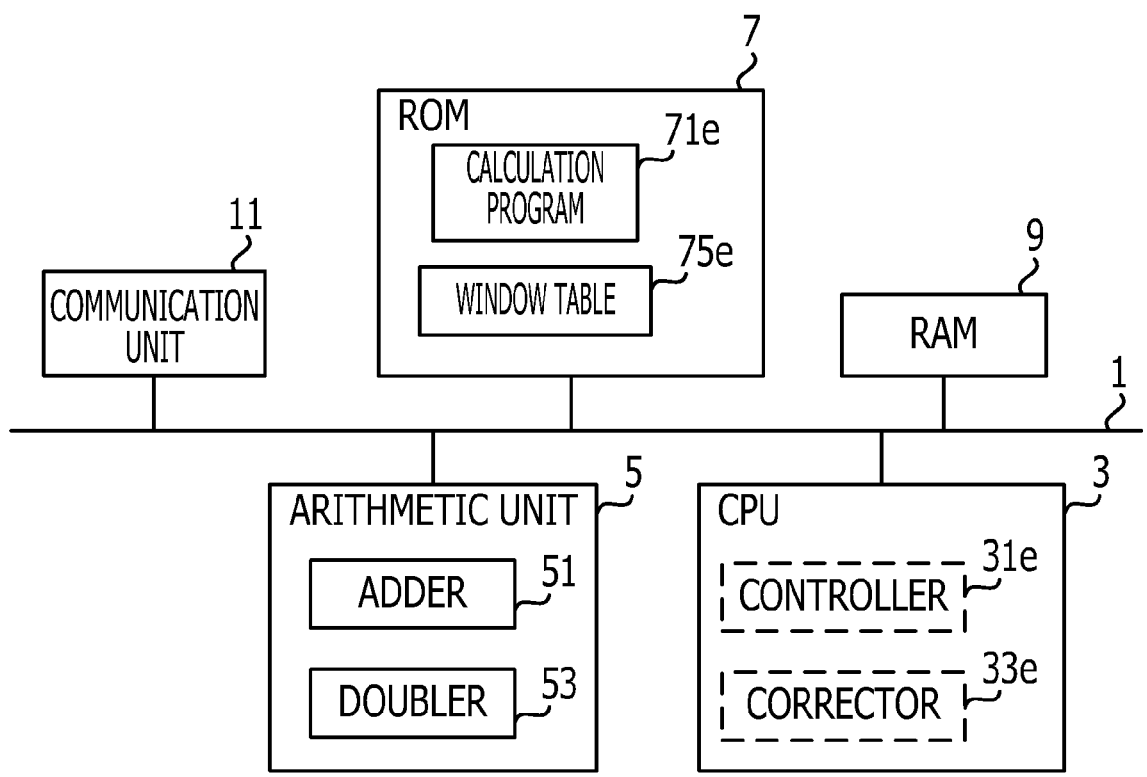
FIG. 29 illustrates a structure of an elliptic curve cryptographic processing apparatus of Embodiment 3.

FIG. 29 illustrates an elliptic curve cryptographic processing apparatus 100 of Embodiment 3. Elements identical to the elliptic curve cryptographic processing apparatus 100 illustrated in FIG. 17 are designated with the same reference numerals. The elliptic curve cryptographic processing apparatus 100 includes the CPU 3, the arithmetic unit 5, the ROM 7, the RAM 9, and the communication unit 11, mutually connected to each other via the bus 1. The ROM 7 stores a calculation program 71e for causing the CPU 3 to perform a process to be discussed below, and a window table 75e to be discussed below based on a window table of the standard window method.

The arithmetic unit 5 includes the adder 51, and the doubler 53, identical to those in Embodiment 1-A. When the CPU 3 executes the calculation program 71e, the controller 31e and the corrector 33e performing a correction process on the scalar value d described below are implemented. The communication unit 11 for communicating with an external apparatus is also illustrated. A device for performing another function may be included. The RAM 9 stores data the CPU 3 uses to perform a variety of processes. In accordance with the present embodiment, the RAM 9 provides an area for a variable A that is used to calculate a scalar value d multiplication of a base point G on the elliptic curve. Data used for calculation may be also stored on the RAM 9. The RAM 9 has no extra area dedicated to tamper resistance.

The calculation process of Embodiment 3 is specifically described below. FIG. 30A illustrates specific contents of the window table 75e. Referring to FIG. 30A, the scalar value d multiplication of the point G on the elliptic curve is performed based on a scalar value of 12 bits and a window width of 3 bits.

The number of elements of the window table 75e is $2^3=8$. In comparison with the case where no PA resistance mode is incorporated as in FIG. 9, the table correction value xG is added to each table value. It is also noted that x is a non-zero value.

More specifically, xG is mapped to an index value "000," $2^0G+xG$ is mapped to an index value "001," $2^1G+xG$ is mapped to an index value "010," $2^1G+2^0G+xG$ is mapped to an index value "011," $2^3G+xG$ is mapped to an index value "100," $2^2G+2^0G+xG$ is mapped to an index value "101," $2^2G+2^1G+xG$ is mapped to an index value "110," and $2^2G+2^1G+2^0G+xG$ is mapped to an index value "111." With xG used for the table correction value, the calculation operations on the elliptic curve are reduced by correcting the scalar value d through a simple scalar calculation as described below.

A general table value may be expressed by an equation. The upper bit of the index value corresponds to $2^2G$, the second bit corresponds to $2^1G$, and the third bit corresponds to $2^0G$. Depending on 0 or 1 of each bit of the index value, $2^2G$, $2^1G$, and $2^0G$ may or may not be added. The power index of 2 is set in response to a relative bit position in the scalar value d assigned to each bit of the window (i.e., the index value). In accordance with the embodiment as illustrated in FIG. 9, the bit values of the scalar value d are read every $\lceil n/k \rceil = 4$ bits. The power index of the least significant bit of the window is "0," the power index of the second bit is "1," and the power index of the most significant bit is "2."

The calculation process based on the window table 75e are illustrated in FIG. 30B. Unlike the related art technique and Embodiments 1-A and 2-B, the scalar value d is corrected with $d=d-x(001001001001)_2$ in step (0). If the calculation process is executed using the window table 75e with xG added to each table value, a value finally stored as the variable A is $dG+(001001001001)_2 G$. If $(001001001001)_2 x$ is subtracted beforehand from the scalar value d, the final result becomes dG, and the effect of the table correction value is canceled. Such a correction process eliminates the need for a subsequent calculation on the elliptic curve and increases the calculation speed.

In step (1), a table value is read from the window table 75e according to the upper 3 bits as an index value of the corrected scalar value d (also simply referred to as d). The table value is then substituted for a variable A. Step (1) is expressed as (1) $A=Tab[d_{11}, d_{10}, d_9]$. (Tab[x] denotes a table value specified by [x]).

In step (2), $2^3A$ is calculated in response to 3 bits as a window shift width. Step (2) is expressed as (2) $A=2^3A$. In step (3), a table value is read from the window table 75e according to the next 3 bits of the corrected d as an index value and is added to A. Step (3) is expressed as (3) $A=A+Tab[d_8, d_7, d_6]$. In step (4), $2^3A$ is calculated in response to 3 bits as a window shift width. Step (4) is expressed as (4) $A=2^3A$. In step (5), a table value is read from the window table 75e according to the next 3 bits of the corrected d as an index value and is added to A. Step (5) is expressed as (5) $A=A+Tab[d_5, d_4, d_3]$.

In step (6), $2^3A$ is calculated in response to 3 bits as a window shift width. Step (6) is expressed as (6) $A=2^3A$. In step (7), a table value is read from the window table 75e according to the next 3 bits of the corrected d as an index value and is added to A. Step (7) is expressed as (7) $A=A+Tab[d_2, d_1, d_0]$.

Except step (0), the process steps heretofore remains unchanged from those with no PA resistance mode incorporated. Since the table value "xG" is read in response to the index value "000," the addition of zero is not performed. In other words, the power consumption waveforms of FIG. 12B do not appear. The embodiment is free from an increase in the RAM area for the variable, which the dummy operation method needs.

FIG. 31 illustrates a generalized version of the window table 75e illustrated in FIGS. 30A and 30B. The index value y is $(y_{k-1} \| y_{k-2} \| \ldots y_1 \| y_0)$. The bit at the x-th from the right is represented by $y_{x-1}$. The window width is k bits.

Referring to FIG. 31, the table value responsive to the index value y is expressed as follows:

$$(y_{k-1} \times 2^{k-1} + y_{k-2} \times 2^{k-2} + \ldots + y_1 \times 2^1 + y_0 \times 2^0)G + xG$$

As discussed above, the j-th bit of the index value of k bits from the right corresponds to $y_{j-1} \times 2^{j-1}$. In the case of the window method, the consecutive k bits are read from the scalar value d. The power index of 2 at the j-th bit of the k-bit index value from the right is a relative bit position (j−1) within the scalar value d and assigned to the j-th bit.

The table value at the index value "0" is the table correction value "xG," the table value at the index value "1" is $2^0+xG$ because only $y_0$ is "1," and the table value at the index value "2" is $2^1+xG$ because only $y_1$ is "1." The table value responsive to the index value "$2^k-1$" is $(2^{k-1}+2^{k-2}+\ldots+2^1+2^0)G+xG$ because all $y_{k-1}$ through $y_0$ are 1's.

Figure 32:
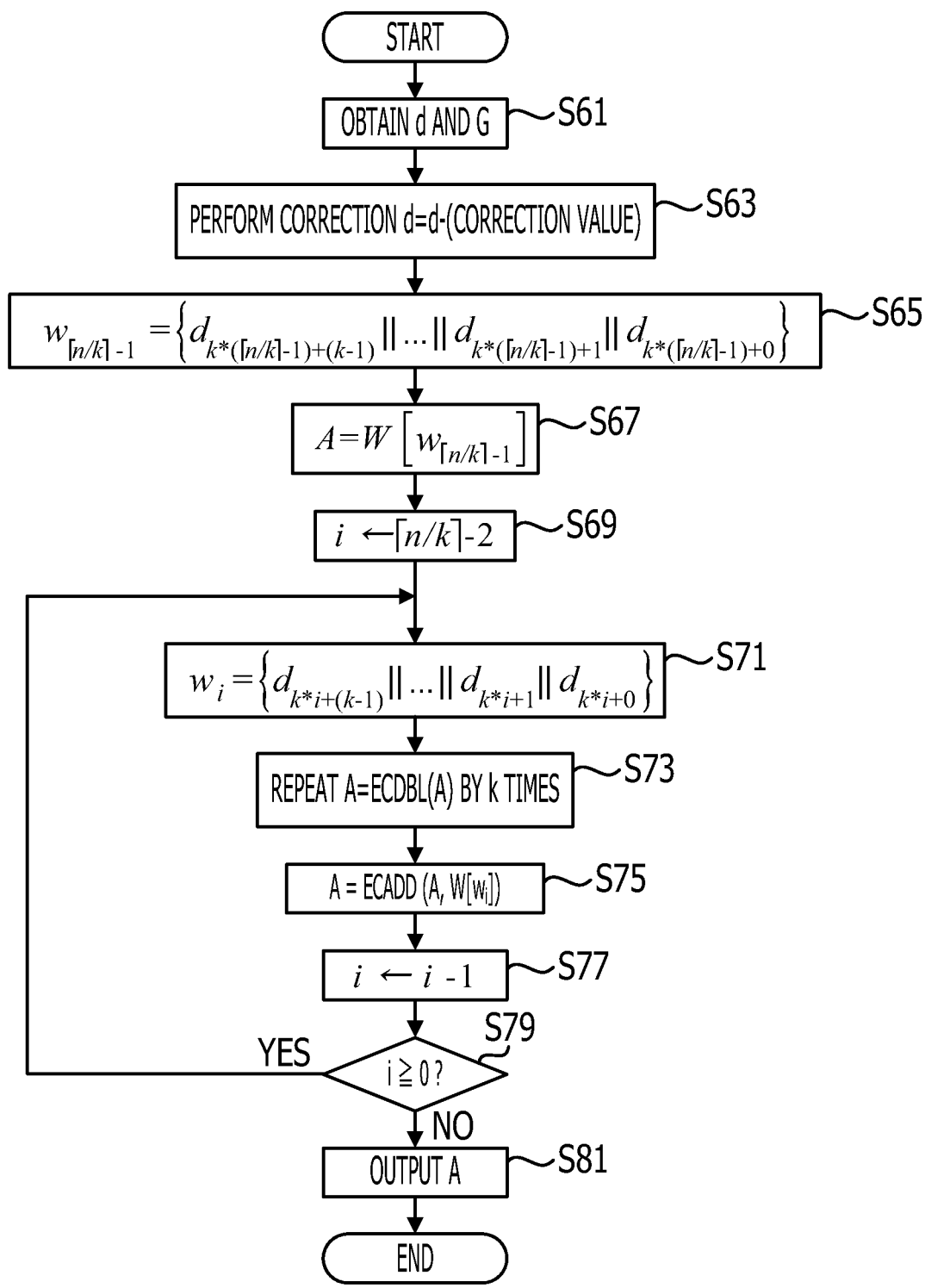
FIG. 32 is a flowchart of a process of Embodiment 3.

Referring to FIG. 32, a process flow of the elliptic curve cryptographic processing apparatus is described. The controller 31e reads the n-bit scalar value d and the base point G on the elliptic curve from one of the RAM 9 and the ROM 7 (S61). The corrector 33e corrects the scalar value d (S63). In other words, the corrector 33e calculates a product of a scalar value x and a correction value (001001001001), which is a sequence of bit trains of the k bits, each bit train having "1" as the least significant bit, and concatenated by $\lceil n/k \rceil$ times ($\lceil n/k \rceil * k$ bits in total). This process is simple and easily performed by the CPU 3. The controller 31e reads bit values in a k bit window width from the corrected scalar value d (the corrected scalar value d is also simply referred to as the scalar value d in this embodiment), starting with the most significant bit, and thus acquires an index value (S65). If the corrected scalar value d is represented as $\{d_{n-1} \| d_{n-2} \| \ldots d_1 \| d_0\}$, the value $w_{\lceil n/k \rceil - 1}$ to be read from the scalar value d is represented as below:

$$w_{\lceil n/k \rceil - 1} = \{d_{k*(\lceil n/k \rceil - 1)+(k-1)} \| \ldots d_{k*(\lceil n/k \rceil - 1)+1} \| d_{k*(\lceil n/k \rceil - 1)+0}\}$$

where $\lceil n/k \rceil$ represents the minimum integer equal to or larger than n/k.

The controller 31e reads from the window table 75e a table value responsive to the index value $w_{\lceil n/k \rceil - 1}$ and sets the table value as a variable A (S67). The variable A is thus represented as below:

$$A = W[w_{\lceil n/k \rceil}]$$

where W[z] is a table value mapped to an index value z in the window table 75e.

The controller 31e sets $\lceil n/k \rceil - 2$ on a counter i (S69).

The controller 31e further reads values in a k-bit width window at a bit position defined by the counter i in the scalar value d and thus acquires an index value (S71).

The value wi to be read from the corrected d is represented as below:

$$w_i = \{d_{k*i+(k-1)} \| \ldots d_{k*i+1} \| d_{k*i+0}\}$$

The position of the window is thus right-shifted by k bits.

The controller 31e causes the doubler 53 in the arithmetic unit 5 to perform the doubling operation on the variable A by k times (k being a right shift width of the window) (S73). Referring to FIG. 32, ECDBL(A) represents the doubling operation of A on the elliptic curve.

The controller 31e causes the adder 51 in the arithmetic unit 5 to perform the addition operation on the variable A, and a table value $W[w_i]$ obtained from searching the window table 75e according to the index value $w_i$ (S75). Referring to FIG. 32, ECADD(A,$W[w_i]$) represents the addition operation of A and $W[w_i]$ on the elliptic curve.

The controller 31e decrements the value of the counter i by 1 (S77), and determines whether i equals 0 or above (S79). If it is determined that i equals 0 or above, the controller 31e returns to S71. Process steps S71 through S79 are repeated until i becomes less than 0.

If i becomes less than 0, the controller 31e outputs the value of the variable A thus obtained to a specified output destination (S81). The value of the variable A may be output to the outside via the communication unit 11, or may be output to another arithmetic program to be used in processing.

Since the non-zero table value xG is added to the ordinary table value on the window table 75e as described above, the same calculation is repeated to any scalar value d. More specifically, none of the bits of the scalar value d can be stolen through the PA. Since only S63 is added as a process step, no substantial performance drop in terms of process speed results in comparison with the case where no PA resistance mode is incorporated. An area of the RAM 9 used in this process remains unchanged from the RAM area that is used when no PA resistance mode is incorporated. An area of the ROM 7 used in this process remains unchanged from the ROM area that is used when no PA resistance mode is incorporated. In the smart card that is subject to the capacity limitation of RAM, the present embodiment is particularly effective.

Embodiment 4

Figure 33:
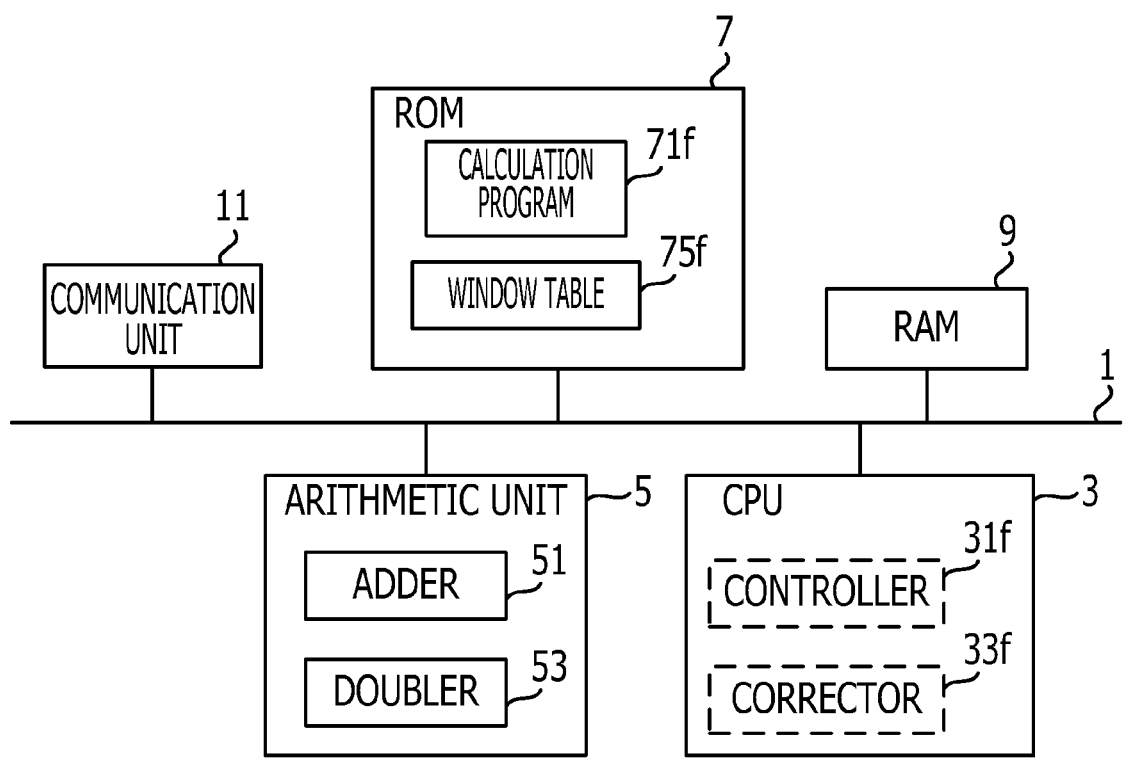
FIG. 33 illustrates a structure of an elliptic curve cryptographic processing apparatus of Embodiment 4.

Embodiment 4 is a comb-type window version of Embodiment 3. FIG. 33 illustrates an elliptic curve cryptographic processing apparatus 100 of Embodiment 4. Elements identical to the elliptic curve cryptographic processing apparatus 100 illustrated in FIG. 29 are designated with the same reference numerals. The elliptic curve cryptographic processing apparatus 100 includes the CPU 3, the arithmetic unit 5, the ROM 7, the RAM 9, and the communication unit 11, mutually connected to each other via the bus 1. The ROM 7 stores a calculation program 71f for causing the CPU 3 to perform a process to be discussed below, and a window table 75f to be discussed below based on a window table of the comb-type window method.

The arithmetic unit 5 includes the adder 51, and the doubler 53, identical to those in Embodiment 1-A. When the CPU 3 executes the calculation program 71f, the controller 31f and the corrector 33f performing a correction process on the scalar value d described below are implemented. The communication unit 11 for communicating with an external apparatus is also illustrated. A device for performing another function may be included. The RAM 9 stores data the CPU 3 uses to perform a variety of processes. In accordance with the present embodiment, the RAM 9 provides an area for a variable A that is used to calculate a scalar value d multiplication of a base point G on the elliptic curve. Data used for calculation may be also stored on the RAM 9. The RAM 9, for example, might have no extra area dedicated to tamper resistance.

The calculation process of Embodiment 4 is specifically described below. FIG. 34A illustrates specific contents of the window table 75f. Referring to FIG. 34A, the scalar value d multiplication of the point G on the elliptic curve is performed based on a scalar value of 12 bits and a window width of 3 bits. The number of elements of the window table 75f is $2^3=8$. In comparison with the case where no PA resistance mode is incorporated as in FIG. 9, the table correction value xG is added to each table value, meaning a scalar value x multiplication on the base point G.

More specifically, $0G+xG=xG$ is mapped to an index value "000," $2^0G+xG$ is mapped to an index value "001," $2^4G+xG$ is mapped to an index value "010," $2^4G+2^0G+xG$ is mapped to an index value "011," $2^8G+xG$ is mapped to an index value "100," $2^8G+2^0G+xG$ is mapped to an index value "101," $2^8G+2^4G+xG$ is mapped to an index value "110," and $2^8G+2^4G+2^0G+xG$ is mapped to an index value "111." With xG used for the table correction value, the calculation operations on the elliptic curve are reduced by correcting the scalar value d through a simple scalar calculation as described below.

A general table value may be expressed by an equation. The upper bit of the index value corresponds to $2^8G$, the second bit corresponds to $2^4G$, and the third bit corresponds to $2^0G$. Depending on 0 or 1 of each bit of the index value, $2^8G$, $2^4G$, and $2^0G$ may or may not be added. The power index of 2 is set in response to a relative bit position in the scalar value d assigned to each bit of the window (i.e., the index value). In accordance with the embodiment as illustrated in FIG. 9, the bit values of the scalar value d are read every $\lceil n/k \rceil = 4$ bits. The power index of the least significant bit of the window is "0," the power index of the second bit is "4," and the power index of the most significant bit is "8."

The calculation process based on the window table 75f are illustrated in FIG. 34B. Unlike the related art technique and Embodiments 1-A and 2-B, the scalar value d is corrected as in $d=d-x(1111)_2$ in step (0). If the calculation process is executed using the window table 75f with xG added to each table value, a value finally stored as the variable A is $dG+(1111)_2G$. If $(1111)_2$ x is subtracted beforehand from the scalar value d, the final result becomes dG, and the effect of the table correction value is canceled. Such a correction process eliminates the need for a subsequent calculation on the elliptic curve and increases the calculation speed.

In step (1), an index value is obtained by reading a bit value from the corrected scalar value d (also simply referred to as the scalar value d) every 4 bits starting with the most significant bit, and a table value is read from the window table 75f according to the index value. The read table value is substituted for a variable A. Step (1) is expressed as (1) A=Tab[$d_{11}$, $d_7$, $d_3$]. (Tab[x] denotes a table value specified by [x]).

In step (2), 2A is calculated in response to 1 bit as a window shift width. Step (2) is expressed as (2) A=2A. In step (3), an index value is obtained by reading a bit value from the corrected scalar value d every 4 bits starting with the second upper bit, and a table value is read from the window table 75f according to the index value. The read table value is added to the variable A. Step (3) is expressed as (3) A=A+Tab[$d_{10}$, $d_6$, $d_2$]. In step (4), 2A is calculated in response to 1 bit as a window shift width. Step (4) is expressed as (4) A=2A. In step (5), an index value is obtained by reading a bit value from the scalar value d every 4 bits starting with the third upper bit, and a table value is read from the window table 75f according to the index value. The read table value is added to the variable A. Step (5) is expressed as (5) A=A+Tab[$d_9$, $d_5$, $d_1$].

In step (6), 2A is calculated in response to 1 bit as a window shift width. Step (6) is expressed as (6) A=2A. In step (7), an index value is obtained by reading a bit value from the scalar value d every 4 bits starting with the fourth upper bit, and a table value is read from the window table 75f according to the index value. The read table value is added to the variable A. Step (7) is expressed as (7) A=A+Tab[$d_8$, $d_4$, $d_0$]=dG.

Except step (0), the process steps heretofore remains unchanged from those with no PA resistance mode incorporated. Since the table value "xG" is read in response to the index value "000," the addition of zero is not performed. In other words, the power consumption waveforms of FIG. 12B do not appear. The embodiment is free from an increase in the RAM area for the variable, which the dummy operation method needs.

FIG. 35 illustrates a generalized version of the window table 75$f$ illustrated in FIG. 34. The index value y is $(y_{k-1}\|y_{k-2}\| \ldots y_1\|y_0)$ as in Embodiment 1-A. The bit at the x-th from the right is represented by $y_{x-1}$. The window width is k bits.

Referring to FIG. 35, the table value responsive to the index value y is expressed as follows:

$$(y_{k-1} \times 2^{\lceil n/k \rceil*(k-1)} + y_{k-2} \times 2^{\lceil n/k \rceil*(k-2)} + \ldots + y_1 \times 2^{\lceil n/k \rceil*1} + y_0 \times 2^{\lceil n/k \rceil*0})G + xG$$

As discussed above, the j-th bit of the index value of k bits from the right corresponds to $y_{j-1} \times 2^{\lceil n/k \rceil*(j-1)}$. In the case of the comb-type window method, the k bits are read from the scalar value d every $\lceil n/k \rceil$ bits. The power index of 2 at the j-th bit of the k-bit index value from the right is a relative bit position $\lceil n/k \rceil*(j-1)$ within the scalar value d and assigned to the j-th bit.

The table value at the index value "0" is the table correction value "xG," the table value at the index value "1" is $2^0 + xG$ because only $y_0$ is "1," and the table value at the index value "2" is $2^{\lceil n/k \rceil*1} + xG$ because only $y_1$ is "1." The table value responsive to the index value "$2^k - 1$" is $(2^{\lceil n/k \rceil*(k-1)} + 2^{\lceil n/k \rceil*(k-2)} + \ldots 2^{\lceil n/k \rceil*1} + 2^{\lceil n/k \rceil*0})G + xG$ because all $y_{k-1}$ through $y_0$ are 1's.

Figure 36:
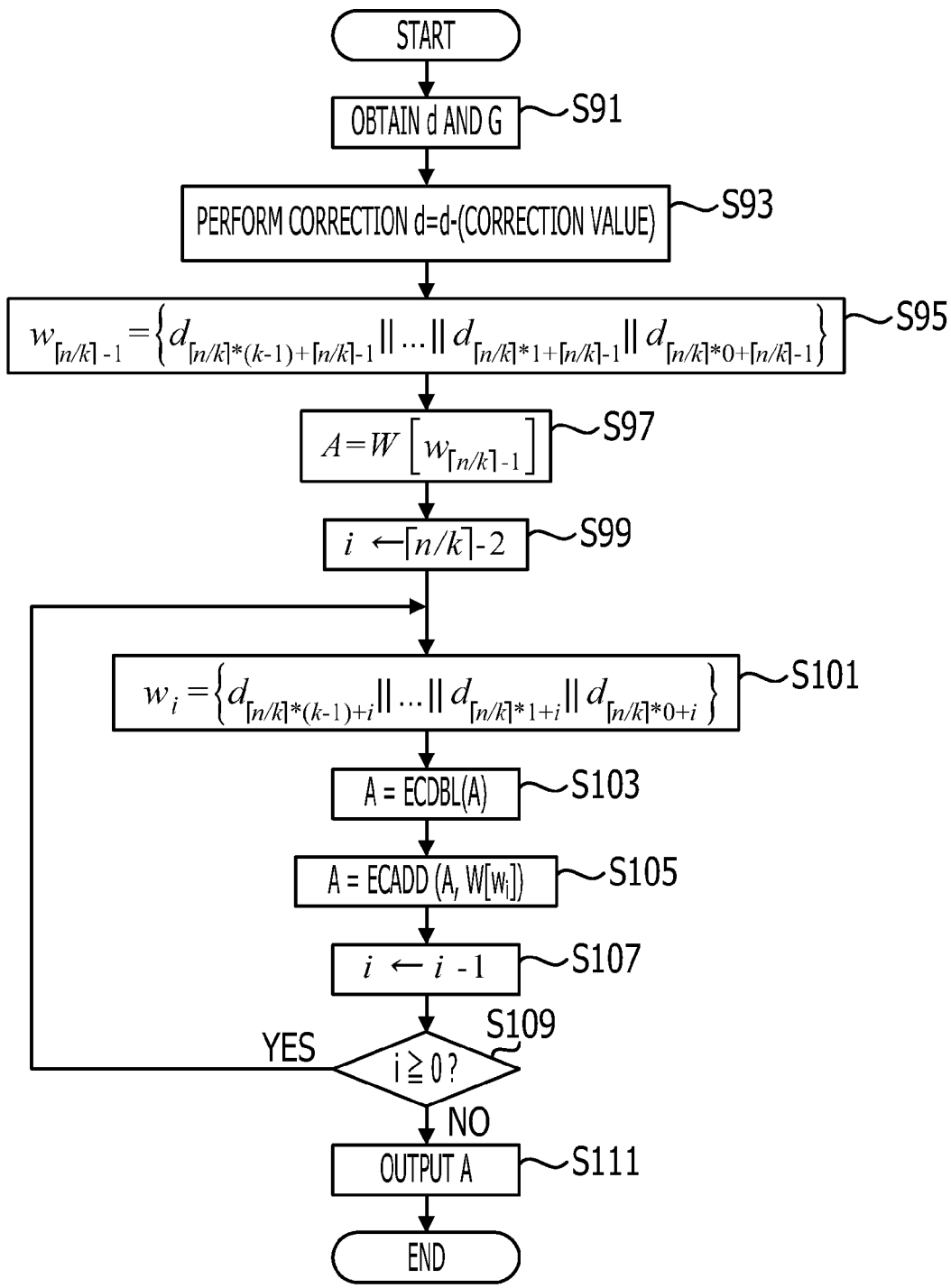
FIG. 36 is a flowchart of a process of Embodiment 4.

Referring to FIG. 36, a process flow of the elliptic curve cryptographic processing apparatus is described. The controller 31$f$ reads the n-bit scalar value d and the base point G on the elliptic curve from one of the RAM 9 and the ROM 7 (S91). The corrector 33$f$ corrects the scalar value d (S93). In other words, the corrector 33$f$ calculates a product of a scalar value x and a correction value (11 . . . 1), which is a sequence of "1's" concatenated by $\lceil n/k \rceil$ times. This process is simple and easily performed by the CPU 3. Thus, d=d–(111 . . . 1)x is calculated.

The controller 31$f$ reads bit values in a k bit window width from the corrected scalar value d every $\lceil n/k \rceil$ bits, starting with the most significant bit, and thus acquires an index value (S95). If the scalar value d is represented as $\{d_{n-1}\|d_{n-2}\| \ldots d_1\|d_0\}$, the value $w_{\lceil n/k \rceil - 1}$ to be read from the scalar value d is represented as below:

$$w_{\lceil n/k \rceil - 1} = \{d_{\lceil n/k \rceil*(k-1)+\lceil n/k \rceil - 1}\| \ldots d_{\lceil n/k \rceil*1+\lceil n/k \rceil - 1}\| d_{\lceil n/k \rceil*0+\lceil n/k \rceil - 1}\}$$

The controller 31$f$ reads from the window table 75$f$ a table value responsive to the index value $w_{\lceil n/k \rceil - 1}$ and sets the table value as a variable A (S97). The variable A is thus represented as below:

$$A = W[w_{\lceil n/k \rceil - 1}]$$

where W[z] is a table value mapped to an index value z in the window table 75$f$.

The controller 31$f$ sets $\lceil n/k \rceil - 2$ on a counter i (S99).

The controller 31$f$ further reads values in a k-bit width window at a bit position defined by the counter i in the scalar value d every $\lceil n/k \rceil$ bits and thus acquires an index value (S101).

The value wi to be read from d is represented as below:

$$w_i = \{d_{k*i+(k-1)}\| \ldots d_{k*i+1}\| d_{k*i+0}\}$$

The position of the window is thus right-shifted by k bits.

The controller 31$f$ causes the doubler 53 in the arithmetic unit 5 to perform the doubling operation on the variable A once (because a right shift width of the window is 1) (S103).

Referring to FIG. 36, ECDBL(A) represents the doubling operation of A on the elliptic curve.

The controller 31$f$ causes the adder 51 in the arithmetic unit 5 to perform the addition operation on the variable A, and a table value W[$w_i$] obtained from searching the window table 75$f$ according to the index value $w_i$ (S105). Referring to FIG. 36, ECADD(A,W[$w_i$]) represents the addition operation of A and W[$w_i$] on the elliptic curve.

The controller 31$f$ decrements the value of the counter i by 1 (S107), and determines whether i equals 0 or above (S109). If it is determined that i equals 0 or above, the controller 31$f$ returns to S101. Process steps S101 through S109 are repeated until i becomes less than 0.

If i becomes less than 0, the controller 31$f$ outputs the value of the variable A thus obtained to a specified output destination (S111). The value of the variable A may be output to the outside via the communication unit 11, or may be output to another arithmetic program to be used in processing.

Since the non-zero table value xG is added to an ordinary table value on the window table 75$f$ as described above, the same calculation is repeated to any scalar value d. More specifically, none of the bits of the scalar value d can be stolen through the PA. Since only S93 is added as a process step, no substantial performance drop in terms of process speed results in comparison with the case where no PA resistance mode is incorporated. An area of the RAM 9 used in this process remains unchanged from the RAM area that is used when no PA resistance mode is incorporated. An area of the ROM 7 used in this process remains unchanged from the ROM area that is used when no PA resistance mode is incorporated. In the smart card that is subject to the capacity limitation of RAM, the present embodiment is particularly effective.

Embodiment 5

In accordance with the Embodiment 5, the PA resistance mode is incorporated using two window tables with no correction introduced in the scalar value d or calculation results.

Figure 37:
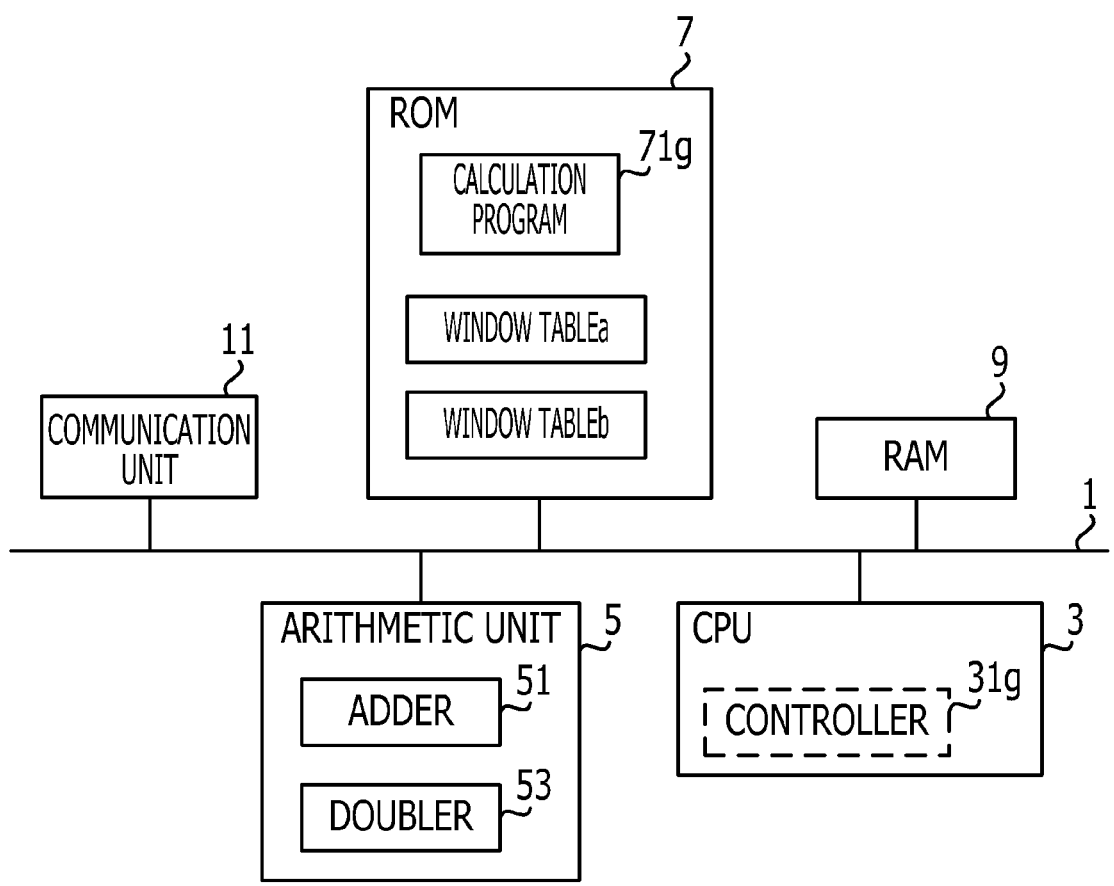
FIG. 37 illustrates a structure of an elliptic curve cryptographic processing apparatus of Embodiment 5.

FIG. 37 illustrates an elliptic curve cryptographic processing apparatus 100 of Embodiment 5. Elements identical to the elliptic curve cryptographic processing apparatus 100 illustrated in FIG. 17 are designated with the same reference numerals. The elliptic curve cryptographic processing apparatus 100 includes the CPU 3, the arithmetic unit 5, the ROM 7, the RAM 9, and the communication unit 11, mutually connected to each other via the bus 1. The ROM 7 stores a calculation program 71$g$ for causing the CPU 3 to perform a process to be discussed below, and two window tables a and b to be discussed below based on a window table of the comb-type window method.

The arithmetic unit 5 includes the adder 51, and the doubler 53, identical to those in Embodiment 1-A. When the CPU 3 executes the calculation program 71$g$, the controller 31$g$ is implemented. In accordance with Embodiment 5, no correction is performed as described in detail below.

The communication unit 11 for communicating with an external apparatus is also illustrated. A device for performing another function may be included. The RAM 9 stores data the CPU 3 uses to perform a variety of processes. In accordance with the present embodiment, the RAM 9 provides an area for a variable A that is used to calculate a scalar value d multiplication of a base point G on the elliptic curve. Data used for calculation may be also stored on the RAM 9. The RAM 9 has no extra area dedicated to tamper resistance.

The calculation process of Embodiment 5 is specifically described below. FIGS. 38A and 38B illustrate specific contents of the two window tables. Referring to FIGS. 38A and 38B, the scalar value d multiplication of the point G on the elliptic curve is performed based on a scalar value of 18 bits and a window width of 3 bits. An upper 9-bit block of the scalar value d is handled by the window table a, and a lower 9-bit block is handled by the window table b. The elements of each of the window tables a and b are $2^3=8$. In comparison with the case where no PA resistance mode is incorporated as in FIG. 11, (table correction value+F) is added to each table value in the upper table illustrated in FIG. 38A, and (table correction value−F) is added to each table value in the lower table illustrated in FIG. 38B. The table correction value is canceled to be zero by (table correction value −F) and (table correction value+F). The use of a plurality of window tables allows the PA resistance mode to be incorporated without the need for correction to the scalar value d and the calculation results.

More specifically, in the upper window table illustrated in FIG. 38A, 0G−F=−F is mapped to an index value "000," $2^9$G−F is mapped to an index value "001," $2^{12}$G−F is mapped to an index value "010," $2^{12}$G+$2^9$G−F is mapped to an index value "011," $2^{15}$G−F is mapped to an index value "100," $2^{15}$G+$2^9$G−F is mapped to an index value "101," $2^{15}$G+$2^{12}$G−F is mapped to an index value "110," and $2^{15}$G+$2^{12}$G+$2^9$G−F is mapped to an index value "111." The addition results of the table correction value−F of the window table of FIG. 38A and the table correction value+F of the window table value FIG. 38B is "0." The correction value F is a point on the elliptic curve.

In the lower window table illustrated in FIG. 38B, 0G+F=+F is mapped to an index value "000," $2^0$G+F is mapped to an index value "001," $2^3$G+F is mapped to an index value "010," $2^3$G+$2^0$G+F is mapped to an index value "011," $2^6$G+F is mapped to an index value "100," $2^6$G+$2^0$G+F is mapped to an index value "101," $2^6$G+$2^3$G+F is mapped to an index value "110," and $2^6$G+$2^3$G+$2^0$G+F is mapped to an index value "111."

Figure 11A:
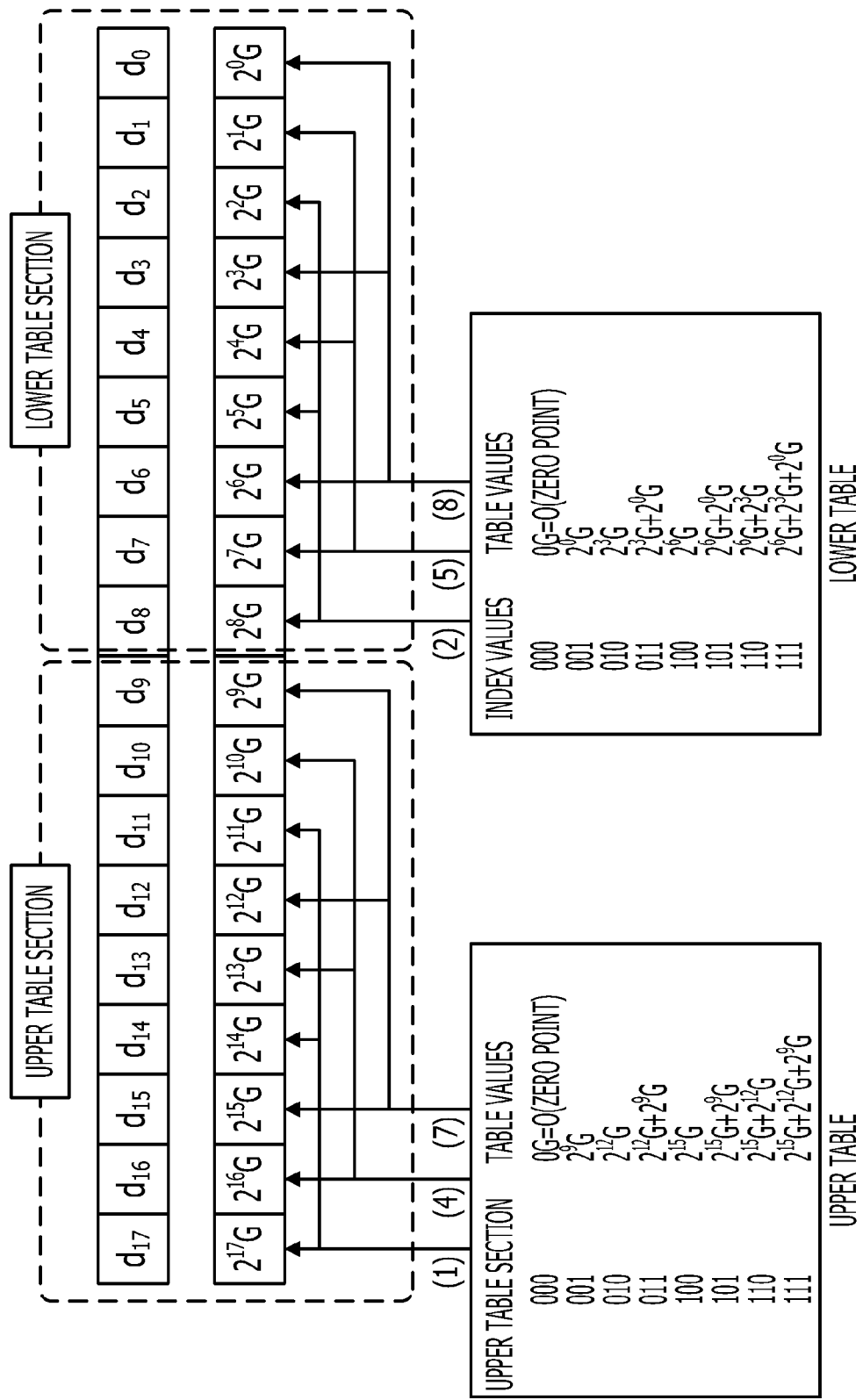
FIG. 11A illustrates an algorithm of the elliptic scalar multiplication based on the comb-type window method with two windows used.

A general table value may be expressed by an equation. In the upper window table of FIG. 38A, the upper bit of the index value corresponds to $2^{15}$G, the second bit corresponds to $2^{12}$G, and the third bit corresponds to $2^9$G. Depending on 0 or 1 of each bit of the index value, $2^{15}$, $2^{12}$, and $2^9$ may or may not be added. The power index of 2 is set in response to a relative bit position in a block of the scalar value d and assigned to each bit of the window (i.e., the index value) and a relative position of the block within the scalar value d. The window table b as the lower table handles a lower block for the lower 9 bits of the scalar value d. Referring to FIG. 11, the bit value is read from the scalar value d every [n/2k]=3 bits. If the power index of the least significant bit of the window of the lower window table of FIG. 38B is "0," the power index of the second bit is "3," and the power index of the most significant bit is "6." The window table a as the upper table handles an upper block for the upper 9 bits of the scalar value d. Referring to FIG. 11, the bit value is read from the scalar value d every [n/2k]=3 bits. If the power index of the least significant bit of the window of the upper window table a of FIG. 38A is "9," the power index of the second bit is "12," and the power index of the most significant bit is "15."

The calculation process based on the window tables of FIGS. 38A and 38B are illustrated in FIG. 38C. In step (1), an index value is obtained by reading 3 bits from the upper half scalar value d every 3 bits starting with the most significant bit, and a table value is read from the window table a according to the index value. The read table value is substituted for a variable A. Step (1) is expressed as (1) A=Tab$_H$[d$_{17}$, d$_{14}$, d$_{11}$]. Tab$_H$ denotes a table value in the upper window table of FIG. 38A. In step (2), an index value is obtained by reading 3 bits from the lower half bit block of the scalar value d every 3 bits, and a table value is read from the window table of FIG. 38B according to the index value. The read table value is added to the variable A. Step (2) is expressed as (2) A=A+Tab$_L$[d$_8$, d$_5$, d$_2$]. Tab$_L$ denotes a table value in the lower window table of FIG. 38B.

With the table correction method of the present embodiment, steps (1) and (2) result in −F+F=zero, thereby canceling the table correction value.

In step (3), 2A is calculated in response to 1 bit as a window shift width. Step (3) is expressed as (3) A=2A. In step (4), a table value is read from the window table according to an index value in which the index value is the next 3 bits of the upper half bit block obtained by right shifting by 1 bit the window from the state of step (1) in the scalar value d. The read table value is added to A. Step (4) is expressed as (4) A=A+Tab$_H$[d$_{16}$,d$_{13}$,d$_{10}$]. In step (5), a table value is read from the window table according to an index value in which the index value is the next 3 bits of the lower half bit block obtained by right shifting by 1 bit the window from the state of step (2) in the scalar value d. The read table value is added to A. Step (5) is expressed as (5) A=A+Tab$_L$[d$_7$,d$_4$,d$_1$].

In a manner similar to steps (1) and (2), steps (3) and (4) result in −F+F=zero, thereby canceling the table correction value.

In step (6), 2A is calculated in response to 1 bit as a window shift width. Step (6) is expressed as (6) A=2A. In step (7), a table value is read from the window table according to an index value in which the index value is the next 3 bits of the upper half bit block obtained by right shifting by 1 bit the window from the state of step (4) in the scalar value d. The read table value is added to A. Step (7) is expressed as (7) A=A+Tab$_H$[d$_{15}$,d$_{12}$,d$_9$]. In step (8), a table value is read from the window table according to an index value in which the index value is the next 3 bits of the lower half bit block obtained by right shifting by 1 bit the window from the state of step (5) in the scalar value d. The read table value is added to A. Step (8) is expressed as (8) A=A+Tab$_L$[d$_6$,d$_3$,d$_0$].

In a manner similar to steps (1) and (2), steps (7) and (8) result in −F+F=zero, thereby canceling the table correction value.

The table correction value is canceled without the need for the correction for the scalar value d and the calculation results. The calculation speed is increased. The use of the comb-type window method and the two window tables expedite further the process.

Although the calculation process is identical to that illustrated in FIG. 11, the window tables a and b are modified as described above, and the addition of zero is not performed. In other words, the power consumption waveforms of FIG. 12B do not appear. The embodiment is free from an increase in the RAM area for the variable, which the dummy operation method needs.

FIGS. 39 and 40 illustrate generalized versions of the window tables of FIGS. 38A and 38B, respectively. The index value y is (y$_{k-1}$∥y$_{k-2}$∥…y$_1$∥y$_0$) as in Embodiment 1-A. The bit at the x-th from the right is represented by y$_{x-1}$. The window width of each window table is k bits. The scalar value d is n bits.

Referring to FIG. 40, the table value responsive to the index value y in the lower window table is expressed as follows:

$$(y_{k-1} \times 2^{\lceil n/2k \rceil *(k-1)} + y_{k-2} \times 2^{\lceil n/2k \rceil *(k-2)} + \ldots + y_1 \times 2^{\lceil n/2k \rceil *1} + y_0 2^{\lceil n/2k \rceil *0})G+F$$

As discussed above, the i-th bit of the index value of k bits from the right corresponds to $y_{i-1} \times 2^{\lceil n/k \rceil *(i-1)}$. In the case of the comb-type window method, the k bits are read from the scalar value d every ⌈n/2k⌉ bits. The power index of 2 at the i-th bit of the k-bit index value from the right is a relative bit position $\lceil n/2k \rceil*(i-1)$ of the i-th bit of the lower bit block of the scalar value d.

Referring to FIG. 39, the table value responsive to the index value y in the upper window table is expressed as follows:

$$(y_{k-1} \times 2^{\lceil n/2k \rceil *k + \lceil n/2k \rceil *(k-1)} + y_{k-2} \times 2^{\lceil n/2k \rceil *k + \lceil n/2k \rceil *(k-2)} + \ldots + y_1 \times 2^{\lceil n/2k \rceil *k + \lceil n/2k \rceil *1} + y_0 \times 2^{\lceil n/2k \rceil *k + \lceil n/2k \rceil *0})G-F$$

In the upper window table, the i-th bit of the k-bit index value from the right corresponds to $y_{i-1} \times 2^{\lceil n/2k \rceil *k + \lceil n/2k \rceil *(i-1)}$. In the case of the comb-type window method of the two window tables, k bits are read from the scalar value d every $\lceil n/2k \rceil$ bits and are used for the upper bit block of the scalar value d in the upper table. The power index of 2 of the i-th bit of the k-bit index value from the right is increased by $\lceil n/2k \rceil *k$ in comparison with the lower table, and the relative bit position of the i-th bit in the upper bit block of the scalar value d is $\lceil n/2k \rceil *k + \lceil n/2k \rceil *(i-1)$.

Figure 41:
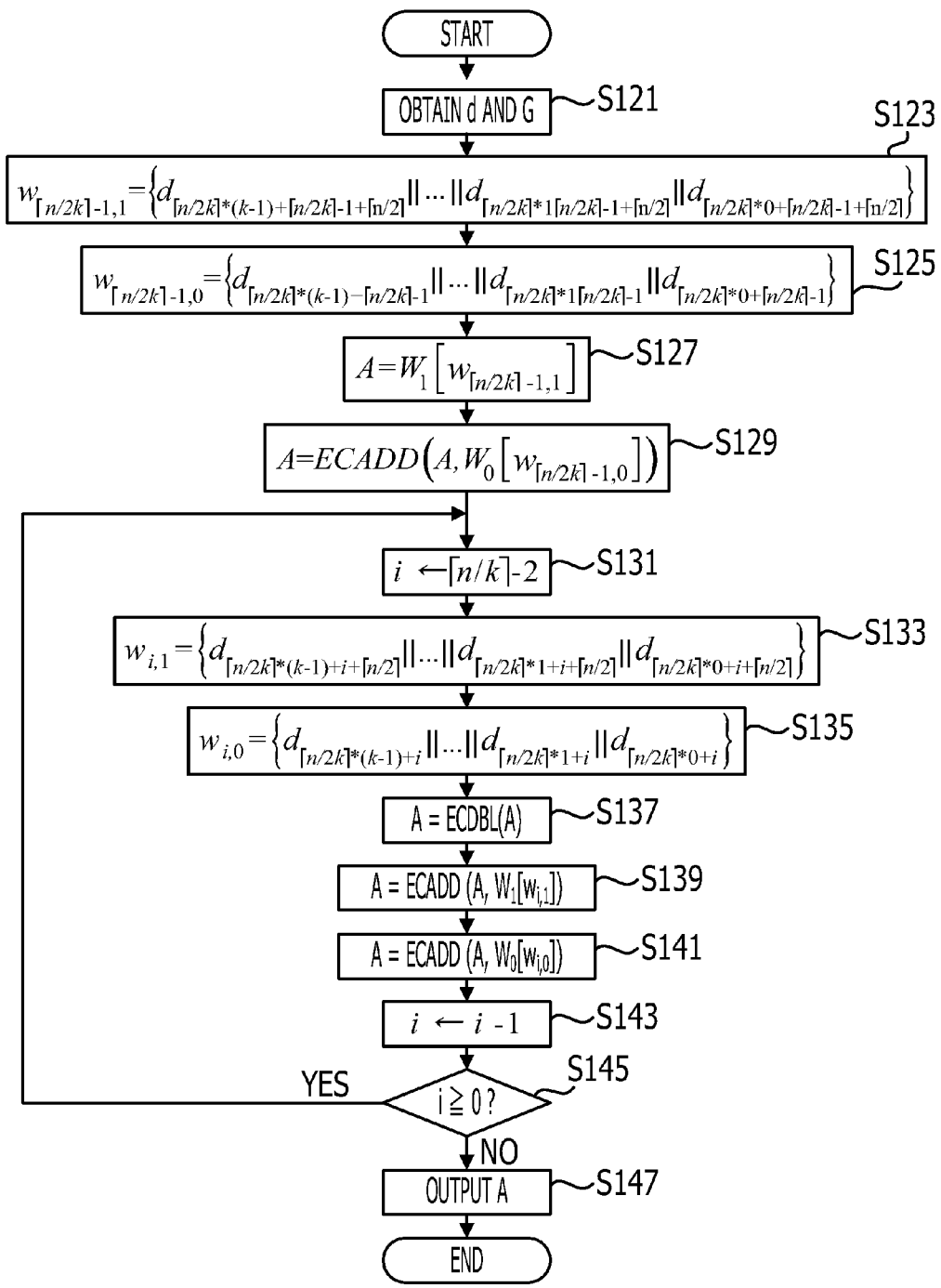
FIG. 41 is a flowchart of a process of Embodiment 5.

Referring to FIG. 41, a process flow of the elliptic curve cryptographic processing apparatus is described. The controller 31g reads the n-bit scalar value d and the base point G on the elliptic curve from one of the RAM 9 and the ROM 7 (S121). The controller 31g reads bit values in a k bit window width from the upper bit block of the scalar value d every $\lceil n/2k \rceil$ bits, starting with the most significant bit, and thus acquires an index value for the window table a as the upper table (S123). If the scalar value d is represented as $\{d_{n-1} \| d_{n-2} \| \ldots \| d_1 \| d_0\}$, the value $w_{\lceil n/2k \rceil -1,1}$ to be read from the scalar value d is represented as below:

$$w_{\lceil n/2k \rceil -1,1} = \{d_{\lceil n/2k \rceil *(k-1) + \lceil n/2k \rceil -1 + \lceil n/2 \rceil} \| \ldots d_{\lceil n/2k \rceil *1 + \lceil n/2k \rceil -1 + \lceil n/2 \rceil} \| d_{\lceil n/2k \rceil *0 + \lceil n/2k \rceil -1 + \lceil n/2 \rceil}\}$$

As previously discussed, $\lceil n/2k \rceil$ represents the minimum integer equal to or larger than n/2 k. For example, the overall scalar value d is 18 bits, and the number of bits of the upper half bit block of the tables is 9. If k=3, $\lceil n/2k \rceil$=2. Also, $\lceil n/2k \rceil *(k-1) + \lceil n/2k \rceil -1 + \lceil n/2k \rceil = 3*2+3-1+9=17$. The most significant bit number of the upper bit block is 17.

The controller 31g reads bit values in a k bit window width from the lower bit block of the scalar value d every $\lceil n/2k \rceil$ bits, starting with the most significant bit, and thus acquires an index value for the window table b for the lower table (S125). The value $w_{\lceil n/2k \rceil -1,0}$ read from d is expressed as follows:

$$w[n/2k]_{-1,0} = \{d_{\lceil n/2k \rceil *(k-1) + \lceil n/2k \rceil -1} \| \ldots d_{\lceil n/2k \rceil *1 + \lceil n/2k \rceil -1} \| d_{\lceil n/2k \rceil *0 + \lceil n/2k \rceil -1}\}$$

For example, the overall scalar value d is 18 bits, and the number of bits of the upper half bit block of the tables is 9. If k=3, $\lceil n/2k \rceil$=2. Also, $\lceil n/2k \rceil *(k-1) + \lceil n/2k \rceil -1 = 3*2+3-1=9$. The most significant bit number of the lower bit block is 9.

The controller 31g reads a table value responsive to the index value $w_{\lceil n/2k \rceil -1,1}$ from the window table a and sets the table value as a variable A (S127). The variable A is thus represented as below:

$$A = W_1[w_{\lceil n/2k \rceil -1,1}]$$

where W[z] is a table value mapped to an index value z in the window table a.

The controller 31g causes the adder 51 in the arithmetic unit 5 to perform the addition operation on the variable A and the table value $W_0$ corresponding to $w_{\lceil n/2k \rceil -1,0}$ in the window table b (S129). In FIG. 41, ECADD(A,$W_0[w_{\lceil n/2k \rceil -1,0}]$) represents the addition operation on A and $W_0[w_{\lceil n/2k \rceil -1,0}]$ on the elliptic curve.

The controller 31g sets $\lceil n/2k \rceil -2$ on a counter i (S131).

The controller 31g reads, from the upper bit block of the scalar value d, bit values every $\lceil n/2k \rceil$ bits in a k-bit width window starting at a bit position defined by the counter i and thus acquires an index value $W_{i,1}$ (S133).

The value $w_{i,1}$ to be read from d is represented as below:

$$w_{i,1} = \{d_{\lceil n/2k \rceil *(k-1) + i + \lceil n/2k \rceil} \| \ldots d_{\lceil n/2k \rceil *1 + i + \lceil n/2k \rceil} \| d_{\lceil n/2k \rceil *0 + i + \lceil n/2k \rceil}\}$$

The position of the window is thus right-shifted by 1 bit.

The controller 31g reads, from the lower bit block of the scalar value d, bit values every $\lceil n/2k \rceil$ bits in a k-bit width window starting with a bit position defined by the counter i and thus acquires an index value $W_{i,0}$ (S135).

The value $w_{i,0}$ to be read from d is represented as below:

$$w_{i,0} = \{d_{\lceil n/2k \rceil *(k-1) + i} \| \ldots d_{\lceil n/2k \rceil *1 + i} \| d_{\lceil n/2k \rceil *0 + i}\}$$

The controller 31g causes the doubler 53 in the arithmetic unit 5 to perform the doubling operation on the variable A once (because a right shift width of the window is 1) (S137). Referring to FIG. 41, ECDBL(A) represents the doubling operation of A on the elliptic curve.

The controller 31g causes the adder 51 in the arithmetic unit 5 to perform the addition operation on the variable A, and a table value $W[w_{i,1}]$ obtained from searching the window table a according to the index value $w_{i,1}$ (S139).

The controller 31g causes the adder 51 in the arithmetic unit 5 to perform the addition operation on the variable A, and a table value $W[w_{i,0}]$ obtained from searching the window table b according to the index value $w_{i,0}$ (S141).

The controller 31g decrements the value of the counter i by 1 (S143), and determines whether i equals 0 or above (S145). If it is determined that i equals 0 or above, the controller 31g returns to S133. Process steps S133 through S145 are repeated until i becomes less than 0.

If i becomes less than 0, the controller 31g outputs the value of the variable A thus obtained to a specified output destination (S147). The value of the variable A may be output to the outside via the communication unit 11, or may be output to another arithmetic program to be used in processing.

If the non-zero table value is added to the ordinary table value on in each of the window tables a and b as described above, the same calculation is repeated to any scalar value d. More specifically, none of the bits of the scalar value d can be stolen through the PA. Since the table correction values are set such that the table correction values are canceled in the two tables, the calculation process remains unchanged from that in the case where no PA resistance mode is incorporated. More specifically, the process speed remains unchanged from the process speed in the case where no PA resistance mode is incorporated. An area of the RAM 9 used in this process remains unchanged from the RAM area that is used when no PA resistance mode is incorporated. An area of the ROM 7 used in this process remains unchanged from the ROM area that is used when no PA resistance mode is incorporated. In the smart card that is subject to the capacity limitation of RAM, the present embodiment is particularly effective.

Embodiment 6

In accordance with Embodiment 5, the window tables, i.e., the upper and lower window tables are used. The number of tables is not limited to two. In the discussion that follows, t tables are used.

Figure 42:
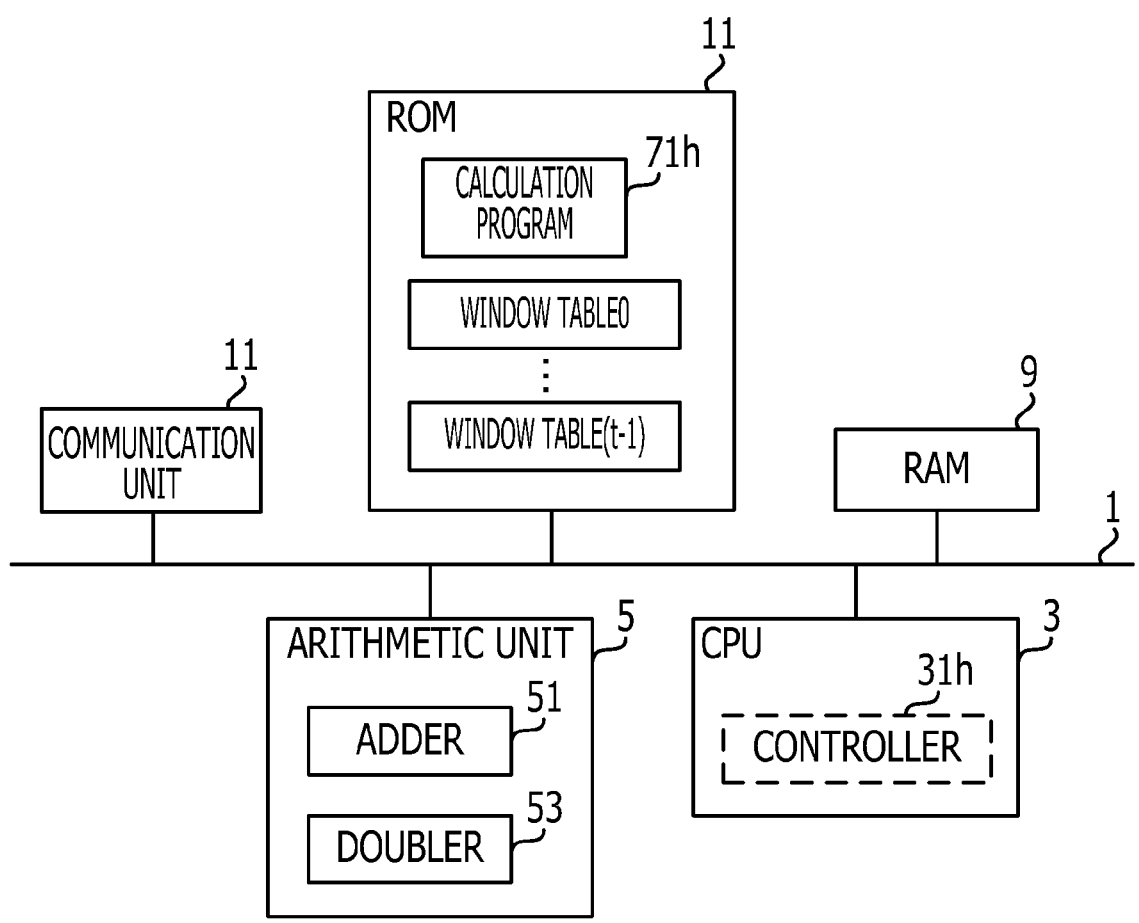
FIG. 42 illustrates a structure of an elliptic curve cryptographic processing apparatus of Embodiment 6.

FIG. 42 illustrates an elliptic curve cryptographic processing apparatus 100 of Embodiment 5. Elements identical to the elliptic curve cryptographic processing apparatus 100 illustrated in FIG. 17 are designated with the same reference numerals. The elliptic curve cryptographic processing apparatus 100 includes the CPU 3, the arithmetic unit 5, the ROM 7, the RAM 9, and the communication unit 11, mutually connected to each other via the bus 1. The ROM 7 stores a calculation program 71h for causing the CPU 3 to perform a process to be discussed below, and window tables 0 through (t−1) to be discussed below based on a window table of the comb-type window method.

The arithmetic unit 5 includes the adder 51, and the doubler 53, identical to those in Embodiment 1-A. When the CPU 3 executes the calculation program 71h, a controller 31h is implemented. As in Embodiment 5, no correction is performed.

The communication unit 11 for communicating with an external apparatus is also illustrated. A device for performing another function may be included. The RAM 9 stores data the CPU 3 uses to perform a variety of processes. In accordance with the present embodiment, the RAM 9 provides an area for a variable A that is used to calculate a scalar value d multiplication of a base point G on the elliptic curve. Data used for calculation may be also stored on the RAM 9. The RAM 9 has no extra area dedicated to tamper resistance.

A table value to be stored in window table j of the window tables 0 through (t−1) is represented as below. An index value y is $(y_{k-1} \| y_{k-2} \| \ldots y_1 \| y_0)$. The bit at the x-th from the right is represented by $y_{x-1}$. The window width of each window table is k bits. The scalar value d is n bits.

$$W_j[y] = F_j + \sum_{m=0}^{k-1} (y_m 2^{K(n,k,m,t,j)} G)$$

$$K(n, k, m, t, j) = \lceil n/(t*k) \rceil \times k \times j + \lceil n/(t*k) \rceil \times m$$

In the discussion that follows, $e = \lceil n/(t*k) \rceil$.

In K(n,k,m,t,j), the term $\lceil n/(t*k) \rceil kj$ remains unchanged in the same window table, and is a value expressing a relative position of the bit block within the scalar value d. Here, m corresponds to $y_m$. $\lceil n/(t*k) \rceil m$ is a value of a relative bit position of each bit in a window in the bit block.

In accordance with the present embodiment, the total sum of table correction values Fj is set to be zero on the window tables as expressed below:

$$F_0 + F_1 + \ldots + F_{t-1} = 0$$

Figure 43:
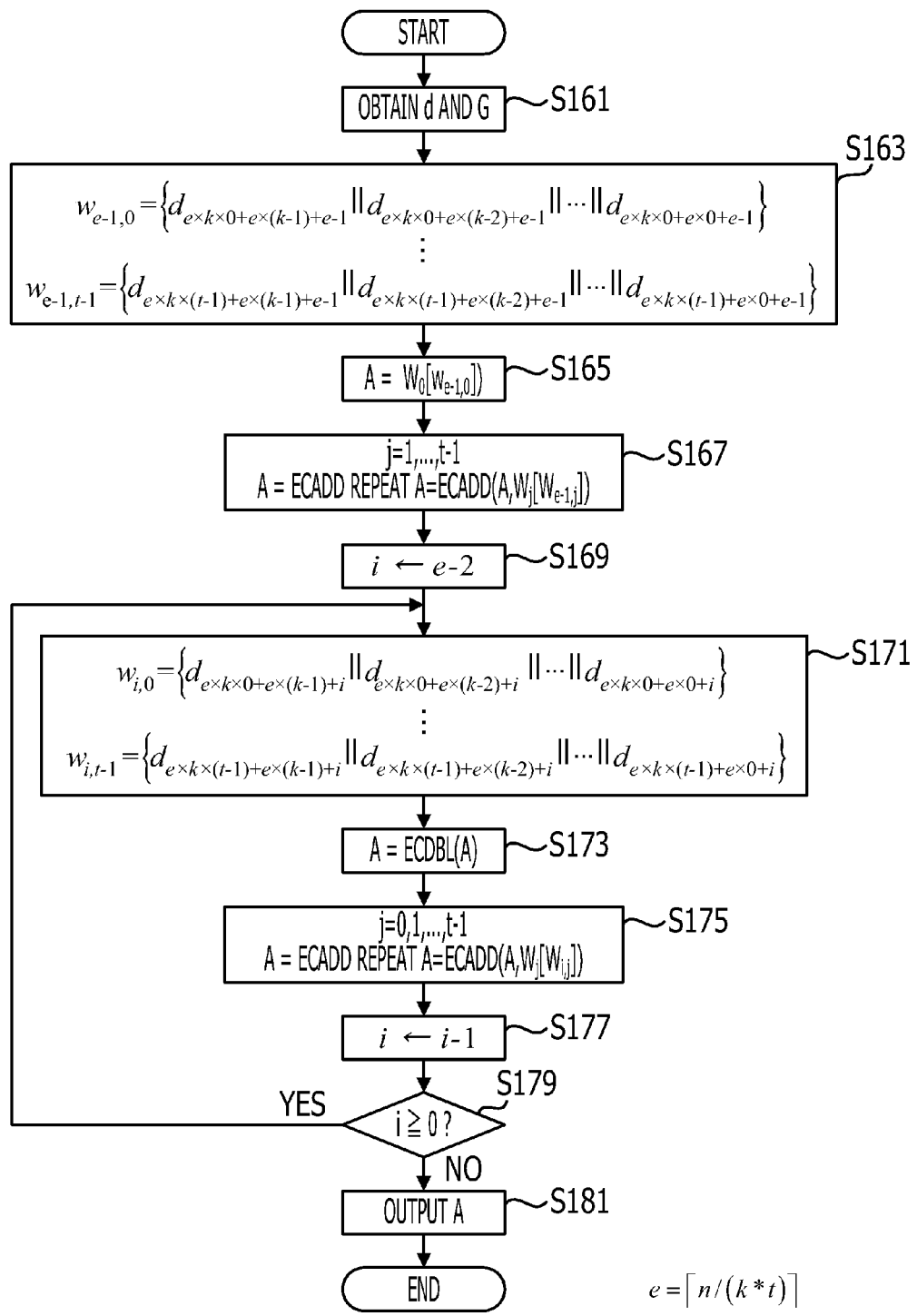
FIG. 43 is a flowchart of a process of Embodiment 6.

Referring to FIG. 43, a process flow of the elliptic curve cryptographic processing apparatus is described. The controller 31h reads the n-bit scalar value d and the base point G on the elliptic curve from one of the RAM 9 and the ROM 7 (S161). The controller 31h reads bit values in a k bit window width from the bit block of the scalar value d assigned to each of the window tables 0 through (t−1) every $\lceil n/(t*k) \rceil$ bits, starting with the most significant bit of the bit block, and thus acquires index values $w_{e-1,0}$ through $w_{e-1,t-1}$ (S163). More specifically, the index value is represented as below:

$$w_{e-1,0} = \{d_{e*k*0+e*(k-1)+e-1} \| d_{e*k*0+e*(k-2)+e-1} \| \ldots \\ \| d_{e*k*0+e*0+e-1} \} w_{e-1,j} = \{d_{e*k*j+e*(k-1)+e-1} \| \\ d_{e*k*j+e*(k-2)+e-1} \| \ldots \| d_{e*k*j+e*0+e-1} \} \\ w_{e-1,t-1} = \{d_{e*k*(t-1)+e*(k-1)+e-1} \| \\ d_{e*k*(t-1)+e*(k-2)+e-1} \| \ldots \| d_{e*k*(t-1)+e*0+e-1} \}$$

The controller 31h reads a table value $W_0[w_{e-1,0}]$ corresponding to the index value $W_{e-1,0}$ from the window table 0 assigned to the least significant bit block of the scalar value d, and sets the table value $W_0[w_{e-1,0}]$ for the variable A (S165) as represented below:

$$A = A + W_0[w_{e-1,0}]$$

$W_0[w_{e-1,0}]$ is a table value mapped to an index value (e−1) in the window table 0.

The controller 31h causes the adder 51 in the arithmetic unit 5 to repeat the addition operation on the variable A and each of the table values $W_j[w_{e-1,j}]$ mapped to the index value (e−1) in the window table j from j=1 through j=t−1 (S167). In FIG. 41, $ECADD(A, W_j[w_{e-1,j}])$ represents the addition operation on A and $W_j[w_{e-1,j}]$ on the elliptic curve.

The controller 31h sets e−2 on a counter i (S169). In this way, the window is right-shifted by 1 bit.

The controller 31h reads, from the upper bit block of the scalar value d, bit values every $\lceil n/(t*k) \rceil$ bits in a k-bit width window starting with a next bit of the bit block of the scalar value d assigned to each of the window tables 0 through (t−1) and acquires the index values $w_{i,0}$ through $w_{i,t-1}$ (S171). More specifically, the index value $w_{i,0}$ is represented as follows:

$$w_{i,0} = \{d_{e*k*0+e*(k-1)+i} \| d_{e*k*0+e*(k-2)+i} \| \ldots \| \\ d_{e*k*0+e*0+i} \} w_{i,j} = \{d_{e*k*j+e*(k-1)+i} \| \\ d_{e*k*j+e*(k-2)+i} \| \ldots \| d_{e*k*j+e*0+i} \} w_{i,t-1} = \\ \{d_{e*k*(t-1)+e*(k-1)+i} \| d_{e*k*(t-1)+e*(k-2)+i} \| \ldots \| \\ d_{e*k*(t-1)+e*0+i} \}$$

The controller 31h causes the doubler 53 in the CPU 3 to perform the doubling operation on the variable A once (the right-shift width of the window is 1) (S173). In FIG. 43, ECDBL(A) represents the doubling operation of A on the elliptic curve.

The controller 31h causes the adder 51 in the arithmetic unit 5 to repeat the addition operation on the variable A, and a table value $W[w_{i,j}]$ mapped to the index value i in the window table j in the order from j=0 through j=t−1 (S175).

The controller 31h decrements the value of the counter i by 1 (S177), and determines whether i equals 0 or above (S179). If it is determined that i equals 0 or above, the controller 31h returns to S171. Process steps S171 through S179 are repeated until i becomes less than 0.

If i becomes less than 0, the controller 31h outputs the value of the variable A thus obtained to a specified output destination (S181). The value of the variable A may be output to the outside via the communication unit 11, or may be output to another arithmetic program to be used in processing.

If the non-zero table value is added to the ordinary table value on in each of the window tables 0 through (t−1) as described above, the same calculation is repeated to any scalar value d. More specifically, none of the bits of the scalar value d can be stolen through the PA. Since the table correction values are set such that the table correction values are canceled in the t tables, the calculation process remains unchanged from that in the case where no PA resistance mode is incorporated. More specifically, the process speed remains unchanged from the process speed in the case where no PA resistance mode is incorporated. An area of the RAM 9 used in this process remains unchanged from the RAM area that is used when no PA resistance mode is incorporated. An area of the ROM 7 used in this process remains unchanged from the ROM area that is used when no PA resistance mode is incorporated. In the smart card that is subject to the capacity limitation of RAM, the present embodiment is particularly effective.

The embodiments of the technique have been discussed. The technique is not limited to these embodiments. Embodiments 5 and 6 operate on the comb-type window method. Alternatively, Embodiment 5 and 6 may operate on the standard window method.

For example, the window width in the bit block used in each of Embodiments 5 and 6 remains unchanged. Different window widths may be used. Different sizes of the bit block may be used.

The arithmetic unit 5 and the CPU 3 are different elements in the elliptic curve cryptographic processing apparatuses described above. The function of the arithmetic unit 5 may be performed by the CPU 3. If a plurality of CPUs 3 are used, the function of the arithmetic unit 5 may be performed by another CPU 3. The same is true if the CPU 3 has a plurality of cores.

The embodiments are summarized as below.

Figure 44:
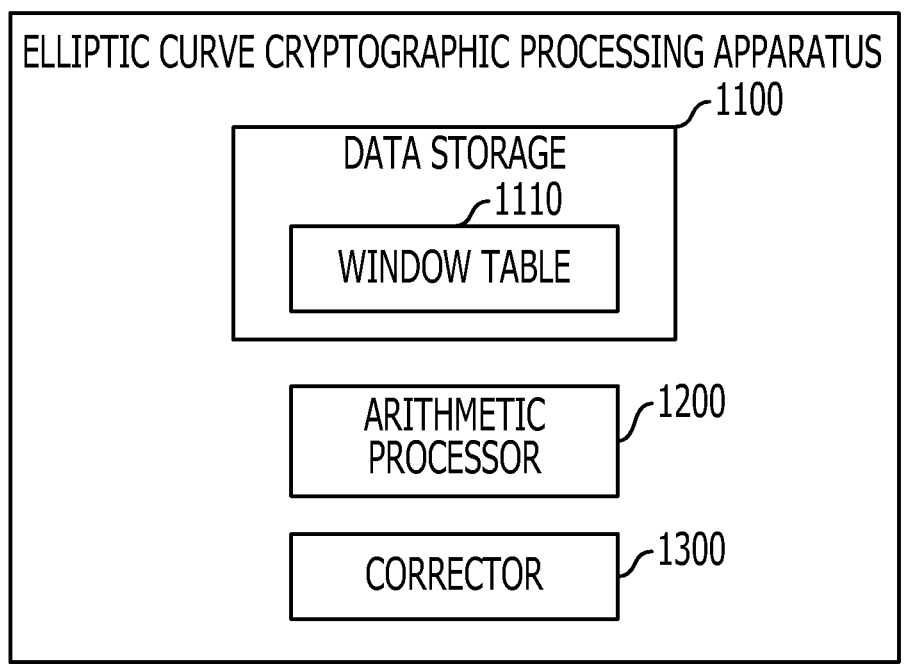
FIG. 44 illustrates a structure of an elliptic curve cryptographic processing apparatus.

The elliptic curve cryptographic processing apparatus (FIG. 44) of a first embodiment of performing a scalar multiplication of a specific point G on an elliptic curve, includes (A) a data storage (data storage 1100 in FIG. 44) storing a window table (data storage 1100 in FIG. 44), the window table storing a table value with an index value mapped to the table value, the index value having the same number of bits as a window width of k bits (k being an integer of 2 or larger) of a window to a scalar value d of n bits (n being an integer of 2 or larger), the table value being a sum of a basic table value and a non-zero table correction value, the basic table value being obtained by multiplying the point G by a sum of products, each product obtained by multiplying the value of each bit of the index value by 2 to the power of a value, the value corresponding to a relative bit position of the bit of the index value within the scalar value d, (B) an arithmetic processor (arithmetic processor 1200 in FIG. 44) generating the index value by reading from the scalar value d the bit value at the bit position assigned to each bit of the window with the window being shifted, reading the table value by searching the window table according to the index value, and performing a doubling operation and an addition operation using the read table value, and (C) a corrector (corrector 1300 in FIG. 44) performing a correction on arithmetic results of the arithmetic processing unit with a specific correction value responsive to the table correction value.

With the window table prepared, a table value corresponding to any index value is not zero. If the processes which are identical to the processes with no PA resistance mode included therewithin, except the process of the corrector, are executed, the power consumption waveform does not change in response to the bit value of d. Tamper resistance to the SPA is thus maintained. No extra memory area is needed in the RAM.

The elliptic curve cryptographic processing apparatus may include a doubling operation unit performing the doubling operation on a value stored as a variable on the elliptic curve and storing the doubling operation results as a variable, an addition operation unit performing the addition operation on the value stored as the variable and the read table value on the elliptic curve, and storing the addition operation results as a variable, and a controller. The controller generates the index value by reading the bit value at the bit position, assigned to each bit of the window, from the most significant bit of the scalar value d, reads a first table value by searching according to the index value the window table stored on the table storage, and stores the first table value as a variable. The controller right-shifts the window by a specific bit shift width, causes the doubling operation unit to perform the doubling operation on the value stored as the variable by the number of times responsive to the specific bit shift width, causes the addition operation unit to repeat the addition operation on a second table value until a plurality, substantially all and/or all, according to application criteria, of the bits of the scalar value d are processed, the second table value being obtained by searching the window table according to the index value, the index value resulting from reading from the scalar value d the bit value at the bit position assigned to the bit of the window.

The doubling operation unit and the addition operation unit may include dedicated circuits. The doubling operation unit and the addition operation unit may be implemented by using a combination of a CPU and a program. The arithmetic processor may be implemented using a combination of a dedicated arithmetic processor and a program.

In accordance with the first embodiment, the table value may be $(y_{k-1} \times 2^{k-1} + y_{k-2} \times 2^{k-2} + \ldots + y_1 \times 2^1 + y_0 \times 2^0)G + F$ where F represents the table correction value, and the index value of the window width k is $y(y_{k-1} \| y_{k-2} \| \ldots y_1 \| y_0)$ The specific correction value may be $(2^{k*0} + 2^{k*1} + 2^{k*2} + \ldots + 2^{k*(\lceil n/k \rceil - 1)})F$ ($\lceil n/k \rceil$ represents the minimum integer equal to or larger than n/k). The positions of the assigned bits may be consecutive k bits, and the specific bit shift width may be k bits.

If the standard window method is used, the above-described arrangement may be used.

In accordance with the first embodiment, the table value may be $(y_{k-1} \times 2^{\lceil n/k \rceil *(k-1)} + y_{k-2} \times 2^{\lceil n/k \rceil *(k-2)} + \ldots + y_1 \times 2^{\lceil n/k \rceil *1} + y_0 \times 2^{\lceil n/k \rceil *0})G + F$ ($\lceil n/k \rceil$ represents the minimum integer equal to or larger than n/k) where F represents the table correction value, and the index value of the window width k is $y(y_{k-1} \| y_{k-2} \| \ldots y_1 \| y_0)$.

The specific correction value may be $2^{\lceil n/k \rceil} - 1)F$.

The positions of the assigned bits may be every $\lceil n/k \rceil$ bits, and the specific bit shift width may be 1 bit.

If the comb-type window method is used, the above-described arrangement may be used.

In accordance with the first embodiment, the specific correction value may be pre-calculated beforehand, and stored on the data storage. With this arrangement, no substantial performance drop results. Alternatively, the specific correction value may be calculated at each time.

An elliptic curve cryptographic processing apparatus of a second embodiment (FIG. 44) performing a scalar multiplication of a specific point G on an elliptic curve, includes (A) a data storage (data storage 1100 in FIG. 44) storing a window table (data storage 1100 in FIG. 44), the window table storing a table value with an index value mapped to the table value, the index value having the same number of bits as a window width of k bits (k being an integer of 2 or larger) of a window to a scalar value d of n bits (n being an integer of 2 or larger), the table value being a sum of a basic table value and a table correction value being a product of a second scalar value x and the point G, the basic table value being obtained by multiplying the point G by a sum of products, each product obtained by multiplying the value of each bit of the index value by 2 to the power of a value, the value corresponding to a relative bit position of the bit of the index value within the scalar value d, (B) a corrector (corrector 1300 in FIG. 44) generating a third scalar value f by performing a correction on the scalar value d with a specific correction value responsive to the second scalar value x, and (C) an arithmetic processor (arithmetic processor 1200 in FIG. 44) generating the index value by reading from the third scalar value f the bit value at the bit position assigned to each bit of the window with the window being shifted, reading the table value by searching the window table according to the index value, and performing a doubling operation and an addition operation using the read table value.

If the table value to be added to the basic table value of the window table is the second scalar value x times the point G, the calculation on the elliptic curve becomes unnecessary by correcting the first scalar value. The workload on the correction process is thus reduced. In accordance with the first embodiment, xG may be set for the table correction value. An addition of another RAM is not needed.

The arithmetic processor may include a doubling operation unit performing the doubling operation on a value stored as a variable on the elliptic curve and storing the doubling operation results as a variable, and an addition operation unit performing the addition operation on the value stored as the variable and the read table value on the elliptic curve and storing the addition operation results as a variable, and a controller. The controller generates the index value by reading the bit value at the bit position, assigned to the bit of the window, from the most significant bit of the third scalar value f, reads a first table value by searching according to the index value the window table stored on the table storage, and stores the first table value as a variable. The controller right-shifts the window by a specific bit shift width, causes the doubling operation unit to perform the doubling operation on the value stored as the variable by the number of times responsive to the specific bit shift width, and causes the addition operation unit to repeat the addition operation on a second table value until all the bits of the third scalar value f are processed, the second table value being obtained by searching the window table according to the index value, the index value resulting from reading from the third scalar value f the bit value at the bit position assigned to the bit of the window.

In the same manner as in the first embodiment, the doubling operation unit and the addition operation unit may include related art elements. The doubling operation unit and the addition operation unit may be implemented in hardware or software. The controller may be implemented using a combination of a CPU and a program.

In accordance with the second embodiment, the table value may be $(y_{k-1} \times 2^{k-1} + y_{k-2} \times 2^{k-2} + \ldots + y_1 \times 2^1 + y_0 \times 2^0)G + xG$ where the index value of the window width k is $y(y_{k-1} \| y_{k-2} \| \ldots y_1 \| y_0)$.

The specific correction value may be $(2^{k*0} + 2^{k*1} + 2^{k*2} + \ldots + 2^{k*(\lceil n/k \rceil - 1)})x$ ($\lceil n/k \rceil$ represents the minimum integer equal to or larger than n/k).

The positions of the assigned bits may be consecutive k bits, and the specific bit shift width may be k bits.

If the standard window method is performed in the second embodiment, the above-described arrangement applies.

In accordance with the second embodiment, the table value may be $(y_{k-1} \times 2^{\lceil n/k \rceil *(k-1)} + y_{k-2} \times 2^{\lceil n/k \rceil *(k-2)} + \ldots + y_1 \times 2^{\lceil n/k \rceil *1} + y_0 \times 2^{\lceil n/k \rceil *0})G + xG$ ($\lceil n/k \rceil$ represents the minimum integer equal to or larger than n/k) where the index value of the window width k is $y(y_{k-1} \| y_{k-2} \| \ldots y_1 \| y_0)$.

The specific correction value may be $(2^{\lceil n/k \rceil} - 1)x$.

The positions of the assigned bits may be every $\lceil n/k \rceil$ bits, and the specific bit shift width may be 1 bit.

If the comb-type window method is performed in the second embodiment, the above-described arrangement applies.

Figure 45:
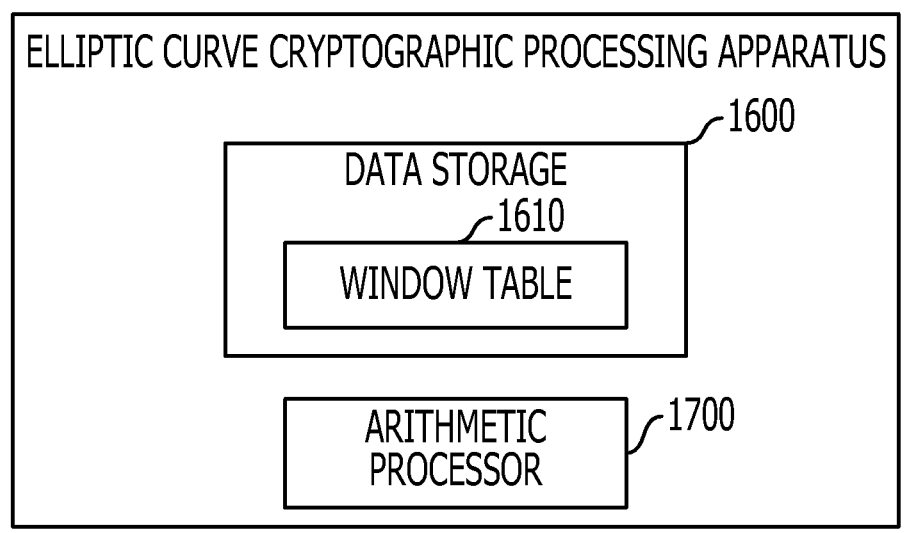
FIG. 45 illustrates a structure of an elliptic curve cryptographic processing apparatus.

An elliptic curve cryptographic processing apparatus of a third embodiment (FIG. 45) performing a scalar multiplication of a specific point G on an elliptic curve, includes (A) a data storage (data storage 1600 in FIG. 45) storing a window table (window table 1610 in FIG. 45), the window table storing a table value with an index value mapped to the table value, the index value having the same number of bits as a window width of k bits (k being an integer of 2 or larger) of a window to each block of a scalar value d, the table value being a sum of a basic table value and a non-zero block table correction value, the basic table value being obtained by multiplying the point G by a sum of products, each product obtained by multiplying the value of each bit of the index value by 2 to the power of a value, the value corresponding to a relative position of the bit of the index value within the block and a relative position of the block within the scalar value d, and (B) an arithmetic processor (arithmetic processor 1700 in FIG. 45) generating the index value by reading from each block of the scalar value d the bit value at the bit position assigned to each bit of the window with the window being shifted, reading the table value by searching the window table of the block according to the index value, and performing a doubling operation and an addition operation using the read table value. The total sum of the block table correction values is zero in each block.

With the plurality of window tables, the scalar value d is free from correction and the calculation result is free from correction. The PA resistance mode is performed at the same level of workload as the workload where no PA resistance mode is performed. No additional RAM is needed.

The arithmetic processor includes a doubling operation unit performing the doubling operation on a value stored as a variable on the elliptic curve and storing the doubling operation results as a variable, an addition operation unit performing the addition operation on the value stored as the variable and the read table value on the elliptic curve, and storing the addition operation results as a variable, and a controller. The controller generates the index value by reading the bit value at the bit position, assigned to the bit of the window, from the most significant bit of the most significant block of the scalar value d, reads a first table value by searching according to the index value the window table of the most significant block stored on the table storage, and stores the first table value as a variable. The controller causes the addition operation unit to repeat the addition operation on a second table value and the value stored as the variable down to the least significant block of the scalar value d, the second table value being obtained by searching according to the index value the window table of the block to be processed, the index value being obtained by reading the bit value at the bit position assigned to the bit of the window from the most significant bit of the second block or a lower block of the scalar value d. The controller right-shifts the window by a specific bit shift width within the block, and the controller causes the doubling operation unit to perform the doubling operation on the value stored as the variable by the number of times responsive to the specific bit shift width, and causes the addition operation unit to repeat the addition operation on a third table value down to the least significant block of the scalar value d until all the bits of the scalar value d are processed, the third table value being obtained by searching according to the index value the window table of the block to be processed, the index value resulting from reading from the block of the scalar value d the bit value at the bit position assigned to the bit of the window.

In accordance with the third embodiment, the standard window method may be used, and/or the comb-type window method may be used.

If the comb-type window method is used, the table value may be $$F_j + \sum_{m=0}^{k-1} (y_m 2^{K(n,k,m,t,j)} G)$$

$$K(n, k, m, t, j) = \lceil n/(t*k) \rceil \times k \times j + \lceil n/(t*k) \rceil \times m$$

($\lceil z \rceil$ represents the minimum integer equal to or larger than z) where j represents a block number, t represents the number of blocks, the scalar value d is nit bits, $F_j$ is a table correction value of the block number j, and the index value of the window width k is $y(y_{k-1} \| y_{k-2} \| \ldots y_1 \| y_0)$.

The positions of the assigned bits may be every $\lceil n/(k*t) \rceil$ bits, and the specific bit shift width may be 1 bit.

An elliptic curve cryptographic processing method of a fourth embodiment is performed by an apparatus, the apparatus including a data storage storing a window table, the window table storing a table value with an index value mapped to the table value, the index value having the same number of bits as a window width of k bits (k being an integer of 2 or larger) of a window to a scalar value d of n bits (n being an integer of 2 or larger), the table value being a sum of a basic table value and a non-zero table correction value, the basic table value being obtained by multiplying a specific point G on an elliptic curve by a sum of products, each product obtained by multiplying the value of each bit of the index value by 2 to the power of a value, the value corresponding to a relative bit position of the bit of the index value within the scalar value d. The method includes (A) generating the index value by reading from the scalar value d the bit value at the bit position assigned to each bit of the window with the window being shifted, reading the table value by searching the window table according to the index value, and (B) performing a doubling operation and an addition operation using the read table value, and performing a correction on arithmetic results of the arithmetic processing unit with a specific correction value responsive to the table correction value.

An elliptic curve cryptographic processing method of a fifth embodiment is performed by an apparatus, the apparatus including a data storage storing a window table, the window table storing a table value with an index value mapped to the table value, the index value having the same number of bits as a window width of k bits (k being an integer of 2 or larger) of a window to a scalar value d of n bits (n being an integer of 2 or larger), the table value being a sum of a basic table value and a table correction value being a product of a second scalar value x and a specific point G on an elliptic curve, the basic table value being obtained by multiplying the point G by a sum of products, each product obtained by multiplying the value of each bit of the index value by 2 to the power of a value, the value corresponding to a relative bit position of the bit of the index value within the scalar value d. The method includes (A) generating a third scalar value f by performing a correction on the scalar value d with a specific correction value responsive to the second scalar value x, and (B) generating the index value by reading from the third scalar value f the bit value at the bit position assigned to each bit of the window with the window being shifted, reading the table value by searching the window table according to the index value, and performing a doubling operation and an addition operation using the read table value.

An elliptic curve cryptographic processing method of a sixth embodiment is performed by an apparatus, the apparatus including a data storage storing a window table, the window table storing a table value with an index value mapped to the table value, the index value having the same number of bits as a window width of k bits (k being an integer of 2 or larger) of a window of each block of a scalar value d of n bits (n being an integer of 2 or larger), the table value being a sum of a basic table value and a non-zero block table correction value, the basic table value being obtained by multiplying a specific point G on an elliptic curve by a sum of products, each product obtained by multiplying the value of each bit of the index value by 2 to the power of a value, the value corresponding to a relative position of the bit of the index value within the block and a relative position of the block within the scalar value d. The method includes (A) generating the index value by reading from each block of the scalar value d the bit value at the bit position assigned to each bit of the window with the window being shifted, reading the table value by searching the window table of the block according to the index value, and (B) performing a doubling operation and an addition operation using the read table value. The total sum of the block table correction values is zero in each block.

According to an aspect of the embodiments of the invention, any combinations of one or more of the described features, functions, operations, and/or benefits can be provided. A combination can be one or a plurality. The embodiments can be implemented as an apparatus (a machine) that includes computing hardware (i.e., computing apparatus), such as (in a non-limiting example) any computer that can store, retrieve, process and/or output data and/or communicate (network) with other computers. According to an aspect of an embodiment, the described features, functions, operations, and/or benefits can be implemented by and/or use computing hardware and/or software. The apparatus (e.g., the elliptic curve cryptographic processing apparatus 100) can include a computer processor/controller (CPU) 3, arithmetic unit 5 (e.g., a hardware logic circuitry based computer processor that processes or executes instructions, namely software/program), computer readable media, transmission communication interface (network interface), and/or an output device, for example, a display device, all in communication through a data communication bus. In addition, an apparatus can include one or more apparatuses in computer network communication with each other or other apparatuses. In addition, a computer processor can include one or more computer processors in one or more apparatuses or any combinations of one or more computer processors and/or apparatuses. An aspect of an embodiment relates to causing or enabling one or more apparatuses and/or computer processors to execute the described operations. The results produced can be output to an output device, for example, displayed on the display.

A program/software implementing the embodiments may be recorded on a computer-readable media, e.g., a non-transitory or persistent computer-readable storage medium. The program/software implementing the embodiments may be transmitted over a transmission communication path, e.g., a wire and/or a wireless network implemented via hardware. An example of communication media via which the program/software may be sent includes, for example, a carrier-wave signal.

A program for causing a device such as a smart card to perform the above-described process may be produced. The program may be stored on a non-transitory computer-readable storage medium or a storage device, such as a flexible disk, a compact-disk ROM (CD-ROM), a magneto-optical disk, a semiconductor memory (such as a ROM), or a hard disk. The computer-readable storage medium or storage device mentioned here does not include something like a transitory propagation signal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An elliptic curve cryptographic processing apparatus performing a scalar multiplication of a specific point G on an elliptic curve, comprising:
  a data storage that stores a window table, the window table storing a table value with an index value mapped to the table value, the index value having same number of bits as a window width of k bits (k being an integer of 2 or larger) of a window to a scalar value d of n bits (n being an integer of 2 or larger), the stored table value including a non-zero table correction value being based on a sum of a basic table value and the non-zero table correction value, the basic table value being obtained by multiplying the point G by a sum of products, each product obtained by multiplying a value of each bit of the index value by 2 to a power of a bit value corresponding to a relative bit position of a bit of the index value within the scalar value d;

a processor that
   generates the index value by reading from the scalar value d a bit value at a bit position assigned to each bit of a window with the window being shifted,
   reads a table value that includes a non-zero table correction value by searching the window table according to the generated index value, and
   performs a doubling operation and an addition operation using the read table value; and a corrector that performs a correction on arithmetic results of the processor with a specific correction value responsive to the table correction value.

2. The elliptic curve cryptographic processing apparatus according to claim 1, wherein the processor comprises:
   a doubling operation unit that performs the doubling operation on a doubling operation value on the elliptic curve and stores a doubling operation result;
   an addition operation unit that performs the addition operation on the doubling operation result and the read table value on the elliptic curve, and stores an addition operation result; and
   a controller that:
   generates the index value by reading the bit value at the bit position, assigned to each bit of the window, from a most significant bit of the scalar value d,
   reads a first table value by searching according to the index value the window table stored on the table storage, and
   right-shifts the window by a specific bit shift width, causes the doubling operation unit to perform the doubling operation on the doubling operation value by a number of times responsive to the specific bit shift width, and causes the addition operation unit to repeat the addition operation on the doubling operation result and on a second table value until a plurality of bits of the scalar value d are processed, the second table value being obtained by searching the window table according to the index value generated from reading from the scalar value d a bit value at a bit position assigned to a bit of the window.

3. The elliptic curve cryptographic processing apparatus according to claim 1, wherein the table value is $(y_{k-1} \times 2^{k-1} + y_{k-2} \times 2^{k-2} + \ldots + y_1 \times 2^1 + y_0 \times 2^0)G + F$ where F represents the table correction value, and the index value of the window width k is $y(y_{k-1}\|y_{k-2}\| \ldots y_1\|y_0)$, and
   wherein the specific correction value is $(2^{k*0} + 2^{k*1} + 2^{k*2} + \ldots + 2^{k*(\lceil n/k \rceil - 1)})F$, ($\lceil n/k \rceil$ represents a minimum integer equal to or larger than n/k, and
   wherein positions of the assigned bits are consecutive k bits, and a specific bit shift width is k bits.

4. The elliptic curve cryptographic processing apparatus according to claim 1, wherein the table value is $(y_{k-1} \times 2^{\lceil n/k \rceil *(k-1)} + y_{k-2} \times 2^{\lceil n/k \rceil *(k-2)} + \ldots + y_1 \times 2^{\lceil n/k \rceil *1} + y_0 \times 2^{\lceil n/k \rceil *0})G + F$, ($\lceil n/k \rceil$ represents a minimum integer equal to or larger than n/k where F represents the table correction value, and the index value of the window width k is $y(y_{k-1}\|y_{k-2}\| \ldots y_1\|y_0)$, and
   wherein the specific correction value is $(2^{\lceil n/k \rceil}-1)F$ and wherein positions of the assigned bits are every $\lceil n/k \rceil$ bits, and a specific bit shift width is 1 bit.

5. The elliptic curve cryptographic processing apparatus according to claim 1, wherein the specific correction value is pre-calculated, and stored on the data storage.

6. An elliptic curve cryptographic processing apparatus performing a scalar multiplication of a specific point G on an elliptic curve, comprising:
   a data storage that stores a window table, the window table storing a table value with an index value mapped to the table value, the index value having same number of bits as a window width of k bits (k being an integer of 2 or larger) of a window to a first scalar value d of n bits (n being an integer of 2 or larger), the stored table value including a non-zero table correction value being based on a sum of a basic table value and the table correction value being a product of a second scalar value x and the point G, the basic table value being obtained by multiplying the point G by a sum of products, each product obtained by multiplying a value of each bit of the index value by 2 to a power of a bit value corresponding to a relative bit position of a bit of the index value within the first scalar value d;
   a corrector that generates a third scalar value f by performing a correction on the first scalar value d with a specific correction value responsive to the second scalar value x; and
   a processor that:
      generates the index value by reading from the third scalar value f a bit value at a bit position assigned to each bit of the window with the window being shifted,
      reads a table value that includes a non-zero table correction value by searching the window table according to the generated index value, and
      performs a doubling operation and an addition operation using the read table value.

7. The elliptic curve cryptographic processing apparatus according to claim 6, wherein the processor comprises:
   a doubling operation unit performing the doubling operation on a doubling operation value on the elliptic curve and stores a doubling operation result;
   an addition operation unit that performs the addition operation on the doubling operation result and the read table value on the elliptic curve and stores an addition operation result; and
   a controller that:
   generates the index value by reading the bit value at the bit position, assigned to the bit of the window, from a most significant bit of the third scalar value f,
   reads a first table value by searching according to the index value the window table stored on the table storage, and
   right-shifts the window by a specific bit shift width, causes the doubling operation unit to perform the doubling operation on the doubling operation value by a number of times responsive to the specific bit shift width, and causes the addition operation unit to repeat the addition operation on the doubling operation result and on a second table value until a plurality of bits of the third scalar value f are processed, the second table value being obtained by searching the window table according to the index value generated from reading from the third scalar value f a bit value at a bit position assigned to a bit of the window.

8. The elliptic curve cryptographic processing apparatus according to claim 6, wherein the table value is $(y_{k-2} \times 2^{k-1} + y_{k-2} \times 2^{k-2} + \ldots + y_1 \times 2^1 + y_0 \times 2^0)G + xG$ where the index value of the window width k is $y(y_{k-1}\|y_{k-2}\| \ldots y_1\|y_0)$, and wherein the specific correction value is $(2^{k*0}+2^{k*1}+2^{k*2}+\ldots+2^{k*(\lceil n/k \rceil-1)})x$, ($\lceil n/k \rceil$ represents a minimum integer equal to or larger than n/k, and wherein positions of the assigned bits are consecutive k bits, and a specific bit shift width is k bits.

9. The elliptic curve cryptographic processing apparatus according to claim 6, wherein the table value is $(y_{k-1} \times 2^{\lceil n/k \rceil*(k-1)}+y_{k-2} \times 2^{\lceil n/k \rceil*(k-2)}+\ldots+y_1 \times 2^{\lceil n/k \rceil*0}+y_0 \times 2^{\lceil n/k \rceil*0})G+xG$, ($\lceil n/k \rceil$ represents a minimum integer equal to or larger than n/k where the index value of the window width k is $y(y_{k-1}\|y_{k-2}\|\ldots y_1\|y_0)$, and wherein the specific correction value is $(2^{\lceil n/k \rceil}-1)x$ and wherein positions of the assigned bits are every $\lceil n/k \rceil$ bits, and specific bit shift width is 1 bit.

10. An elliptic curve cryptographic processing apparatus performing a scalar multiplication of a specific point G on an elliptic curve, comprising:

a data storage that stores a window table, the window table storing a table value with an index value mapped to the table value, the index value having same number of bits as a window width of k bits (k being an integer of 2 or larger) of a window to each block of a scalar value d, the stored table value including, for a block of the scalar value d, a non-zero block table correction value being based on a sum of a basic table value and the non-zero block table correction value, the basic table value being obtained by multiplying the point G by a sum of products, each product obtained by multiplying a value of each bit of the index value by 2 to a power of a bit value corresponding to a relative bit position of a bit of the index value within a block of the scalar value d and a relative position of the block within the scalar value d;

a processor that:
generates the index value by reading from each block of the scalar value d a bit value at a bit position assigned to each bit of a window with the window being shifted,
reads a table value that includes a non-zero table correction value by searching the window table of the block according to the generated index value, and
performs a doubling operation and an addition operation using the read table value,
wherein a total sum of the block table correction values is zero in each block.

11. The elliptic curve cryptographic processing apparatus according to claim 10, wherein the processor comprises:

a doubling operation unit that performs the doubling operation on a doubling operation value on the elliptic curve and stores a doubling operation result;

an addition operation unit that performs the addition operation on the doubling operation result and the read table value on the elliptic curve, and stores an addition operation result; and a controller that:
generates the index value by reading the bit value at the bit position, assigned to the bit of the window, from a most significant bit of a most significant block of the scalar value d,
reads a first table value by searching according to the index value the window table of the most significant block stored on the table storage,
causes the addition operation unit to repeat the addition operation on a second table value and the doubling operation result down to a least significant block of the scalar value d, the second table value being obtained by searching according to the index value the window table of a block to be processed, the index value being obtained by reading a bit value at a bit position assigned to a bit of the window from the most significant bit of a second block or a lower block of the scalar value d, and right-shifts the window by a specific bit shift width within the block to be processed, causes the doubling operation unit to perform the doubling operation on the doubling operation value by a number of times responsive to the specific bit shift width, and causes the addition operation unit to repeat the addition operation on the doubling operation result and on a third table value down to the least significant block of the scalar value d until a plurality of bits of the scalar value d are processed, the third table value being obtained by searching according to the index value the window table of the block to be processed, the index value resulting from reading from the block of the scalar value d a bit value at a bit position assigned to a bit of the window.

12. The elliptic curve cryptographic processing apparatus according to claim 10, wherein the table value is $$F_j + \sum_{m=0}^{k-1}(y_m 2^{K(n,k,m,t,j)}G)$$

$$K(n, k, m, t, j) = \lceil n/(t*k) \rceil \times k \times j + \lceil n/(t*k) \rceil \times m,$$

$\lceil n/(t*k) \rceil$ represents a minimum integer equal to or larger than n/(t*k), where j represents a block number, t represents the number of blocks, the scalar value d is nit bits, $F_j$, is a table correction value of the block number j, and the index value of the window width k is $y(y_{k-1}\|y_{k-2}\|\ldots y_1\|y_0)$, and wherein positions of the assigned bits are every $\lceil n/k \rceil$ bits, and a specific bit shift width is 1 bit.

13. An elliptic curve cryptographic processing method of an apparatus that includes a data storage storing a window table, the window table storing a table value with an index value mapped to the table value, the index value having a same number of bits as a window width of k bits (k being an integer of 2 or larger) of a window to a scalar value d of n bits (n being an integer of 2 or larger), the stored table value including a non-zero table correction value being based on a sum of a basic table value and the non-zero table correction value, the basic table value being obtained by multiplying a specific point G on an elliptic curve by a sum of products, each product obtained by multiplying a value of each bit of the index value by 2 to the power of a bit value corresponding to a relative bit position of a bit of the index value within the scalar value d, the method comprising:

generating the index value by reading from the scalar value d a bit value at a bit position assigned to each bit of a window with the window being shifted;

reading a table value that includes a non-zero table correction value by searching the window table according to the generated index value;

performing a doubling operation and an addition operation using the read table value; and performing a correction on arithmetic results of the doubling and addition operations with a specific correction value responsive to the table correction value.

14. An elliptic curve cryptographic processing method of an apparatus that includes a data storage storing a window table, the window table storing a table value with an index value mapped to the table value, the index value having same number of bits as a window width of k bits (k being an integer of 2 or larger) of a window to a first scalar value d of n bits (n being an integer of 2 or larger), the stored table value including a non-zero table correction value being based on a sum of a basic table value and the table correction value being a product of a second scalar value x and a specific point G on an elliptic curve, the basic table value being obtained by multiplying the point G by a sum of products, each product obtained by multiplying a value of each bit of the index value by 2 to the power of a bit value corresponding to a relative bit position of a bit of the index value within the first scalar value d, the method comprising:

generating a third scalar value f by performing a correction on the first scalar value d with a specific correction value responsive to the second scalar value x;

generating the index value by reading from the third scalar value f a bit value at a bit position assigned to each bit of a window with the window being shifted;

reading a table value that includes a non-zero table correction value by searching the window table according to the generated index value; and performing a doubling operation and an addition operation using the read table value.

15. An elliptic curve cryptographic processing method of an apparatus including a data storage storing a window table, the window table storing a table value with an index value mapped to the table value, the index value having same number of bits as a window width of k bits (k being an integer of 2 or larger) of a window of each block of a scalar value d of n bits (n being an integer of 2 or larger), the stored table value including, for a block of the scalar value d, a non-zero block table correction value being based on a sum of a basic table value and the non-zero block table correction value, the basic table value being obtained by multiplying a specific point G on an elliptic curve by a sum of products, each product obtained by multiplying a value of each bit of the index value by 2 to a power of a bit value corresponding to a relative position of a bit of the index value within a block and a relative position of the block within the scalar value d, the method comprising:

generating the index value by reading from each block of the scalar value d a bit value at a bit position assigned to each bit of a window with the window being shifted;

reading a table value that includes a non-zero table correction value by searching the window table of a block according to the generated index value; and performing a doubling operation and an addition operation using the read table value, wherein a total sum of the block table correction values is zero in each block.

16. A non-transitory computer-readable storage medium storing an elliptic curve cryptographic processing program causing a computer to perform a partial security assurance process, the computer including a data storage storing a window table, the window table storing a table value with an index value mapped to the table value, the index value having same number of bits as a window width of k bits (k being an integer of 2 or larger) of a window to a scalar value d of n bits (n being an integer of 2 or larger), the stored table value including a nonzero table correction value being based on a sum of a basic table value and the non-zero table correction value, the basic table value being obtained by multiplying a specific point G on an elliptic curve by a sum of products, each product obtained by multiplying a value of each bit of the index value by 2 to a power of a bit value corresponding to a relative bit position of a bit of the index value within the scalar value d, the partial security assurance process comprising:

generating an index value by reading from the scalar value d a bit value at a bit position assigned to each bit of a window with the window being shifted;

reading a table value that includes a non-zero table correction value by searching the window table according to the generated index value;

performing a doubling operation and an addition operation using the read table value; and performing a correction on arithmetic results of the doubling and addition operations with a specific correction value responsive to the table correction value.

17. A non-transitory computer-readable storage medium storing an elliptic curve cryptographic processing program causing a computer to perform a partial security assurance process, the apparatus including a data storage storing a window table, the window table storing a table value with an index value mapped to the table value, the index value having same number of bits as a window width of k bits (k being an integer of 2 or larger) of a window to a first scalar value d of n bits (n being an integer of 2 or larger), the stored table value including a non-zero table correction value being based on a sum of a basic table value and the table correction value being a product of a second scalar value x and a specific point G on an elliptic curve, the basic table value being obtained by multiplying the point G by a sum of products, each product obtained by multiplying a value of each bit of the index value by 2 to a power of a bit value corresponding to a relative bit position of a bit of the index value within the first scalar value d, the partial security assurance process comprising:

generating a third scalar value f by performing a correction on the first scalar value d with a specific correction value responsive to the second scalar value x;

generating the index value by reading from the third scalar value f a bit value at a bit position assigned to each bit of a window with the window being shifted;

reading a table value that includes a non-zero table correction value by searching the window table according to the generated index value; and performing a doubling operation and an addition operation using the read table value.

18. A non-transitory computer-readable storage medium storing an elliptic curve cryptographic processing program causing an apparatus to perform a partial security assurance process, the apparatus including a data storage storing a window table, the window table storing a table value with an index value mapped to the table value, the index value having a same number of bits as a window width of k bits (k being an integer of 2 or larger) of a window of each block of a scalar value d of n bits (n being an integer of 2 or larger), the stored table value including, for a block of the scalar value d, a non-zero block table correction value being based on a sum of a basic table value and the non-zero block table correction value, the basic table value being obtained by multiplying a specific point G on an elliptic curve by a sum of products, each product obtained by multiplying a value of each bit of the index value by 2 to a power of a bit value corresponding to a relative position of a bit of the index value within a block of the scalar value d and a relative position of the block within the scalar value d, the partial security assurance process comprising:

generating the index value by reading from each block of the scalar value d a bit value at a bit position assigned to each bit of a window with the window being shifted;

reading a table value that includes a non-zero table correction value by searching the window table of a block according to the generated index value; and performing a doubling operation and an addition operation using the read table value, wherein a total sum of the block table correction values is zero in each block.

* * * * *